US011617159B2

(12) United States Patent
Liu et al.

(10) Patent No.: US 11,617,159 B2
(45) Date of Patent: Mar. 28, 2023

(54) DOWNLINK CONTROL CHANNEL MONITORING FOR MULTICAST/BROADCAST SERVICES

(71) Applicant: QUALCOMM Incorporated, San Diego, CA (US)

(72) Inventors: Le Liu, Fremont, CA (US); Kazuki Takeda, Tokyo (JP); Alberto Rico Alvarino, San Diego, CA (US); Huilin Xu, San Diego, CA (US); Peter Gaal, San Diego, CA (US); Ayan Sengupta, San Diego, CA (US); Prasad Reddy Kadiri, San Diego, CA (US); Juan Montojo, San Diego, CA (US); Sitaramanjaneyulu Kanamarlapudi, San Diego, CA (US); Wanshi Chen, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 116 days.

(21) Appl. No.: 17/138,278

(22) Filed: Dec. 30, 2020

(65) Prior Publication Data
US 2022/0210766 A1    Jun. 30, 2022

(51) Int. Cl.
*H04W 72/00* (2023.01)
*H04W 76/28* (2018.01)
(Continued)

(52) U.S. Cl.
CPC ......... *H04W 72/005* (2013.01); *H04L 1/1614* (2013.01); *H04W 24/08* (2013.01);
(Continued)

(58) Field of Classification Search
CPC ............... H04W 72/005; H04W 24/08; H04W 52/0219; H04W 72/042; H04W 72/0453;
(Continued)

(56) References Cited

U.S. PATENT DOCUMENTS

| 2007/0147411 | A1* | 6/2007 | Bijwaard | H04L 65/1101 370/466 |
| 2018/0351705 | A1* | 12/2018 | Uchino | H04L 1/189 |

(Continued)

FOREIGN PATENT DOCUMENTS

| WO | WO-2020220310 A1 * | 11/2020 | ........... H04L 5/0053 |

OTHER PUBLICATIONS

International Search Report and Written Opinion—PCT/US2021/062926—ISA/EPO—dated Apr. 5, 2022.

*Primary Examiner* — Kiet Tang
(74) *Attorney, Agent, or Firm* — Holland & Hart LLP

(57) ABSTRACT

Methods, systems, and devices for wireless communications are described. A base station may configure a user equipment (UE) with a frequency resource for a multicast/broadcast service (MBS) for the UE to monitor for one or more group-common downlink control channels. The base station may transmit an indication, such as an explicit indication, of a monitoring condition for the group-common downlink control channels within the frequency resource. The UE may apply the monitoring condition by enabling or disabling the group-common downlink control channel monitoring within the frequency resource. The UE may monitor one or more downlink control channels for scheduling information from the base station according to the monitoring condition.

30 Claims, 20 Drawing Sheets

(51) Int. Cl.
*H04L 1/1607* (2023.01)
*H04W 24/08* (2009.01)
*H04W 52/02* (2009.01)
*H04W 72/04* (2023.01)
*H04W 72/0453* (2023.01)
*H04W 72/121* (2023.01)

(52) U.S. Cl.
CPC ..... *H04W 52/0219* (2013.01); *H04W 72/042* (2013.01); *H04W 72/0453* (2013.01); *H04W 72/121* (2013.01); *H04W 76/28* (2018.02)

(58) Field of Classification Search
CPC ... H04W 72/121; H04W 76/28; H04W 72/00; H04W 72/1268; H04W 76/20; H04L 1/1614; H04L 1/16
See application file for complete search history.

(56) References Cited

U.S. PATENT DOCUMENTS

| | | | |
|---|---|---|---|
| 2019/0141546 A1 | 5/2019 | Zhou et al. | |
| 2019/0149380 A1* | 5/2019 | Babaei | H04W 72/1268 370/330 |
| 2020/0059947 A1* | 2/2020 | Li | H04W 72/1257 |
| 2022/0240187 A1* | 7/2022 | Guo | H04L 5/0053 |

\* cited by examiner

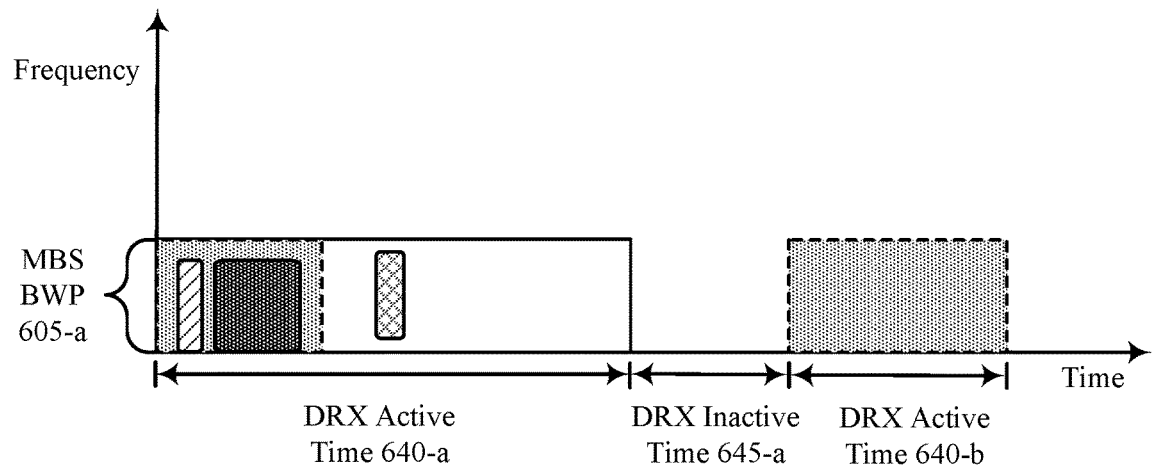
FIG. 6A
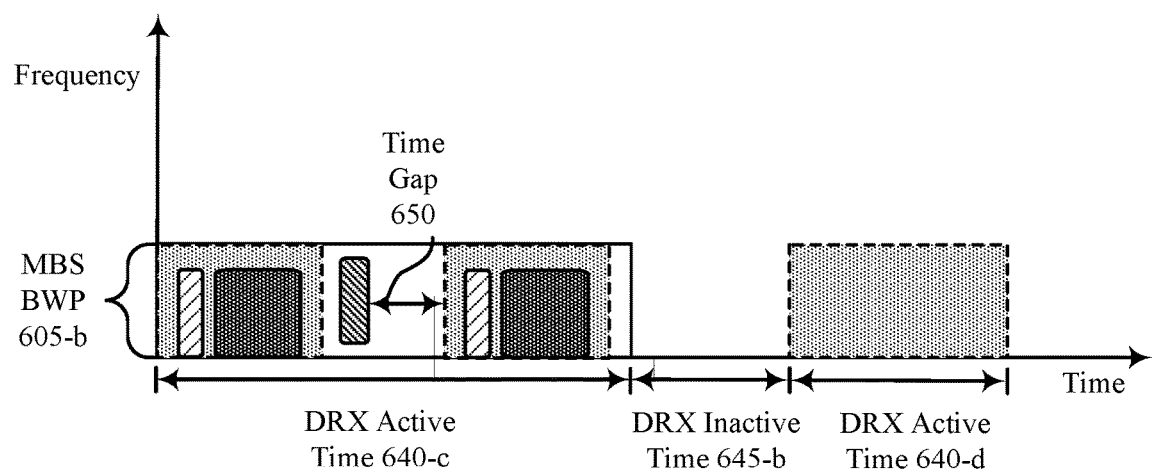
FIG. 6B
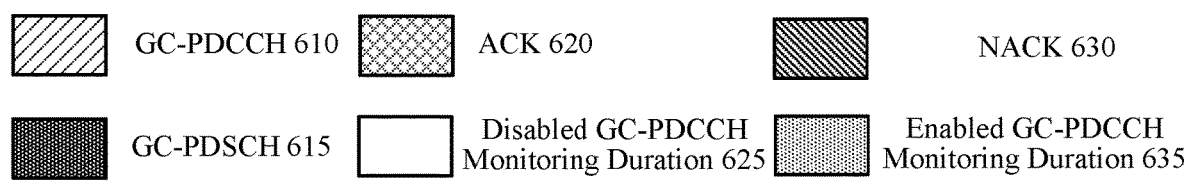

DOWNLINK CONTROL CHANNEL MONITORING FOR MULTICAST/BROADCAST SERVICES

FIELD OF TECHNOLOGY

The following relates to wireless communications, including downlink control channel monitoring for multicast/broadcast services (MBS).

BACKGROUND

Wireless communications systems are widely deployed to provide various types of communication content such as voice, video, packet data, messaging, broadcast, and so on. These systems may be capable of supporting communication with multiple users by sharing the available system resources (e.g., time, frequency, and power). Examples of such multiple-access systems include fourth generation (4G) systems such as Long Term Evolution (LTE) systems, LTE-Advanced (LTE-A) systems, or LTE-A Pro systems, and fifth generation (5G) systems which may be referred to as New Radio (NR) systems. These systems may employ technologies such as code division multiple access (CDMA), time division multiple access (TDMA), frequency division multiple access (FDMA), orthogonal FDMA (OFDMA), or discrete Fourier transform spread orthogonal frequency division multiplexing (DFT-S-OFDM). A wireless multiple-access communications system may include one or more base stations or one or more network access nodes, each simultaneously supporting communication for multiple communication devices, which may be otherwise known as user equipment (UE).

SUMMARY

The described techniques relate to improved methods, systems, devices, and apparatuses that support downlink control channel monitoring for multicast/broadcast services (MBS). Generally, the described techniques provide for a base station to configure a user equipment (UE) to control downlink control channel monitoring for multicast transmissions. For example, the base station may configure the UE with a monitoring condition to enable or disable monitoring of a group-common downlink control channel within a frequency resource (e.g., one or more MBS bandwidth parts (BWPs)). In some cases, the base station may transmit an indication (e.g., an explicit indication) of the frequency resource and the monitoring condition for the group-common downlink control channel within the frequency resource. The indication of the frequency resource may include an indication of one or more MBS BWPs, search space set groups, or a combination thereof. In some examples, the UE may monitor the one or more downlink control channels (e.g., the group-common downlink control channel, a UE-specific downlink control channel, or both) for scheduling information from the base station according to the monitoring condition.

A method for wireless communications at a user equipment (UE) is described. The method may include receiving a configuration identifying a frequency resource for an MBS to be monitored by the UE for one or more group-common downlink control channels, receiving a message indicating a monitoring condition for group-common downlink control channel monitoring within the frequency resource, and selectively enabling or disabling the group-common downlink control channel monitoring within the frequency resource based on the monitoring condition.

An apparatus for wireless communications at a UE is described. The apparatus may include a processor, memory in electronic communication with the processor, and instructions stored in the memory. The instructions may be executable by the processor to cause the apparatus to receive a configuration identifying a frequency resource for an MBS to be monitored by the UE for one or more group-common downlink control channels, receive a message indicating a monitoring condition for group-common downlink control channel monitoring within the frequency resource, and selectively enable or disable the group-common downlink control channel monitoring within the frequency resource based on the monitoring condition.

Another apparatus for wireless communications at a UE is described. The apparatus may include means for receiving a configuration identifying a frequency resource for an MBS to be monitored by the UE for one or more group-common downlink control channels, means for receiving a message indicating a monitoring condition for group-common downlink control channel monitoring within the frequency resource, and means for selectively enabling or disabling the group-common downlink control channel monitoring within the frequency resource based on the monitoring condition.

A non-transitory computer-readable medium storing code for wireless communications at a UE is described. The code may include instructions executable by a processor to receive a configuration identifying a frequency resource for an MBS to be monitored by the UE for one or more group-common downlink control channels, receive a message indicating a monitoring condition for group-common downlink control channel monitoring within the frequency resource, and selectively enable or disable the group-common downlink control channel monitoring within the frequency resource based on the monitoring condition.

In some examples of the method, apparatuses, and non-transitory computer-readable medium described herein, selectively enabling or disabling the group-common downlink control channel monitoring within the frequency resource may include operations, features, means, or instructions for disabling the group-common downlink control channel monitoring prior to expiration of a discontinuous reception (DRX) active timer.

In some examples of the method, apparatuses, and non-transitory computer-readable medium described herein, receiving the message may include operations, features, means, or instructions for receiving an explicit indication of the monitoring condition via one of a radio resource control (RRC) message, a medium access control-control element (MAC-CE), or a downlink control information (DCI) message.

In some examples of the method, apparatuses, and non-transitory computer-readable medium described herein, receiving the message may include operations, features, means, or instructions for receiving an explicit indication of the monitoring condition as a timer value via an RRC message, where selectively enabling or disabling the group-common downlink control channel monitoring within the frequency resource includes selectively disabling the group-common downlink control channel monitoring during a pendency of the timer.

In some examples of the method, apparatuses, and non-transitory computer-readable medium described herein, receiving the message may include operations, features, means, or instructions for receiving an explicit indication of the monitoring condition as a bitmap via a DCI message, where selectively enabling or disabling the group-common downlink control channel monitoring within the frequency resource includes selectively enabling or disabling the group-common downlink control channel monitoring on a frequency resource basis based on the bitmap.

In some examples of the method, apparatuses, and non-transitory computer-readable medium described herein, receiving the explicit indication of the monitoring condition as the bitmap may include operations, features, means, or instructions for receiving the bitmap in a BWP identification field when the BWP identification field may be not being used to indicate BWP switching.

In some examples of the method, apparatuses, and non-transitory computer-readable medium described herein, receiving the explicit indication of the monitoring condition as the bitmap may include operations, features, means, or instructions for receiving the bitmap in a field of the DCI message dedicated to selectively enabling or disabling the group-common downlink control channel monitoring, a size of the bitmap based on a number of frequency resources configured for the MBS within a dedicated bandwidth.

In some examples of the method, apparatuses, and non-transitory computer-readable medium described herein, the DCI message may be a UE-specific physical downlink control channel message received in an active dedicated BWP.

In some examples of the method, apparatuses, and non-transitory computer-readable medium described herein, the DCI message may be a group-common physical downlink control channel message, and the bitmap pertains to at least one of a bandwidth part for the MBS associated with the group-common physical downlink control channel message or another bandwidth part for the MBS, and the bandwidth part for the multicast/broadcast service associated with the group-common physical downlink control channel message includes the frequency resource.

In some examples of the method, apparatuses, and non-transitory computer-readable medium described herein, the DCI message may be a group-common wake-up signal received in an MBS BWP during an inactive state, a dormant time, or an active time.

In some examples of the method, apparatuses, and non-transitory computer-readable medium described herein, receiving the message may include operations, features, means, or instructions for receiving an explicit indication of the monitoring condition as a search space set group switch indicating at least one of a set of multiple search space set groups that may be active for the group-common downlink control channel monitoring.

In some examples of the method, apparatuses, and non-transitory computer-readable medium described herein, receiving the explicit indication of the monitoring condition as the search space set group switch may include operations, features, means, or instructions for receiving the search space set group switch in a DCI message whose cyclic redundancy check is scrambled with a group-common slot format indication radio network temporary identifier configured for the MBS, where the set of multiple search space set groups may be configured via RRC signaling.

In some examples of the method, apparatuses, and non-transitory computer-readable medium described herein, receiving the explicit indication of the monitoring condition as the search space set group switch may include operations, features, means, or instructions for receiving the search space set group switch in a DCI message whose cyclic redundancy check is scrambled with a slot format indication radio network temporary identifier, where the set of multiple search space set groups may be configured via RRC signaling.

Some examples of the method, apparatuses, and non-transitory computer-readable medium described herein may further include operations, features, means, or instructions for receiving an RRC message configuring the set of multiple search space set groups, where the RRC message includes one or more expiration timers pertaining to respective search space set groups.

In some examples of the method, apparatuses, and non-transitory computer-readable medium described herein, receiving the message may include operations, features, means, or instructions for receiving an indication of an activity status for the frequency resource, where the frequency resource may be an MBS BWP and the monitoring condition may be the activity status, and where selectively enabling or disabling the group-common downlink control channel monitoring is based on the activity status.

Some examples of the method, apparatuses, and non-transitory computer-readable medium described herein may further include operations, features, means, or instructions for receiving an indication of a first activity status of a UE-specific BWP that may be associated with the frequency resource, where the frequency resource may be an MBS BWP within the UE-specific bandwidth part and the monitoring condition may be the first activity status and determining a second activity status of the MBS BWP based on the first activity status of the UE-specific BWP, where selectively enabling or disabling the group-common downlink control channel monitoring is based on the second activity status.

Some examples of the method, apparatuses, and non-transitory computer-readable medium described herein may further include operations, features, means, or instructions for receiving, from a base station, an indication to disable the group-common downlink control channel monitoring based on an MBS traffic threshold being satisfied.

In some examples of the method, apparatuses, and non-transitory computer-readable medium described herein, selectively enabling or disabling the group-common downlink control channel monitoring within the frequency resource may include operations, features, means, or instructions for disabling the group-common downlink control channel monitoring while still performing a channel state information (CSI) measurement, a beam management operation, an uplink feedback transmission, a CSI report transmission, a sounding reference signal (SRS) transmission, or a combination thereof with respect to the frequency resource of the MBS.

In some examples of the method, apparatuses, and non-transitory computer-readable medium described herein, selectively enabling or disabling the group-common downlink control channel monitoring within the frequency resource may include operations, features, means, or instructions for disabling the group-common downlink control channel monitoring, identifying one or more blind decoding occasions that may be available due to the disabling of the group-common downlink control channel monitoring, and shifting the one or more blind decoding occasions to be available for unicast downlink control channel monitoring.

In some examples of the method, apparatuses, and non-transitory computer-readable medium described herein, selectively enabling or disabling the group-common downlink control channel monitoring within the frequency resource may include operations, features, means, or instructions for disabling the group-common downlink control channel monitoring based on the monitoring condition, determining that the UE is configured for multicast negative acknowledgment only for multicast reception, and re-enabling the group-common downlink control channel monitoring based on transmission of a negative acknowledgment (NACK) by the UE, where the re-enabling of the group-common downlink control channel monitoring occurs a time offset after the transmission of the NACK.

In some examples of the method, apparatuses, and non-transitory computer-readable medium described herein, the time offset may be set by a UE-specific downlink round-trip time timer or may be configured by a base station.

In some examples of the method, apparatuses, and non-transitory computer-readable medium described herein, selectively enabling or disabling the group-common downlink control channel monitoring within the frequency resource may include operations, features, means, or instructions for disabling the group-common downlink control channel monitoring based on the monitoring condition, determining that a NACK pertaining to multicast reception was transmitted by the UE, where the UE is configured for UE-specific acknowledgement (ACK) and NACK for multicast reception, and monitoring for a UE-specific downlink control channel message pertaining to retransmission of a group-common downlink shared channel message with which the NACK may be associated.

Some examples of the method, apparatuses, and non-transitory computer-readable medium described herein may further include operations, features, means, or instructions for re-enabling the group-common downlink control channel monitoring based on an absence of the UE-specific downlink control channel message pertaining to retransmission of the group-common downlink shared channel message, where the re-enabling of the group-common downlink control channel monitoring occurs a time offset after transmission of the NACK.

Some examples of the method, apparatuses, and non-transitory computer-readable medium described herein may further include operations, features, means, or instructions for transmitting a UE-specific ACK or a UE-specific NACK, where the UE-specific ACK or the UE-specific NACK may be transmitted as feedback for receipt of data scheduled by the message.

Some examples of the method, apparatuses, and non-transitory computer-readable medium described herein may further include operations, features, means, or instructions for transmitting an ACK or a NACK, where the ACK or the NACK may be transmitted as feedback for receipt of the message.

A method for wireless communications at a base station is described. The method may include transmitting a configuration identifying a frequency resource for an MBS to be monitored by a UE for one or more group-common downlink control channels, transmitting a message indicating a monitoring condition for group-common downlink control channel monitoring within the frequency resource, and communicating with the UE in accordance with the monitoring condition, where the monitoring condition selectively enables or disables the group-common downlink control channel monitoring within the frequency resource.

An apparatus for wireless communications at a base station is described. The apparatus may include a processor, memory in electronic communication with the processor, and instructions stored in the memory. The instructions may be executable by the processor to cause the apparatus to transmit a configuration identifying a frequency resource for an MBS to be monitored by a UE for one or more group-common downlink control channels, transmit a message indicating a monitoring condition for group-common downlink control channel monitoring within the frequency resource, and communicate with the UE in accordance with the monitoring condition, where the monitoring condition selectively enables or disables the group-common downlink control channel monitoring within the frequency resource.

Another apparatus for wireless communications at a base station is described. The apparatus may include means for transmitting a configuration identifying a frequency resource for an MBS to be monitored by a UE for one or more group-common downlink control channels, means for transmitting a message indicating a monitoring condition for group-common downlink control channel monitoring within the frequency resource, and means for communicating with the UE in accordance with the monitoring condition, where the monitoring condition selectively enables or disables the group-common downlink control channel monitoring within the frequency resource.

A non-transitory computer-readable medium storing code for wireless communications at a base station is described. The code may include instructions executable by a processor to transmit a configuration identifying a frequency resource for an MBS to be monitored by a UE for one or more group-common downlink control channels, transmit a message indicating a monitoring condition for group-common downlink control channel monitoring within the frequency resource, and communicate with the UE in accordance with the monitoring condition, where the monitoring condition selectively enables or disables the group-common downlink control channel monitoring within the frequency resource.

In some examples of the method, apparatuses, and non-transitory computer-readable medium described herein, the monitoring condition disables the group-common downlink control channel monitoring prior to expiration of a DRX active timer.

In some examples of the method, apparatuses, and non-transitory computer-readable medium described herein, transmitting the message may include operations, features, means, or instructions for transmitting an explicit indication of the monitoring condition via one of an RRC message, a MAC-CE, or a DCI message.

In some examples of the method, apparatuses, and non-transitory computer-readable medium described herein, transmitting the message may include operations, features, means, or instructions for transmitting an explicit indication of the monitoring condition as a timer value via an RRC message, where the monitoring condition selectively disables the group-common downlink control channel monitoring during a pendency of the timer.

In some examples of the method, apparatuses, and non-transitory computer-readable medium described herein, transmitting the message may include operations, features, means, or instructions for transmitting an explicit indication of the monitoring condition as a bitmap via a DCI message, where the monitoring condition selectively enables or disables the group-common downlink control channel monitoring on a frequency resource basis based on the bitmap.

In some examples of the method, apparatuses, and non-transitory computer-readable medium described herein, transmitting the explicit indication of the monitoring condition as the bitmap may include operations, features, means, or instructions for transmitting the bitmap in a BWP identification field when the BWP identification field may be not being used to indicate BWP switching.

In some examples of the method, apparatuses, and non-transitory computer-readable medium described herein, transmitting the explicit indication of the monitoring condition as the bitmap may include operations, features, means, or instructions for transmitting the bitmap in a field of the DCI message dedicated to selectively enabling or disabling the group-common downlink control channel monitoring, a size of the bitmap based on a number of frequency resources configured for the MBS within a dedicated bandwidth.

In some examples of the method, apparatuses, and non-transitory computer-readable medium described herein, the DCI message may be a UE-specific physical downlink control channel message transmitted in an active dedicated BWP.

In some examples of the method, apparatuses, and non-transitory computer-readable medium described herein, the DCI message may be a group-common physical downlink control channel message, and the bitmap pertains to at least one bandwidth part for the MBS associated with the group-common physical downlink control channel message or another bandwidth part for the MBS, and the bandwidth part for the multicast/broadcast service associated with the group-common physical downlink control channel message includes the frequency resource.

In some examples of the method, apparatuses, and non-transitory computer-readable medium described herein, the DCI message may be a group-common wake-up signal transmitted in an MBS BWP during an inactive state, a dormant time, or an active time.

In some examples of the method, apparatuses, and non-transitory computer-readable medium described herein, transmitting the message may include operations, features, means, or instructions for transmitting an explicit indication of the monitoring condition as a search space set group switch indicating at least one of a set of multiple search space set groups that may be active for the group-common downlink control channel monitoring.

In some examples of the method, apparatuses, and non-transitory computer-readable medium described herein, transmitting the explicit indication of the monitoring condition as the search space set group switch may include operations, features, means, or instructions for transmitting the search space set group switch in a DCI message whose cyclic redundancy check is scrambled with a group-common slot format indication radio network temporary identifier configured for the MB S, where the set of multiple search space set groups may be configured via RRC signaling.

In some examples of the method, apparatuses, and non-transitory computer-readable medium described herein, transmitting the explicit indication of the monitoring condition as the search space set group switch may include operations, features, means, or instructions for transmitting the search space set group switch in a DCI message whose cyclic redundancy check is scrambled with a slot format indication radio network temporary identifier, where the set of multiple search space set groups may be configured via RRC signaling.

Some examples of the method, apparatuses, and non-transitory computer-readable medium described herein may further include operations, features, means, or instructions for transmitting an RRC message configuring the set of multiple search space set groups, where the RRC message includes one or more expiration timers pertaining to respective search space set groups.

In some examples of the method, apparatuses, and non-transitory computer-readable medium described herein, transmitting the message may include operations, features, means, or instructions for transmitting an indication of an activity status for the frequency resource, where the frequency resource may be an MBS BWP and the monitoring condition may be the activity status, and where the monitoring condition selectively enables or disables the group-common downlink control channel monitoring based on the activity status.

Some examples of the method, apparatuses, and non-transitory computer-readable medium described herein may further include operations, features, means, or instructions for transmitting an indication of a first activity status of a UE-specific BWP that may be associated with the frequency resource, where the frequency resource may be an MBS BWP within the UE-specific BWP and the monitoring condition may be the first activity status.

Some examples of the method, apparatuses, and non-transitory computer-readable medium described herein may further include operations, features, means, or instructions for transmitting, to the UE, an indication to disable the group-common downlink control channel monitoring based on an MBS traffic threshold being satisfied.

In some examples of the method, apparatuses, and non-transitory computer-readable medium described herein, the monitoring condition disables the group-common downlink control channel monitoring while still performing a CSI measurement, a beam management operation, an uplink feedback transmission, a CSI report transmission, an SRS transmission, or a combination thereof with respect to the frequency resource of the MBS.

Some examples of the method, apparatuses, and non-transitory computer-readable medium described herein may further include operations, features, means, or instructions for receiving a UE-specific ACK or a UE-specific NACK, where the UE-specific ACK or the UE-specific NACK may be received as feedback for receipt of data scheduled by the message.

Some examples of the method, apparatuses, and non-transitory computer-readable medium described herein may further include operations, features, means, or instructions for receiving an ACK or a NACK, where the ACK or the NACK may be received as feedback for receipt of the message.

BRIEF DESCRIPTION OF THE DRAWINGS

FIGS. 3 through 6A and 6B illustrates examples of resource diagrams that support downlink control channel monitoring for MB S in accordance with aspects of the present disclosure.

DETAILED DESCRIPTION

Figure 1:
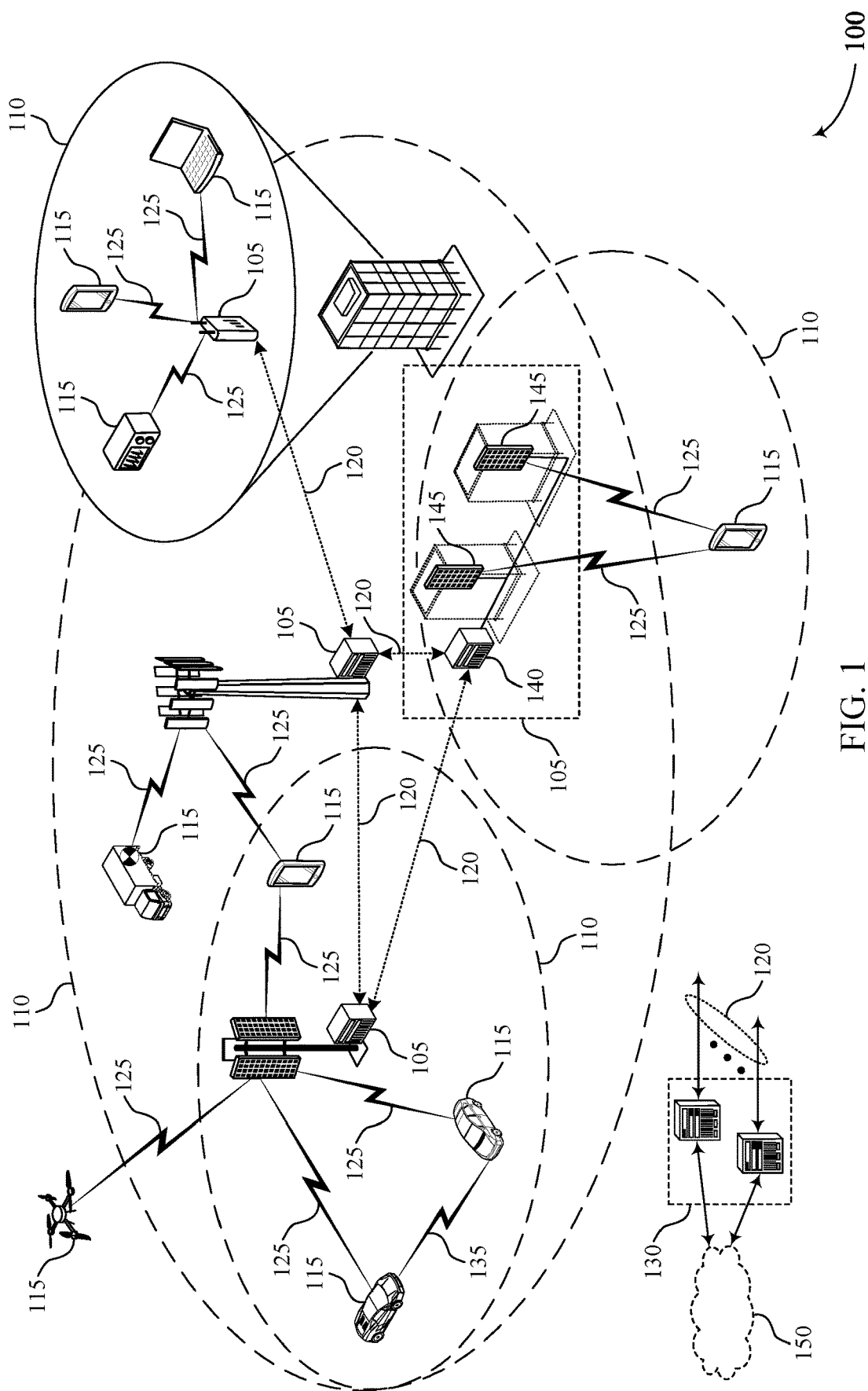
FIGS. 1 and 2 illustrate examples of wireless communications systems that support downlink control channel monitoring for multicast/broadcast services (MBS) in accordance with aspects of the present disclosure.

Some wireless communications systems may support multicast/broadcast service (MBS), which may allow a base station to perform a broadcast or multicast transmission to multiple user equipments (UEs). For example, the base station may transmit a group-common physical downlink control channel (GC-PDCCH) to schedule communications with one or more UEs on a group-common physical shared channel (GC-PDSCH). In some cases, the base station may use a common frequency resource for the group-common channels, such as an MBS bandwidth part (BWP). One or more MBS BWPs may also overlap with an active dedicated unicast BWP, meaning that simultaneous reception of unicast and multicast transmissions in a same slot is possible. In some examples, a UE may monitor for an MBS transmission, a unicast transmission, or both from the base station during one or more active BWPs. However, simultaneous monitoring of a UE-specific downlink channel (e.g., for the unicast transmission) and a group-common downlink channel (e.g., for the MBS transmission) in one or more BWPs may be power consuming at the UE, and may not be necessary if the MBS transmissions are not actually occurring during each slot.

As described herein, a base station may indicate a monitoring condition to a UE, which the UE may apply to enable or disable MBS BWP monitoring or GC-PDCCH monitoring. In some cases, the UE may receive explicit signaling from the base station indicating whether the UE is to enable or disable GC-PDCCH monitoring. For example, a base station may determine the UE has little or no MBS data traffic, and may transmit control signaling, such as radio resource control (RRC) signaling, a medium access control-control element (MAC-CE), a downlink control information (DCI) message, to indicate to the UE that GC-PDCCH monitoring is to be disabled. The UE may continue to monitor a UE-specific downlink control channel even if monitoring of the GC-PDCCH is disabled. The explicit signaling may be in the form of search space set group switching, where each search space set group includes search space sets dedicated to either MBS or UE-specific transmissions, where the switching indicator enables (or disables) monitoring for respective search space set groups. In some other cases, the UE may monitor the group-common downlink control channel based on an activity status of one or more MBS BWPs, which may follow the activity status of an overlapping UE-specific BWP. In some proposals, the UE may determine whether to enable or disable monitoring of the group-common downlink control channel based on a timer. For example, the UE may enable monitoring of the group-common downlink control channel for a timer period after receiving an indication (e.g., and a fallback configuration) to refrain from monitoring the group-common downlink control channel as a default mode when the timer expires.

Aspects of the disclosure are initially described in the context of wireless communications systems. Aspects of the disclosure are further described in the context of resource diagrams and a process flow. Aspects of the disclosure are further illustrated by and described with reference to apparatus diagrams, system diagrams, and flowcharts that relate to downlink control channel monitoring for MBS.

FIG. 1 illustrates an example of a wireless communications system 100 that supports downlink control channel monitoring for MB S in accordance with aspects of the present disclosure. The wireless communications system 100 may include one or more base stations 105, one or more UEs 115, and a core network 130. In some examples, the wireless communications system 100 may be a Long Term Evolution (LTE) network, an LTE-Advanced (LTE-A) network, an LTE-A Pro network, or a New Radio (NR) network. In some examples, the wireless communications system 100 may support enhanced broadband communications, ultra-reliable (e.g., mission critical) communications, low latency communications, communications with low-cost and low-complexity devices, or any combination thereof.

The base stations 105 may be dispersed throughout a geographic area to form the wireless communications system 100 and may be devices in different forms or having different capabilities. The base stations 105 and the UEs 115 may wirelessly communicate via one or more communication links 125. Each base station 105 may provide a coverage area 110 over which the UEs 115 and the base station 105 may establish one or more communication links 125. The coverage area 110 may be an example of a geographic area over which a base station 105 and a UE 115 may support the communication of signals according to one or more radio access technologies.

The UEs 115 may be dispersed throughout a coverage area 110 of the wireless communications system 100, and each UE 115 may be stationary, or mobile, or both at different times. The UEs 115 may be devices in different forms or having different capabilities. Some example UEs 115 are illustrated in FIG. 1. The UEs 115 described herein may be able to communicate with various types of devices, such as other UEs 115, the base stations 105, or network equipment (e.g., core network nodes, relay devices, integrated access and backhaul (IAB) nodes, or other network equipment), as shown in FIG. 1.

The base stations 105 may communicate with the core network 130, or with one another, or both. For example, the base stations 105 may interface with the core network 130 through one or more backhaul links 120 (e.g., via an S1, N2, N3, or other interface). The base stations 105 may communicate with one another over the backhaul links 120 (e.g., via an X2, Xn, or other interface) either directly (e.g., directly between base stations 105), or indirectly (e.g., via core network 130), or both. In some examples, the backhaul links 120 may be or include one or more wireless links.

One or more of the base stations 105 described herein may include or may be referred to by a person having ordinary skill in the art as a base transceiver station, a radio base station, an access point, a radio transceiver, a NodeB, an eNodeB (eNB), a next-generation NodeB or a giga-NodeB (either of which may be referred to as a gNB), a Home NodeB, a Home eNodeB, or other suitable terminology.

A UE 115 may include or may be referred to as a mobile device, a wireless device, a remote device, a handheld device, or a subscriber device, or some other suitable terminology, where the "device" may also be referred to as a unit, a station, a terminal, or a client, among other examples. A UE 115 may also include or may be referred to as a personal electronic device such as a cellular phone, a personal digital assistant (PDA), a tablet computer, a laptop computer, or a personal computer. In some examples, a UE 115 may include or be referred to as a wireless local loop (WLL) station, an Internet of Things (IoT) device, an Internet of Everything (IoE) device, or a machine type communications (MTC) device, among other examples, which may be implemented in various objects such as appliances, or vehicles, meters, among other examples.

The UEs 115 described herein may be able to communicate with various types of devices, such as other UEs 115 that may sometimes act as relays as well as the base stations 105 and the network equipment including macro eNBs or gNBs, small cell eNBs or gNBs, or relay base stations, among other examples, as shown in FIG. 1.

The UEs 115 and the base stations 105 may wirelessly communicate with one another via one or more communication links 125 over one or more carriers. The term "carrier" may refer to a set of radio frequency spectrum resources having a defined physical layer structure for supporting the communication links 125. For example, a carrier used for a communication link 125 may include a portion of a radio frequency spectrum band (e.g., a bandwidth part (BWP)) that is operated according to one or more physical layer channels for a given radio access technology (e.g., LTE, LTE-A, LTE-A Pro, NR). Each physical layer channel may carry acquisition signaling (e.g., synchronization signals, system information), control signaling that coordinates operation for the carrier, user data, or other signaling. The wireless communications system 100 may support communication with a UE 115 using carrier aggregation or multi-carrier operation. A UE 115 may be configured with multiple downlink component carriers and one or more uplink component carriers according to a carrier aggregation configuration. Carrier aggregation may be used with both frequency division duplexing (FDD) and time division duplexing (TDD) component carriers.

In some examples (e.g., in a carrier aggregation configuration), a carrier may also have acquisition signaling or control signaling that coordinates operations for other carriers. A carrier may be associated with a frequency channel (e.g., an evolved universal mobile telecommunication system terrestrial radio access (E-UTRA) absolute radio frequency channel number (EARFCN)) and may be positioned according to a channel raster for discovery by the UEs 115. A carrier may be operated in a standalone mode where initial acquisition and connection may be conducted by the UEs 115 via the carrier, or the carrier may be operated in a non-standalone mode where a connection is anchored using a different carrier (e.g., of the same or a different radio access technology).

The communication links 125 shown in the wireless communications system 100 may include uplink transmissions from a UE 115 to a base station 105, or downlink transmissions from a base station 105 to a UE 115. Carriers may carry downlink or uplink communications (e.g., in an FDD mode) or may be configured to carry downlink and uplink communications (e.g., in a TDD mode).

A carrier may be associated with a particular bandwidth of the radio frequency spectrum, and in some examples the carrier bandwidth may be referred to as a "system bandwidth" of the carrier or the wireless communications system 100. For example, the carrier bandwidth may be one of a number of determined bandwidths for carriers of a particular radio access technology (e.g., 1.4, 3, 5, 10, 15, 20, 40, or 80 megahertz (MHz)). Devices of the wireless communications system 100 (e.g., the base stations 105, the UEs 115, or both) may have hardware configurations that support communications over a particular carrier bandwidth or may be configurable to support communications over one of a set of carrier bandwidths. In some examples, the wireless communications system 100 may include base stations 105 or UEs 115 that support simultaneous communications via carriers associated with multiple carrier bandwidths. In some examples, each served UE 115 may be configured for operating over portions (e.g., a sub-band, a BWP) or all of a carrier bandwidth.

Signal waveforms transmitted over a carrier may be made up of multiple subcarriers (e.g., using multi-carrier modulation (MCM) techniques such as orthogonal frequency division multiplexing (OFDM) or discrete Fourier transform spread OFDM (DFT-S-OFDM)). In a system employing MCM techniques, a resource element may consist of one symbol period (e.g., a duration of one modulation symbol) and one subcarrier, where the symbol period and subcarrier spacing are inversely related. The number of bits carried by each resource element may depend on the modulation scheme (e.g., the order of the modulation scheme, the coding rate of the modulation scheme, or both). Thus, the more resource elements that a UE 115 receives and the higher the order of the modulation scheme, the higher the data rate may be for the UE 115. A wireless communications resource may refer to a combination of a radio frequency spectrum resource, a time resource, and a spatial resource (e.g., spatial layers or beams), and the use of multiple spatial layers may further increase the data rate or data integrity for communications with a UE 115.

One or more numerologies for a carrier may be supported, where a numerology may include a subcarrier spacing ($\Delta f$) and a cyclic prefix. A carrier may be divided into one or more BWPs having the same or different numerologies. In some examples, a UE 115 may be configured with multiple BWPs. In some examples, a single BWP for a carrier may be active at a given time and communications for the UE 115 may be restricted to one or more active BWPs.

The time intervals for the base stations 105 or the UEs 115 may be expressed in multiples of a basic time unit which may, for example, refer to a sampling period of $T_s=1/(\Delta f_{max} \cdot N_f)$ seconds, where $\Delta f_{max}$ may represent the maximum supported subcarrier spacing, and $N_f$ may represent the maximum supported discrete Fourier transform (DFT) size. Time intervals of a communications resource may be organized according to radio frames each having a specified duration (e.g., 10 milliseconds (ms)). Each radio frame may be identified by a system frame number (SFN) (e.g., ranging from 0 to 1023).

Each frame may include multiple consecutively numbered subframes or slots, and each subframe or slot may have the same duration. In some examples, a frame may be divided (e.g., in the time domain) into subframes, and each subframe may be further divided into a number of slots. Alternatively, each frame may include a variable number of slots, and the number of slots may depend on subcarrier spacing. Each slot may include a number of symbol periods (e.g., depending on the length of the cyclic prefix prepended to each symbol period). In some wireless communications systems 100, a slot may further be divided into multiple mini-slots containing one or more symbols. Excluding the cyclic prefix, each symbol period may contain one or more (e.g., $N_f$) sampling periods. The duration of a symbol period may depend on the subcarrier spacing or frequency band of operation.

A subframe, a slot, a mini-slot, or a symbol may be the smallest scheduling unit (e.g., in the time domain) of the wireless communications system 100 and may be referred to as a transmission time interval (TTI). In some examples, the TTI duration (e.g., the number of symbol periods in a TTI) may be variable. Additionally or alternatively, the smallest scheduling unit of the wireless communications system 100 may be dynamically selected (e.g., in bursts of shortened TTIs (sTTIs)).

Physical channels may be multiplexed on a carrier according to various techniques. A physical control channel and a physical data channel may be multiplexed on a downlink carrier, for example, using one or more of time division multiplexing (TDM) techniques, frequency division multiplexing (FDM) techniques, or hybrid TDM-FDM techniques. A control region (e.g., a control resource set (CORE-SET)) for a physical control channel may be defined by a number of symbol periods and may extend across the system bandwidth or a subset of the system bandwidth of the carrier. One or more control regions (e.g., CORESETs) may be configured for a set of the UEs 115. For example, one or more of the UEs 115 may monitor or search control regions for control information according to one or more search space sets, and each search space set may include one or multiple control channel candidates in one or more aggregation levels arranged in a cascaded manner. An aggregation level for a control channel candidate may refer to a number of control channel resources (e.g., control channel elements (CCEs)) associated with encoded information for a control information format having a given payload size. Search space sets may include common search space sets configured for sending control information to multiple UEs 115 and UE-specific search space sets for sending control information to a specific UE 115.

Each base station 105 may provide communication coverage via one or more cells, for example a macro cell, a small cell, a hot spot, or other types of cells, or any combination thereof. The term "cell" may refer to a logical communication entity used for communication with a base station 105 (e.g., over a carrier) and may be associated with an identifier for distinguishing neighboring cells (e.g., a physical cell identifier (PCID), a virtual cell identifier (VCID), or others). In some examples, a cell may also refer to a geographic coverage area 110 or a portion of a geographic coverage area 110 (e.g., a sector) over which the logical communication entity operates. Such cells may range from smaller areas (e.g., a structure, a subset of structure) to larger areas depending on various factors such as the capabilities of the base station 105. For example, a cell may be or include a building, a subset of a building, or exterior spaces between or overlapping with geographic coverage areas 110, among other examples.

A macro cell generally covers a relatively large geographic area (e.g., several kilometers in radius) and may allow unrestricted access by the UEs 115 with service subscriptions with the network provider supporting the macro cell. A small cell may be associated with a lower-powered base station 105, as compared with a macro cell, and a small cell may operate in the same or different (e.g., licensed, unlicensed) frequency bands as macro cells. Small cells may provide unrestricted access to the UEs 115 with service subscriptions with the network provider or may provide restricted access to the UEs 115 having an association with the small cell (e.g., the UEs 115 in a closed subscriber group (CSG), the UEs 115 associated with users in a home or office). A base station 105 may support one or multiple cells and may also support communications over the one or more cells using one or multiple component carriers.

In some examples, a carrier may support multiple cells, and different cells may be configured according to different protocol types (e.g., MTC, narrowband IoT (NB-IoT), enhanced mobile broadband (eMBB)) that may provide access for different types of devices.

In some examples, a base station 105 may be movable and therefore provide communication coverage for a moving geographic coverage area 110. In some examples, different geographic coverage areas 110 associated with different technologies may overlap, but the different geographic coverage areas 110 may be supported by the same base station 105. In other examples, the overlapping geographic coverage areas 110 associated with different technologies may be supported by different base stations 105. The wireless communications system 100 may include, for example, a heterogeneous network in which different types of the base stations 105 provide coverage for various geographic coverage areas 110 using the same or different radio access technologies.

The wireless communications system 100 may support synchronous or asynchronous operation. For synchronous operation, the base stations 105 may have similar frame timings, and transmissions from different base stations 105 may be approximately aligned in time. For asynchronous operation, the base stations 105 may have different frame timings, and transmissions from different base stations 105 may, in some examples, not be aligned in time. The techniques described herein may be used for either synchronous or asynchronous operations.

Some UEs 115, such as MTC or IoT devices, may be low cost or low complexity devices and may provide for automated communication between machines (e.g., via Machine-to-Machine (M2M) communication). M2M communication or MTC may refer to data communication technologies that allow devices to communicate with one another or a base station 105 without human intervention. In some examples, M2M communication or MTC may include communications from devices that integrate sensors or meters to measure or capture information and relay such information to a central server or application program that makes use of the information or presents the information to humans interacting with the application program. Some UEs 115 may be designed to collect information or enable automated behavior of machines or other devices. Examples of applications for MTC devices include smart metering, inventory monitoring, water level monitoring, equipment monitoring, healthcare monitoring, wildlife monitoring, weather and geological event monitoring, fleet management and tracking, remote security sensing, physical access control, and transaction-based business charging.

Some UEs 115 may be configured to employ operating modes that reduce power consumption, such as half-duplex communications (e.g., a mode that supports one-way communication via transmission or reception, but not transmission and reception simultaneously). In some examples, half-duplex communications may be performed at a reduced peak rate. Other power conservation techniques for the UEs 115 include entering a power saving deep sleep mode when not engaging in active communications, operating over a limited bandwidth (e.g., according to narrowband communications), or a combination of these techniques. For example, some UEs 115 may be configured for operation using a narrowband protocol type that is associated with a defined portion or range (e.g., set of subcarriers or resource blocks (RBs)) within a carrier, within a guard-band of a carrier, or outside of a carrier.

The wireless communications system 100 may be configured to support ultra-reliable communications or low-latency communications, or various combinations thereof. For example, the wireless communications system 100 may be configured to support ultra-reliable low-latency communications (URLLC) or mission critical communications. The UEs 115 may be designed to support ultra-reliable, low-latency, or critical functions (e.g., mission critical functions). Ultra-reliable communications may include private communication or group communication and may be supported by one or more mission critical services such as mission critical push-to-talk (MCPTT), mission critical video (MCVideo), or mission critical data (MCData). Support for mission critical functions may include prioritization of services, and mission critical services may be used for public safety or general commercial applications. The terms ultra-reliable, low-latency, mission critical, and ultra-reliable low-latency may be used interchangeably herein.

In some examples, a UE 115 may also be able to communicate directly with other UEs 115 over a device-to-device (D2D) communication link 135 (e.g., using a peer-to-peer (P2P) or D2D protocol). One or more UEs 115 utilizing D2D communications may be within the geographic coverage area 110 of a base station 105. Other UEs 115 in such a group may be outside the geographic coverage area 110 of a base station 105 or be otherwise unable to receive transmissions from a base station 105. In some examples, groups of the UEs 115 communicating via D2D communications may utilize a one-to-many (1:M) system in which each UE 115 transmits to every other UE 115 in the group. In some examples, a base station 105 facilitates the scheduling of resources for D2D communications. In other cases, D2D communications are carried out between the UEs 115 without the involvement of a base station 105.

In some systems, the D2D communication link 135 may be an example of a communication channel, such as a sidelink communication channel, between vehicles (e.g., UEs 115). In some examples, vehicles may communicate using vehicle-to-everything (V2X) communications, vehicle-to-vehicle (V2V) communications, or some combination of these. A vehicle may signal information related to traffic conditions, signal scheduling, weather, safety, emergencies, or any other information relevant to a V2X system. In some examples, vehicles in a V2X system may communicate with roadside infrastructure, such as roadside units, or with the network via one or more network nodes (e.g., base stations 105) using vehicle-to-network (V2N) communications, or with both.

The core network 130 may provide user authentication, access authorization, tracking, Internet Protocol (IP) connectivity, and other access, routing, or mobility functions. The core network 130 may be an evolved packet core (EPC) or 5G core (5GC), which may include at least one control plane entity that manages access and mobility (e.g., a mobility management entity (MME), an access and mobility management function (AMF)) and at least one user plane entity that routes packets or interconnects to external networks (e.g., a serving gateway (S-GW), a Packet Data Network (PDN) gateway (P-GW), or a user plane function (UPF)). The control plane entity may manage non-access stratum (NAS) functions such as mobility, authentication, and bearer management for the UEs 115 served by the base stations 105 associated with the core network 130. User IP packets may be transferred through the user plane entity, which may provide IP address allocation as well as other functions. The user plane entity may be connected to IP services 150 for one or more network operators. The IP services 150 may include access to the Internet, Intranet(s), an IP Multimedia Subsystem (IMS), or a Packet-Switched Streaming Service.

Some of the network devices, such as a base station 105, may include subcomponents such as an access network entity 140, which may be an example of an access node controller (ANC). Each access network entity 140 may communicate with the UEs 115 through one or more other access network transmission entities 145, which may be referred to as radio heads, smart radio heads, or transmission/reception points (TRPs). Each access network transmission entity 145 may include one or more antenna panels. In some configurations, various functions of each access network entity 140 or base station 105 may be distributed across various network devices (e.g., radio heads and ANCs) or consolidated into a single network device (e.g., a base station 105).

The wireless communications system 100 may operate using one or more frequency bands, typically in the range of 300 megahertz (MHz) to 300 gigahertz (GHz). Generally, the region from 300 MHz to 3 GHz is known as the ultra-high frequency (UHF) region or decimeter band because the wavelengths range from approximately one decimeter to one meter in length. The UHF waves may be blocked or redirected by buildings and environmental features, but the waves may penetrate structures sufficiently for a macro cell to provide service to the UEs 115 located indoors. The transmission of UHF waves may be associated with smaller antennas and shorter ranges (e.g., less than 100 kilometers) compared to transmission using the smaller frequencies and longer waves of the high frequency (HF) or very high frequency (VHF) portion of the spectrum below 300 MHz.

The wireless communications system 100 may also operate in a super high frequency (SHF) region using frequency bands from 3 GHz to 30 GHz, also known as the centimeter band, or in an extremely high frequency (EHF) region of the spectrum (e.g., from 30 GHz to 300 GHz), also known as the millimeter band. In some examples, the wireless communications system 100 may support millimeter wave (mmW) communications between the UEs 115 and the base stations 105, and EHF antennas of the respective devices may be smaller and more closely spaced than UHF antennas. In some examples, this may facilitate use of antenna arrays within a device. The propagation of EHF transmissions, however, may be subject to even greater atmospheric attenuation and shorter range than SHF or UHF transmissions. The techniques disclosed herein may be employed across transmissions that use one or more different frequency regions, and designated use of bands across these frequency regions may differ by country or regulating body.

The wireless communications system 100 may utilize both licensed and unlicensed radio frequency spectrum bands. For example, the wireless communications system 100 may employ License Assisted Access (LAA), LTE-Unlicensed (LTE-U) radio access technology, or NR technology in an unlicensed band such as the 5 GHz industrial, scientific, and medical (ISM) band. When operating in unlicensed radio frequency spectrum bands, devices such as the base stations 105 and the UEs 115 may employ carrier sensing for collision detection and avoidance. In some examples, operations in unlicensed bands may be based on a carrier aggregation configuration in conjunction with component carriers operating in a licensed band (e.g., LAA). Operations in unlicensed spectrum may include downlink transmissions, uplink transmissions, P2P transmissions, or D2D transmissions, among other examples.

A base station 105 or a UE 115 may be equipped with multiple antennas, which may be used to employ techniques such as transmit diversity, receive diversity, multiple-input multiple-output (MIMO) communications, or beamforming. The antennas of a base station 105 or a UE 115 may be located within one or more antenna arrays or antenna panels, which may support MIMO operations or transmit or receive beamforming. For example, one or more base station antennas or antenna arrays may be co-located at an antenna assembly, such as an antenna tower. In some examples, antennas or antenna arrays associated with a base station 105 may be located in diverse geographic locations. A base station 105 may have an antenna array with a number of rows and columns of antenna ports that the base station 105 may use to support beamforming of communications with a UE 115. Likewise, a UE 115 may have one or more antenna arrays that may support various MIMO or beamforming operations. Additionally or alternatively, an antenna panel may support radio frequency beamforming for a signal transmitted via an antenna port.

The base stations 105 or the UEs 115 may use MIMO communications to exploit multipath signal propagation and increase the spectral efficiency by transmitting or receiving multiple signals via different spatial layers. Such techniques may be referred to as spatial multiplexing. The multiple signals may, for example, be transmitted by the transmitting device via different antennas or different combinations of antennas. Likewise, the multiple signals may be received by the receiving device via different antennas or different combinations of antennas. Each of the multiple signals may be referred to as a separate spatial stream and may carry bits associated with the same data stream (e.g., the same codeword) or different data streams (e.g., different codewords). Different spatial layers may be associated with different antenna ports used for channel measurement and reporting. MIMO techniques include single-user MIMO (SU-MIMO), where multiple spatial layers are transmitted to the same receiving device, and multiple-user MIMO (MU-MIMO), where multiple spatial layers are transmitted to multiple devices.

Beamforming, which may also be referred to as spatial filtering, directional transmission, or directional reception, is a signal processing technique that may be used at a transmitting device or a receiving device (e.g., a base station 105, a UE 115) to shape or steer an antenna beam (e.g., a transmit beam, a receive beam) along a spatial path between the transmitting device and the receiving device. Beamforming may be achieved by combining the signals communicated via antenna elements of an antenna array such that some signals propagating at particular orientations with respect to an antenna array experience constructive interference while others experience destructive interference. The adjustment of signals communicated via the antenna elements may include a transmitting device or a receiving device applying amplitude offsets, phase offsets, or both to signals carried via the antenna elements associated with the device. The adjustments associated with each of the antenna elements may be defined by a beamforming weight set associated with a particular orientation (e.g., with respect to the antenna array of the transmitting device or receiving device, or with respect to some other orientation).

A base station 105 or a UE 115 may use beam sweeping techniques as part of beam forming operations. For example, a base station 105 may use multiple antennas or antenna arrays (e.g., antenna panels) to conduct beamforming operations for directional communications with a UE 115. Some signals (e.g., synchronization signals, reference signals, beam selection signals, or other control signals) may be transmitted by a base station 105 multiple times in different directions. For example, the base station 105 may transmit a signal according to different beamforming weight sets associated with different directions of transmission. Transmissions in different beam directions may be used to identify (e.g., by a transmitting device, such as a base station 105, or by a receiving device, such as a UE 115) a beam direction for later transmission or reception by the base station 105.

Some signals, such as data signals associated with a particular receiving device, may be transmitted by a base station 105 in a single beam direction (e.g., a direction associated with the receiving device, such as a UE 115). In some examples, the beam direction associated with transmissions along a single beam direction may be determined based on a signal that was transmitted in one or more beam directions. For example, a UE 115 may receive one or more of the signals transmitted by the base station 105 in different directions and may report to the base station 105 an indication of the signal that the UE 115 received with a highest signal quality or an otherwise acceptable signal quality.

In some examples, transmissions by a device (e.g., by a base station 105 or a UE 115) may be performed using multiple beam directions, and the device may use a combination of digital precoding or radio frequency beamforming to generate a combined beam for transmission (e.g., from a base station 105 to a UE 115). The UE 115 may report feedback that indicates precoding weights for one or more beam directions, and the feedback may correspond to a configured number of beams across a system bandwidth or one or more sub-bands. The base station 105 may transmit a reference signal (e.g., a cell-specific reference signal (CRS), a channel state information reference signal (CSI-RS)), which may be precoded or unprecoded. The UE 115 may provide feedback for beam selection, which may be a precoding matrix indicator (PMI) or codebook-based feedback (e.g., a multi-panel type codebook, a linear combination type codebook, a port selection type codebook). Although these techniques are described with reference to signals transmitted in one or more directions by a base station 105, a UE 115 may employ similar techniques for transmitting signals multiple times in different directions (e.g., for identifying a beam direction for subsequent transmission or reception by the UE 115) or for transmitting a signal in a single direction (e.g., for transmitting data to a receiving device).

A receiving device (e.g., a UE 115) may try multiple receive configurations (e.g., directional listening) when receiving various signals from the base station 105, such as synchronization signals, reference signals, beam selection signals, or other control signals. For example, a receiving device may try multiple receive directions by receiving via different antenna subarrays, by processing received signals according to different antenna subarrays, by receiving according to different receive beamforming weight sets (e.g., different directional listening weight sets) applied to signals received at multiple antenna elements of an antenna array, or by processing received signals according to different receive beamforming weight sets applied to signals received at multiple antenna elements of an antenna array, any of which may be referred to as "listening" according to different receive configurations or receive directions. In some examples, a receiving device may use a single receive configuration to receive along a single beam direction (e.g., when receiving a data signal). The single receive configuration may be aligned in a beam direction determined based on listening according to different receive configuration directions (e.g., a beam direction determined to have a highest signal strength, highest signal-to-noise ratio (SNR), or otherwise acceptable signal quality based on listening according to multiple beam directions).

The wireless communications system 100 may be a packet-based network that operates according to a layered protocol stack. In the user plane, communications at the bearer or Packet Data Convergence Protocol (PDCP) layer may be IP-based. A Radio Link Control (RLC) layer may perform packet segmentation and reassembly to communicate over logical channels. A Medium Access Control (MAC) layer may perform priority handling and multiplexing of logical channels into transport channels. The MAC layer may also use error detection techniques, error correction techniques, or both to support retransmissions at the MAC layer to improve link efficiency. In the control plane, the RRC protocol layer may provide establishment, configuration, and maintenance of an RRC connection between a UE 115 and a base station 105 or a core network 130 supporting radio bearers for user plane data. At the physical layer, transport channels may be mapped to physical channels.

The UEs 115 and the base stations 105 may support retransmissions of data to increase the likelihood that data is received successfully. Hybrid automatic repeat request (HARQ) feedback is one technique for increasing the likelihood that data is received correctly over a communication link 125. HARQ may include a combination of error detection (e.g., using a cyclic redundancy check (CRC)), forward error correction (FEC), and retransmission (e.g., automatic repeat request (ARQ)). HARQ may improve throughput at the MAC layer in poor radio conditions (e.g., low signal-to-noise conditions). In some examples, a device may support same-slot HARQ feedback, where the device may provide HARQ feedback in a specific slot for data received in a previous symbol in the slot. In other cases, the device may provide HARQ feedback in a subsequent slot, or according to some other time interval.

In some cases, a UE 115 may monitor one or more channels for signaling from a base station 105. For example, the UE 115 may monitor multiple downlink control channels (e.g., a physical downlink control channel (PDCCH) and a GC-PDCCH) for one or more messages scheduling transmissions on downlink shared channels. In some examples, the UE 115 may support a group-common downlink control channel (e.g., GC-PDCCH) that may schedule transmissions to one or more UEs 115 on a GC-PDSCH. The base station 105 may configure the UEs 115 with one or more common frequency resources (e.g., MBS BWPs) within a frequency resource of a dedicated unicast BWP to support simultaneous reception of unicast and multicast transmissions. However, simultaneous monitoring of UE-specific PDCCHs and GC-PDCCHs in one or more MBS BWPs is power consuming at the UE 115.

In some examples, a base station 105 may configure a UE 115 to control PDCCH monitoring for multicast transmissions, which may reduce power consumption related to group-common downlink control channel (e.g., a GC-PDCCH) monitoring at the UE 115. For example, the base station 105 may configure the UE 115 with a monitoring condition to disable monitoring of the GC-PDCCH within a frequency resource. In some cases, the base station may transmit an indication of a frequency resource and a monitoring condition for a GC-PDCCH within the frequency resource. The indication of the frequency resource may include an indication of one or more MBS BWPs, search space set groups, or a combination thereof. The monitoring condition for the GC-PDCCH may indicate to the UE 115 to disable monitoring within the frequency resources or to enable monitoring within the frequency resources. In some examples, the base station 105 may transmit the monitoring condition for the GC-PDCCH to the UE 115 via an explicit indication. In some examples, the UE 115 may monitor the GC-PDCCH, a UE-specific PDCCH, or both for scheduling information from the base station 105 according to the monitoring condition.

Figure 2:
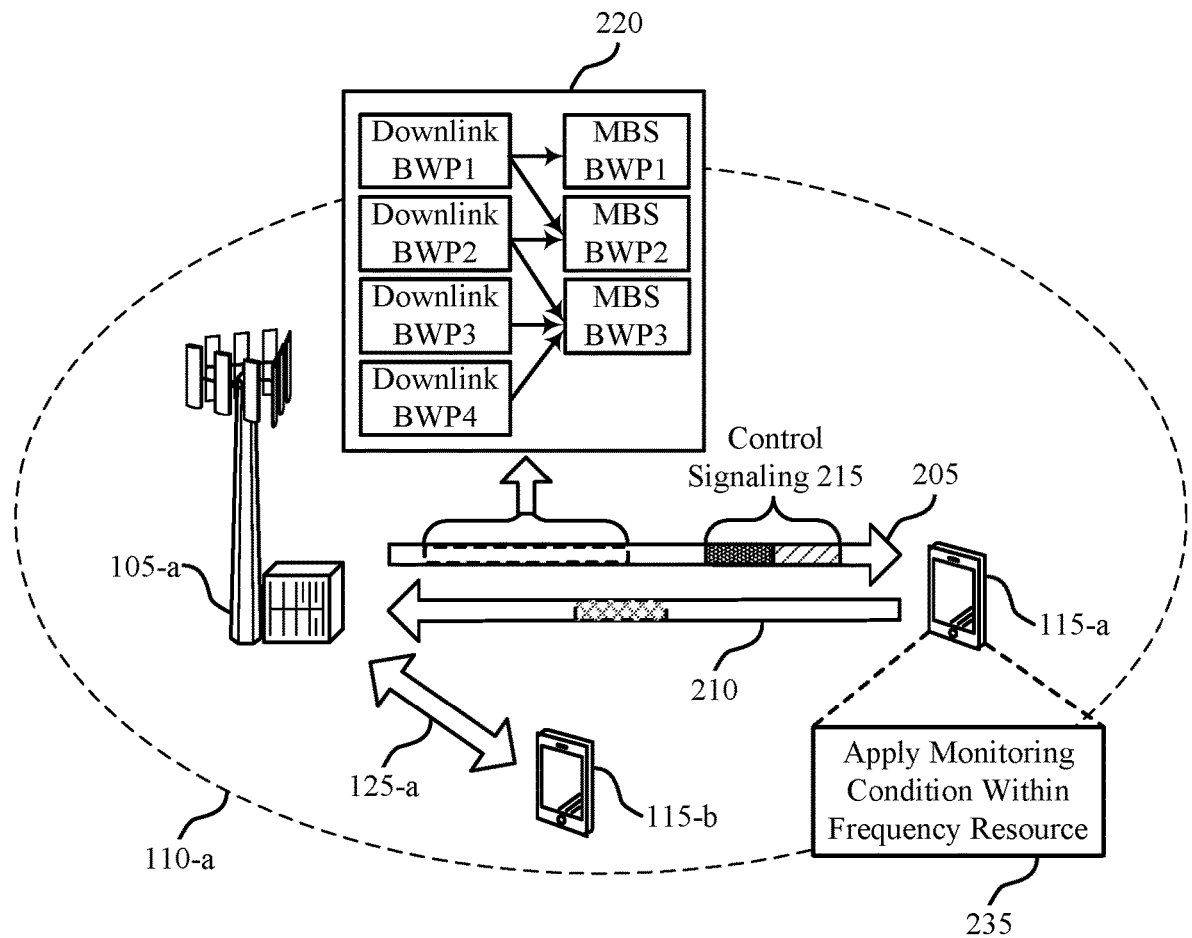

FIG. 2 illustrates an example of a wireless communications system 200 that supports downlink control channel monitoring for MBS in accordance with aspects of the present disclosure. In some examples, wireless communications system 200 may implement aspects of wireless communication system 100 and may include UE 115-a, UE 115-b, base station 105-a with coverage area 110-a, and communication link 125-a, which may be examples of UEs 115, a base station 105 with a coverage area 110, and a communication link 125 as described with reference to FIG. 1. In some examples, base station 105-a may perform a broadcast or multicast transmission to multiple UEs 115 (e.g., to UEs 115-a and UE 115-b), may perform a unicast transmission to each UE 115, or both. For example, base station 105-a may communicate with UE 115-a by transmitting control signaling or data (e.g., a broadcast message, a unicast message, or both) via downlink communication link 205, receiving control signaling or data via uplink communication link 210, or both. Similarly, base station 105-a may communicate with UE 115-b via communication link 125-a, which may have uplink and downlink capability. In some cases, base station 105-a may transmit control signaling 215 to UE 115-a, UE 115-b, or both that may indicate a monitoring condition for the UE to enable or disable monitoring for one or more channels (e.g., a GC-PDCCH).

In some cases, a UE 115, such as UE 115-a, UE 115-b, or both, may monitor one or more channels for signaling from base station 105-a. For example, UE 115-a may monitor multiple downlink control channels (e.g., a PDCCH and a GC-PDCCH) for one or more messages scheduling transmissions on downlink shared channels. In some cases, the UE 115 may be in an RRC connected state in which a base station 105 configures the UE 115 with parameters for communication, an RRC inactive state or an RRC idle state in which the base station 105 configures the UE with a discontinuous reception (DRX) cycle to wake up periodically and monitor for paging messages, or the like. In some examples, the UEs 115 may support a group-common downlink control channel (e.g., GC-PDCCH) including CRC information that the base station 105 may scramble with a common radio network temporary identifier (RNTI). The GC-PDCCH may schedule transmissions to the UEs 115 on a GC-PDSCH (e.g., using one or more common frequency resources), where the base station 105 may scramble the transmissions using the common RNTI. For simplicity, the group-common downlink control channel may be referred to as a GC-PDCCH; however, the GC-PDCCH may be substituted by any downlink control channel for multicast services, broadcast services, or both.

In some cases, such as for UEs 115 in an RRC inactive or RRC idle state, the base station 105 may configure the UEs 115 with common frequency resources for signaling using the GC-PDCCH, GC-PDSCH, or both. If the base station 105 does not configure the common frequency resource, the UEs 115 may determine an initial frequency resource (e.g., an initial BWP for both a broadcast system information block (SIB) and paging or MBS transmissions) as a default common frequency resource for a GC-PDCCH, a GC-PDSCH, or both. In some examples, for multicast transmissions to UEs 115 in an RRC connected state, the base station 105 may configure a common frequency resource for the GC-PDCCH, GC-PDSCH, or both within the frequency resource of a dedicated unicast BWP (e.g., a downlink BWP) to support simultaneous reception of unicast and multicast in the same slot (e.g., a slot in time). If the base station 105 does not configure the common frequency resource, the UEs 115 may determine the same frequency resource of a dedicated BWP for unicast transmission as a default common frequency resource for a GC-PDCCH, a GC-PDSCH, or both. The UEs 115 may down select from one or more common frequency resources for the multicast transmissions. For example, the UEs 115 may select an MBS specific BWP (e.g., an MBS BWP), which may be associated with the dedicated unicast BWP and may use a similar numerology (e.g., the same subcarrier spacing (SCS) and cyclic prefix (CP)). In some examples, the UEs 115 may select an MBS frequency region with a number of contiguous physical resource blocks (PRBs), which may be within the dedicated unicast BWP. That is, the one or more common frequency resources for the multicast transmissions (e.g., one or more MBS BWPs) may be within a dedicated BWP for RRC connected UEs 115.

In some examples, an MBS BWP may share resources (e.g., time resources, frequency resources, or both) with one or more dedicated BWPs, which may be referred to as downlink BWPs. Similarly, a dedicated BWP may include one or more MBS BWPs. For example, resource scheme 220 may illustrate an example of frequency resources for a downlink communication link 205 in which Downlink BWP1 may include MBS BWP1 and MBS BWP2, Downlink BWP2 may include MBS BWP2 and MBS BWP3, Downlink BWP3 may include MBS BWP3, and Downlink BWP4 may include MBS BWP3. When a dedicated BWP is active, a UE 115, such as UE 115-a, UE 115-b, or both, may monitor an MBS PDCCH in the MBS BWPs included in the dedicated BWP and a unicast PDCCH within the dedicated BWP. The unicast PDCCH (e.g., a UE-specific PDCCH) may include a DCI message with a UE-specific RNTI (e.g., a cell-RNTI (C-RNTI)). The MBS PDCCH (e.g., a GC-PDCCH) may include a DCI message with a group-common RNTI (e.g., a group-RNTI (G-RNTI)). However, simultaneous monitoring of UE-specific PDCCHs and GC-PDCCHs in one or more MBS BWPs is power consuming at the UE 115. Additionally, the UE 115 allocating blind decoding resources and control channel elements (CCEs) for the GC-PDCCH may reduce the number of blind decoding resources and CCEs for scheduling of the UE-specific PDCCH (e.g., because the total number of blind decoding resources and CCEs may be based on a UE capability).

In some cases, a base station 105 may configure a UE 115 to control PDCCH monitoring for multicast transmissions, which may reduce power consumption related to group-common downlink control channel (e.g., GC-PDCCH) monitoring at the UE 115. For example, base station 105-a may determine UE 115-a may have a low traffic load for an MBS transmission. Thus, base station 105-a may configure UE 115-a with a monitoring condition to disable monitoring of the GC-PDCCH within a frequency resource configured for the corresponding MBS transmission. In some cases, base station 105-a may transmit control signaling 215, which may include a frequency resource indication 225 and a monitoring condition for the GC-PDCCH 230. The frequency resource indication 225 may include an indication of one or more MBS BWPs, search space set groups, or a combination thereof. The monitoring condition for the GC-PDCCH 230 may indicate to UE 115-a to disable monitoring within the frequency resources or to enable monitoring within the frequency resources. In some examples, base station 105-a may transmit the monitoring condition for the GC-PDCCH 230 to UE 115-a via an explicit indication, which is described in further detail with respect to FIG. 3. That is, base station 105-a may explicitly signal to UE 115-a to enable or disable GC-PDCCH monitoring in an MBS BWP, to perform search space set group switching (e.g., for a unicast transmission, a multicast transmission, or both), or a combination thereof.

In some examples, if base station 105-a does not configure UE 115-a with a DRX cycle for MBS, base station 105-a may dynamically indicate the monitoring condition for the GC-PDCCH 230 to UE 115-a. In some other examples, if base station 105-a does configure UE 115-a with a DRX cycle for MBS, base station 105-a may configure UE 115-a with the monitoring condition for the GC-PDCCH 230, such that UE 115-a may disable monitoring the GC-PDCCH prior to a DRX inactivity timer expiring, which is described in further detail with respect to FIG. 4. In some cases, at 235, UE 115-a may apply the monitoring condition within the frequency resource. For example, UE 115-a may disable or enable monitoring for a GC-PDCCH within the frequency resource. In some examples, UE 115-a may disable monitoring for the GC-PDCCH within the frequency resource when there is little or no MBS data traffic. If UE 115-a disables monitoring for the GC-PDCCH, UE 115-a may continue to perform channel state information (CSI) measurements, beam management, feedback transmissions, CSI report transmission, sounding reference signal (SRS) transmission, or a combination thereof, which is described in further detail with respect to FIG. 5. In some cases, even if UE 115-a disables GC-PDCCH monitoring, UE 115-a may monitor for a retransmission of the last GC-PDSCH based on a feedback message 240, which is described in further detail with respect to FIGS. 6A and 6B. For example, UE 115-a may transmit a negative acknowledgment (NACK) or an acknowledgement (ACK) in a shared uplink control channel (e.g., a physical uplink control channel (PUCCH)) resource or in a UE-specific uplink control channel resource based on receipt of a data transmission from base station 105-a, based on receipt of the control signaling 215, or both. In some examples, UE 115-a may monitor the GC-PDCCH, a UE-specific PDCCH, or both for scheduling information from base station 105-a according to the monitoring condition.

Figure 3:
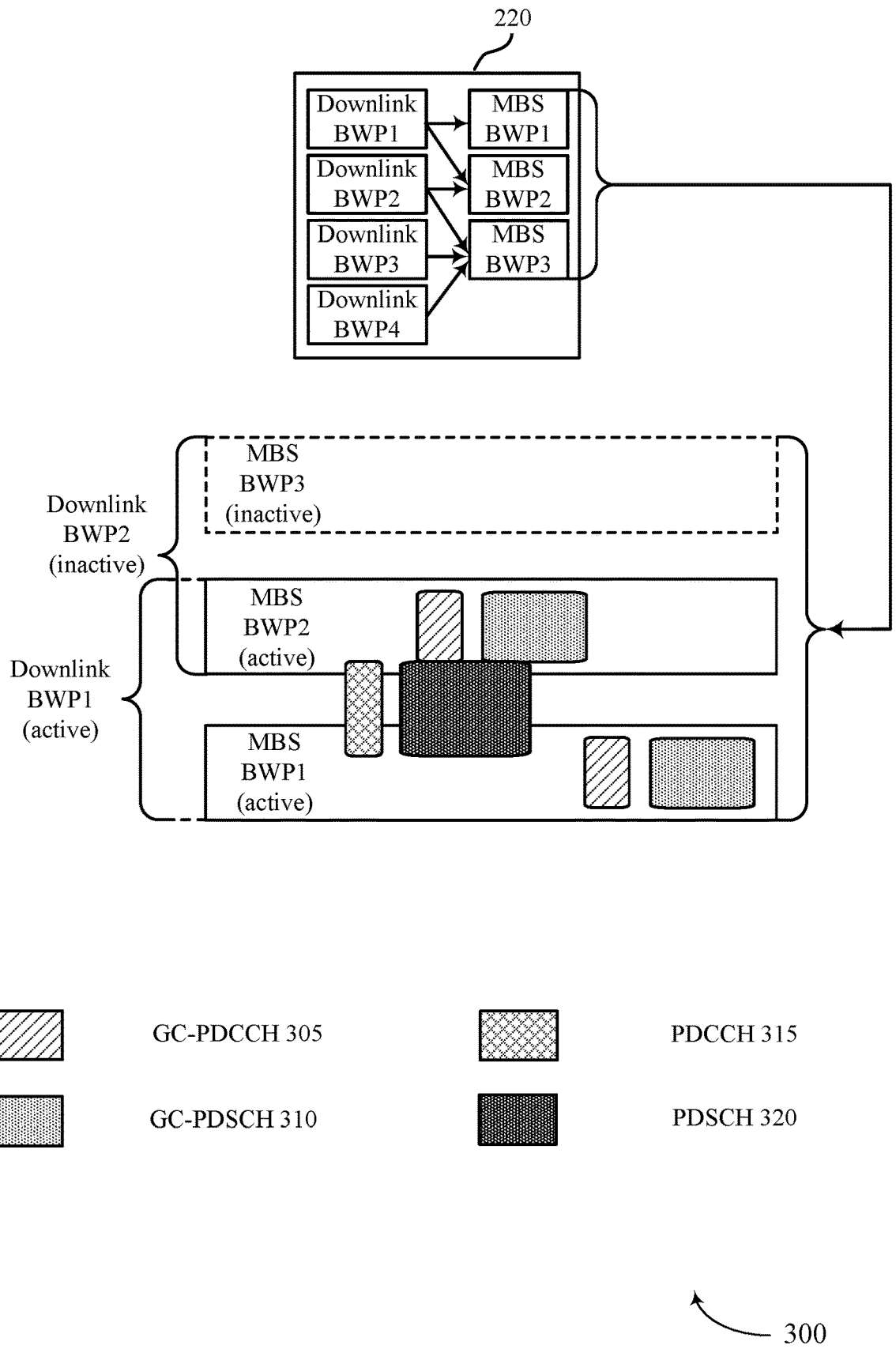

FIG. 3 illustrates an example of a resource diagram 300 that supports downlink control channel monitoring for MBS in accordance with aspects of the present disclosure. In some examples, resource diagram 300 may implement aspects of wireless communication system 100 and wireless communications system 200. For example, resource diagram 300 may be implemented by a UE 115 and a base station 105 as described with reference to FIGS. 1 and 2. In some cases, a base station may transmit control signaling to a UE including a monitoring condition for a GC-PDCCH 305 for one or more frequency resources, such as MBS BWPs. The base station may transmit scheduling information on the GC-PDCCH 305 for one or more data transmissions on a GC-PDSCH 310. The MBS BWPs may share resources (e.g., time resources, frequency resources, or both) with one or more dedicated BWPs, which may be referred to as downlink BWPs, as shown in resource scheme 220 and as described with reference to FIG. 2.

In some examples, a UE and a base station may communicate using one or more frequency resources, such as MBS BWPs, downlink BWPs, or both. The MBS BWPs may overlap with the downlink BWPs. For example, Downlink BWP1 may include MBS BWP1 and MBS BWP2, while Downlink BWP2 may include MBS BWP2 and MBS BWP3. The BWPs may have an activity status, which may indicate the BWP is an active BWP or an inactive BWP. The base station may transmit a configuration to the UE indicating which BWPs are active. For example, the base station may indicate to the UE that Downlink BWP2 and MBS BWP3 are inactive or dormant and Downlink BWP1, MBS BWP1 and MBS BWP2 are active or non-dormant. In some cases, a network may configure a dormant MBS BWP on a primary cell (PCell), a primary secondary cell (PSCell), a secondary cell (SCell), or a combination thereof for UEs in an RRC connected state.

In some cases, dormant to non-dormant or non-dormant to dormant MBS BWP transitions may depend on the status of the associated downlink BWP (e.g., a dedicated downlink BWP). However, if an MBS BWP is associated with more than one downlink BWP, the active downlink BWP may determine the status of the MBS BWP if one is available. For example, MBS BWP3 may be associated with Downlink BWP2, which may be inactive, so MBS BWP3 may also be inactive. MBS BWP2 may be associated with both Downlink BWP1, which may be active, and Downlink BWP2, which may be inactive. Since Downlink BWP1 may be active, MBS BWP2 may also be active (e.g., even though Downlink BWP2 may be inactive). MBS BWP1 may be associated with Downlink BWP1, which may be active. Thus, MBS BWP1 may also be active. That is, if the dedicated downlink BWP including an MBS BWP is in a dormant or inactive state, the MBS BWP may also be in a dormant or inactive state. In some cases, if the dedicated downlink BWP including an MBS BWP is in a non-dormant or active state, the MBS BWP may be in a non-dormant, active, dormant, or inactive state according to control signaling (e.g., an RRC signaling, a MAC-CE, a DCI message, or the like including an indication of the activity status).

In some examples, the base station may explicitly indicate a monitoring condition for a GC-PDCCH 305 to the UE. For example, the base station may transmit the explicit indication of the monitoring condition for the GC-PDCCH 305 via RRC signaling, a MAC-CE, a DCI message, or the like. The UE may enable or disable monitoring of the GC-PDCCH 305 based on the explicitly indication and the activity status of one or more BWPs according to Table 1.

For example, if the dedicated downlink BWP is active and the MBS BWP is active (e.g., activated via control signaling from the base station, such as RRC signaling, a MAC-CE, or by default), the base station may transmit an explicit indication that enables monitoring of the GC-PDCCH 305 (e.g., via RRC signaling, a MAC-CE, a DCI message, or the like). Similarly, if the dedicated downlink BWP is active but the MBS BWP is inactive or dormant, the base station may transmit an explicit indication that disables monitoring of the GC-PDCCH 305 (e.g., via RRC signaling, a MAC-CE, a DCI message, or the like) or deactivates the BWP (e.g., via RRC signaling, a MAC-CE, or the like). If the dedicated downlink BWP is inactive, the base station may not transmit a monitoring condition for the MBS BWPs included in the inactive downlink BWP, even if the MBS BWP is active. The base station may deactivate the BWP (e.g., via RRC signaling, a MAC-CE, or the like). In some examples, if the dedicated downlink BWP is dormant on an SCell, the base station may disable GC-PDCCH monitoring for a dormant MBS BWP or may deactivate the BWP on a PCell or a PSCell (e.g., via RRC signaling, a MAC-CE, or the like).

The base station may transmit RRC signaling to the UE that configures a timer for GC-PDCCH skipping. In some examples, the base station may transmit a DCI message including a bitmap field to the UE, the bitmap field indicating the monitoring condition for the GC-PDCCH 305 per frequency resource (e.g., MBS BWP) in the associated dedicated BWP. The DCI message may include a new field or may reuse a BWP ID field (e.g., if the UE does not perform a BWP switching operation while receiving the indication of the monitoring condition for the GC-PDCCH 305). The bitmap field may include any number of bits (e.g., 0-N bits) depending on the number of MBS BWPs, G-RNTIs, or search space sets configured for MBS included in a dedicated BWP. For example, the bitmap may include 2 bits for MBS BWP1 and MBS BWP2 associated with active Downlink BWP1. In some cases, the base station may transmit the monitoring condition for the GC-PDCCH 305 via a UE-specific PDCCH 315 in the active dedicated BWP (e.g., downlink DCI format 1_1 or DCI format 1_2 with C-RNTI or with G-RNTI in a UE-specific search space (USS) or uplink DCI format 0_1 with C-RNTI). In some other cases, the base station may transmit the monitoring condition for the GC-PDCCH 305 that indicates a monitoring condition for a current MBS BWP and another MBS BWP during an active time of the current MBS BWP (e.g., downlink DCI format 1_1 or DCI format 1_2 with G-RNTI in a common search space (CSS), a USS, an MBS search space (MSS), or a combination thereof).

In some examples, the explicit indication may include an indication of search space set group switching for multicast transmissions. For example, the explicit indication may be a DCI message (e.g., downlink DCI format 1_1 or DCI format

TABLE 1

| | Activity Status for MBS BWPs in relation to Downlink BWPs | | |
|---|---|---|---|
| | Downlink BWP (active) | Downlink BWP (inactive) | Downlink BWP (dormant on SCell) |
| MBS BWP (active) | GC-PDCCH Monitoring Enabled | x | x |
| MBS BWP (dormant) | GC-PDCCH Monitoring Disabled | x | GC-PDCCH Monitoring Disabled on PCell and PSCell |
| MBS BWP (inactive) | BWP Deactivated | BWP Deactivated | BWP Deactivated on PCell and PSCell |

1_2) with a G-RNTI or a DCI message (e.g., DCI format 2_0) with a G-SFI-RNTI. Similarly, the explicit indication may be a DCI message (e.g., downlink DCI format 1_1 or DCI format 1_2) with a UE-specific RNTI or a DCI message (e.g., DCI format 2_0) with a slot format indication-RNTI (SFI-RNTI) when an RRC parameter search space group switching trigger for MBS (e.g., searchSpaceSwitchTrigger-MBS) is configured. The DCI message may include a value of a search space set group switching flag field to indicate a search space set group index for the UE to monitor. In some cases, the base station may configure each search space set group via RRC signaling (e.g., search space set group 1: multicast search space set 1, 2, 3 and search space set group 2: multicast search space set 3, 4, 5 for the DCI message with the G-RNTI or G-SFI-RNTI or search space set group 1: unicast search space sets configured in the dedicated BWP; search space set group 2: multicast search space sets configured in MBS BWPs associated with the dedicated BWP; and search space set group 3: unicast search space sets and multicast search space sets). In some examples, the base station may use RRC signaling to configure a same or a different expiration timer for each search space set group, or for different types of search space sets (e.g., unicast and multicast search space sets).

In some examples, the UE may receive the explicit indication of the monitoring condition (e.g., in UE-specific PDCCH 315) and may enable monitoring for one or more GC-PDCCHs 305. For example, the base station may indicate one or more frequency resources (e.g., active MBS BWP1 and active MBS BWP2) on which to enable or disable monitoring of the GC-PDCCH. The UE may continue to monitor the UE-specific PDCCH 315, which may schedule transmissions on the UE-specific physical downlink shared channel (PDSCH) 320, which is described in further detail with respect to FIGS. 6A and 6B.

Figure 4:
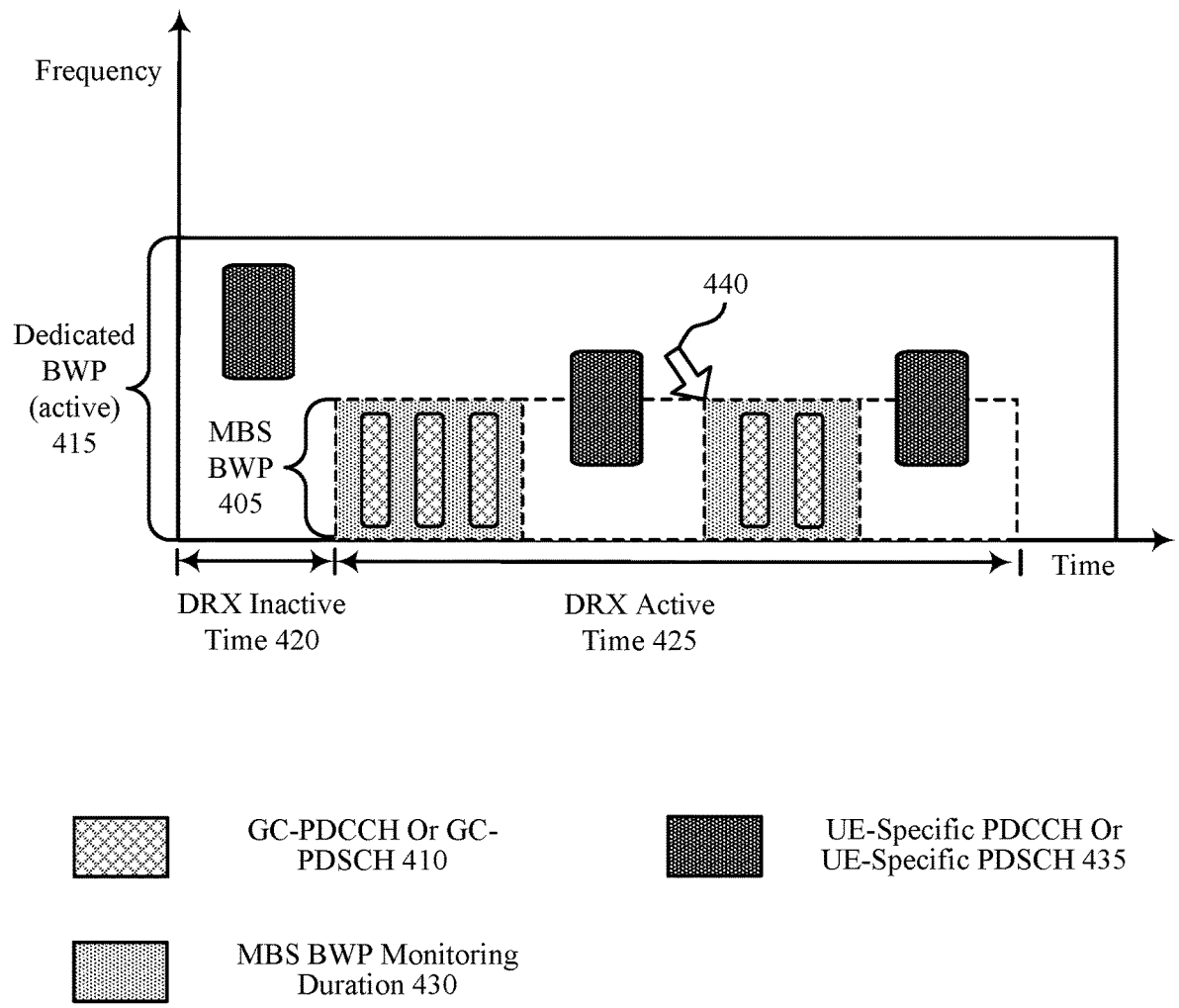

FIG. 4 illustrates an example of a resource diagram 400 that supports downlink control channel monitoring for MBS in accordance with aspects of the present disclosure. In some examples, resource diagram 400 may implement aspects of wireless communication system 100, wireless communications system 200, and resource diagram 300. For example, resource diagram 400 may be implemented by a UE 115 and a base station 105 as described with reference to FIGS. 1 and 2. In some cases, a base station may transmit control signaling to a UE including an indication of one or more frequency resources, such as MBS BWPs 405, and a monitoring condition for a GC-PDCCH 410 for the one or more frequency resources. The MBS BWPs 405 may share resources (e.g., time resources, frequency resources, or both) with one or more dedicated BWPs 415, which may be referred to as downlink BWPs.

In some examples, a UE may operate according to a DRX cycle. For example, the UE may be in an RRC inactive state or an RRC idle state in which a base station configures the UE with a DRX cycle to wake up periodically and monitor for paging messages. The DRX cycle may have a DRX inactive time 420, a DRX active time 425, and a periodicity. Although one DRX cycle is shown (e.g., one DRX inactive time 420 and one DRX active time 425), the base station may configure the UE with any number of DRX cycles (e.g., based on the periodicity). If the base station configures the UE with a DRX cycle for MBS communications (e.g., on a GC-PDCCH 410 or a GC-PDSCH 410), the base station may configure the UE with a monitoring condition for the GC-PDCCH 410 such that the UE may disable monitoring the GC-PDCCH prior to a DRX inactivity timer expiring. The DRX inactivity timer may specify the number of consecutive PDCCH subframes (e.g., GC-PDCCH subframes or UE-specific PDCCH subframes) for which the UE may be active after successfully decoding a PDCCH including scheduling information.

In some cases, the base station may transmit one or more indications of monitoring conditions to the UE that enable GC-PDCCH monitoring for one or more frequency resources, such as an MBS BWP 405. For example, the base station may indicate MBS BWP monitoring is enabled for the MBS BWP 405, and the UE may perform MBS BWP monitoring of the GC-PDCCH 410 for one or more MBS BWP monitoring durations 430. The base station may include an indication of the monitoring condition for the MBS BWP 405 in a UE-specific PDCCH or UE-specific PDSCH 435 (e.g., using the dedicated BWP 415). At 440, the base station may transmit a UE-specific PDCCH 435, or a wakeup signal (WUS), that may include an explicit indication for the UE to enable or disable monitoring of the GC-PDCCH 410 (e.g., to enable monitoring of the GC-PDCCH for an MBS BWP monitoring duration 430). For example, the base station may transmit a group-common WUS (GC-WUS) to enable monitoring of the GC-PDCCH 410 before a DRX inactivity timer expires. The base station may transmit the GC-WUS in an MBS BWP 405 independent of an activity status of the MBS BWP 405. That is, the base station may transmit the GC-WUS in the MBS BWP 405 when the MBS BWP is inactive, dormant, or active (e.g., for downlink DCI format 2_6 with group-power saving-RNTI (G-PS-RNTI) for MBS transmissions, which may include a bitmap for multiple services or for downlink DCI format 2_6 with power saving-RNTI (PS-RNTI), which may include a bitmap for unicast services and MBSs).

Figure 5:
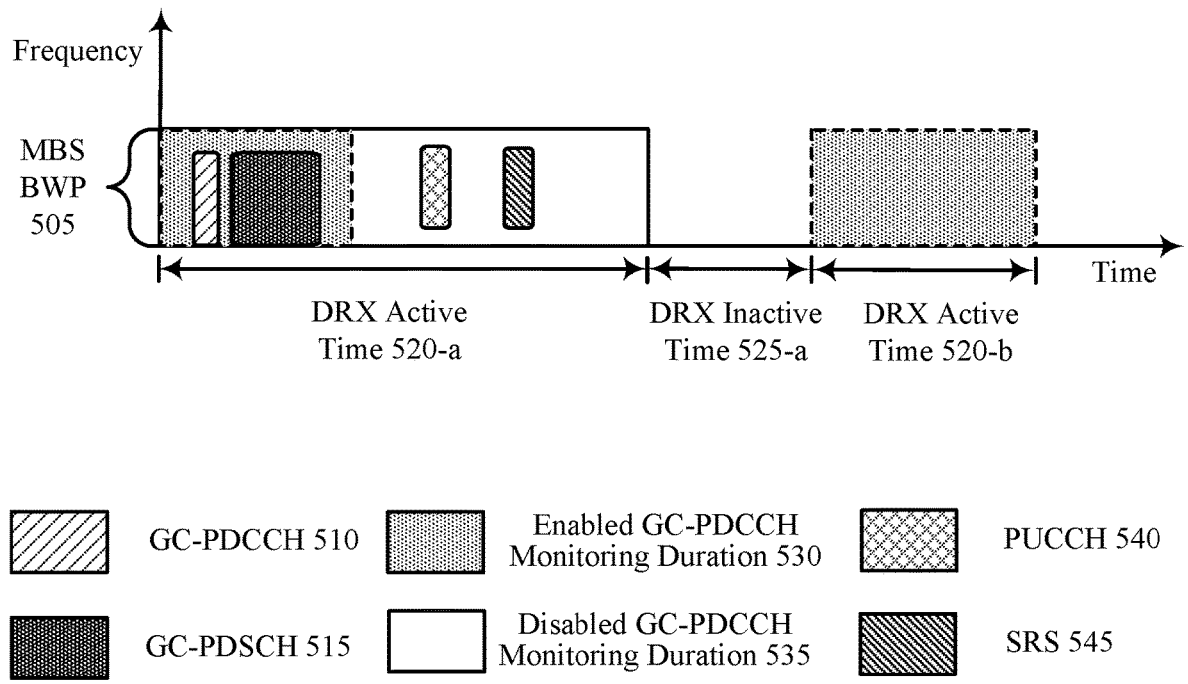

FIG. 5 illustrates an example of a resource diagram 500 that supports downlink control channel monitoring for MBS in accordance with aspects of the present disclosure. In some examples, resource diagram 500 may implement aspects of wireless communication system 100, wireless communications system 200, resource diagram 300, and resource diagram 400. For example, resource diagram 500 may be implemented by a UE 115 and a base station 105 as described with reference to FIGS. 1 and 2. In some cases, a base station may transmit control signaling to a UE including an indication of one or more frequency resources, such as MBS BWPs 505, and a monitoring condition for a GC-PDCCH 510 for the one or more frequency resources. The base station may transmit scheduling information on the GC-PDCCH 510 for one or more data transmissions on a GC-PDSCH 515. In some examples, the UE may disable monitoring the GC-PDCCH 510 for the MBS BWP 505 based on a service traffic threshold.

In some examples, a UE may operate according to one or more DRX cycles as described with reference to FIG. 4. For example, a DRX cycle may have a DRX active time 520 (e.g., DRX active time 520-a and DRX active time 520-b), a DRX inactive time 525 (e.g., DRX inactive time 525-a), and a periodicity. In some examples, a base station may configure the UE to monitor a GC-PDCCH 510 for one or more frequency resources based on an enabled GC-PDCCH monitoring duration 530. Similarly, a base station may configure the UE to disable monitoring of the GC-PDCCH 510 for one or more frequency resources, such as for an MBS BWP 505, when the service traffic does not satisfy a threshold (e.g., when there is little or no MBS data traffic). The UE may disable monitoring the GC-PDCCH 510 on the MBS BWP 505 for a disabled GC-PDCCH monitoring duration 535, but may continue performing CSI measurements, and beam management. For example, the base station may configure the UE to continue performing CSI measurements for a CSI report, feedback message transmission, SRS transmission, or the like for the disabled GC-PDCCH monitoring duration 535. That is, the GC-PDCCH monitoring control may not impact downlink reception on a UE-specific downlink channel or uplink transmission on a UE-specific uplink channel, such as a PUCCH 540. The UE may transmit an uplink ACK or NACK feedback message on the PUCCH 540, a CSI report on PUCCH 540, or an SRS 545 to the base station while the GC-PDCCH monitoring may be disabled.

In some examples, the UE may use a remaining number of blind decoding resources, CCEs, or both within a capability of the UE to schedule a unicast PDCCH. If the UE is overbooked, the candidate resources for the unicast PDCCH may change depending on a dormancy state of one or more BWPs including the candidate resources.

FIGS. 6A and 6B illustrate examples of resource diagrams 600-a and 600-b that support downlink control channel monitoring for MBS in accordance with aspects of the present disclosure. In some examples, resource diagrams 600-a and 600-b may implement aspects of wireless communication system 100, wireless communications system 200, and resource diagram 300 through resource diagram 500. For example, resource diagrams 600-a and 600-b may be implemented by a UE 115 and a base station 105 as described with reference to FIGS. 1 and 2. In some cases, a base station may transmit control signaling to a UE including an indication of one or more frequency resources, such as MBS BWPs 605-a and 605-b, and a monitoring condition for a GC-PDCCH 610 for the one or more frequency resources. The base station may transmit scheduling information on the GC-PDCCH 610 for one or more data transmissions on a GC-PDSCH 615. In some examples, as illustrated in FIG. 6A, the UE may transmit an ACK 620 based on receiving one or more messages (e.g., scheduling information on the GC-PDCCH 610, a data message on the GC-PDSCH 615, the message indicating the monitoring condition, or a combination thereof) and may disable monitoring the GC-PDCCH 610 for a disabled GC-PDCCH monitoring duration 625 based on the monitoring condition and transmitting the ACK 620. In some other examples, as illustrated in FIG. 6B, the UE may transmit a NACK 630 based on failing to receive the one or more messages and may re-enable monitoring the GC-PDCCH 610 for an enabled GC-PDCCH monitoring duration 635 to receive a retransmission.

In some examples, a UE may operate according to one or more DRX cycles as described with reference to FIG. 4. For example, a DRX cycle may have a DRX active time 640 (e.g., DRX active time 640-a through DRX active time 640-d), a DRX inactive time 645 (e.g., DRX inactive time 645-a and DRX inactive time 645-b), and a periodicity. In some examples, a base station may configure the UE to monitor a GC-PDCCH 610 for one or more frequency resources, such as for an MBS BWP 605-a or 605-b, based on an enabled GC-PDCCH monitoring duration 635. Similarly, a base station may configure the UE to disable monitoring of the GC-PDCCH 610 for one or more frequency resources based on a disabled GC-PDCCH monitoring duration 625. In some examples, an RRC connected UE may support a feedback message (e.g., an ACK 620 or a NACK 630) for multicast per UE or per group of UEs.

In some cases, even if GC-PDCCH monitoring is disabled, the UE may monitor a retransmission of a previous GC-PDSCH 615 based on a feedback message (e.g., a HARQ-ACK feedback message) configured for multicast reception. For example, as illustrated in resource diagram 600-a, if the UE successfully receives a message indicating a GC-PDCCH monitoring condition for MBS BWP 605-a, scheduling information on a GC-PDCCH 610 for a data transmission on a GC-PDSCH 615, the data transmission on the GC-PDSCH 615, or a combination thereof during an enabled GC-PDCCH monitoring duration 635, the UE may transmit an ACK 620 to the base station. If the monitoring condition indicates to the UE to disable GC-PDCCH monitoring for the MBS BWP 605-a, the UE may refrain from monitoring the GC-PDCCH 610 for a disabled GC-PDCCH monitoring duration 625. In some examples, as illustrated in resource diagram 600-b, if the UE does not successfully receive a message indicating a GC-PDCCH monitoring condition for MBS BWP 605-b, scheduling information on a GC-PDCCH 610 for a data transmission on a GC-PDSCH 615, the data transmission on the GC-PDSCH 615, or a combination thereof during an enabled GC-PDCCH monitoring duration 635, the UE may transmit a NACK 630 to the base station. In some cases, the UE may re-enabled monitoring the GC-PDCCH 610 for the MBS BWP 605-b for an enabled GC-PDCCH monitoring duration 635 a time gap 650 after transmitting the NACK 630. In some examples, the time gap 650 may be a UE-specific downlink round trip time (RTT) timer or may be configured by the base station (e.g., equal to a maximum downlink RTT timer of a group of UEs including the UE).

The UE may transmit the NACK 630 using one or more resources in a shared uplink control channel (e.g., a PUCCH). The base station may retransmit the message on a GC-PDCCH 610, GC-PDSCH 615, or both depending on whether the NACK 630 was for the scheduling information or the data transmission, respectively. If the UE transmits the ACK 620 or the NACK 630 in a UE-specific PUCCH resource, the base station may transmit the retransmission on a UE-specific PDCCH, a UE-specific PDSCH, a GC-PDCCH 610, or a GC-PDSCH 615, based on the NACK 630 (e.g., the NACK 630 may indicate to the base station which message should be retransmitted and on which channel). In some cases, if the UE detects the GC-PDCCH monitoring is disabled (e.g., based on an explicit indication from the base station or by some other means), the UE may disable GC-PDCCH monitoring for an MBS BWP 605-a or 605-b after the last transmission on the GC-PDSCH according to the scheduling information in the GC-PDCCH.

In some examples, if UE transmits the NACK 630 due to a failure to receive a message on a PDSCH, the base station may configure the UE to monitor a UE-specific PDCCH for retransmission of the last message on the GC-PDSCH or restart monitoring of the GC-PDCCH after the time gap 650 (e.g., if no UE-specific PDCCH is detected for retransmission within the time gap 650).

In some examples, a PDCCH with an indication of GC-PDCCH monitoring control (e.g., an explicit indication of the monitoring condition) may or may not schedule downlink or uplink data. For example, if the PDCCH including the indication of the monitoring condition schedules data, the base station may configure the UE to transmit a feedback message (e.g., an ACK 620 or a NACK 630) based on data reception, which may implicitly indicate an ACK 620 or a NACK 630 for reception of messages on the PDCCH. If the PDCCH including the indication of the monitoring condition does not schedule data, the UE may transmit a feedback message for the information in the PDCCH (e.g., in a similar way as a semi-persistent scheduling (SPS) resource release).

Figure 7:
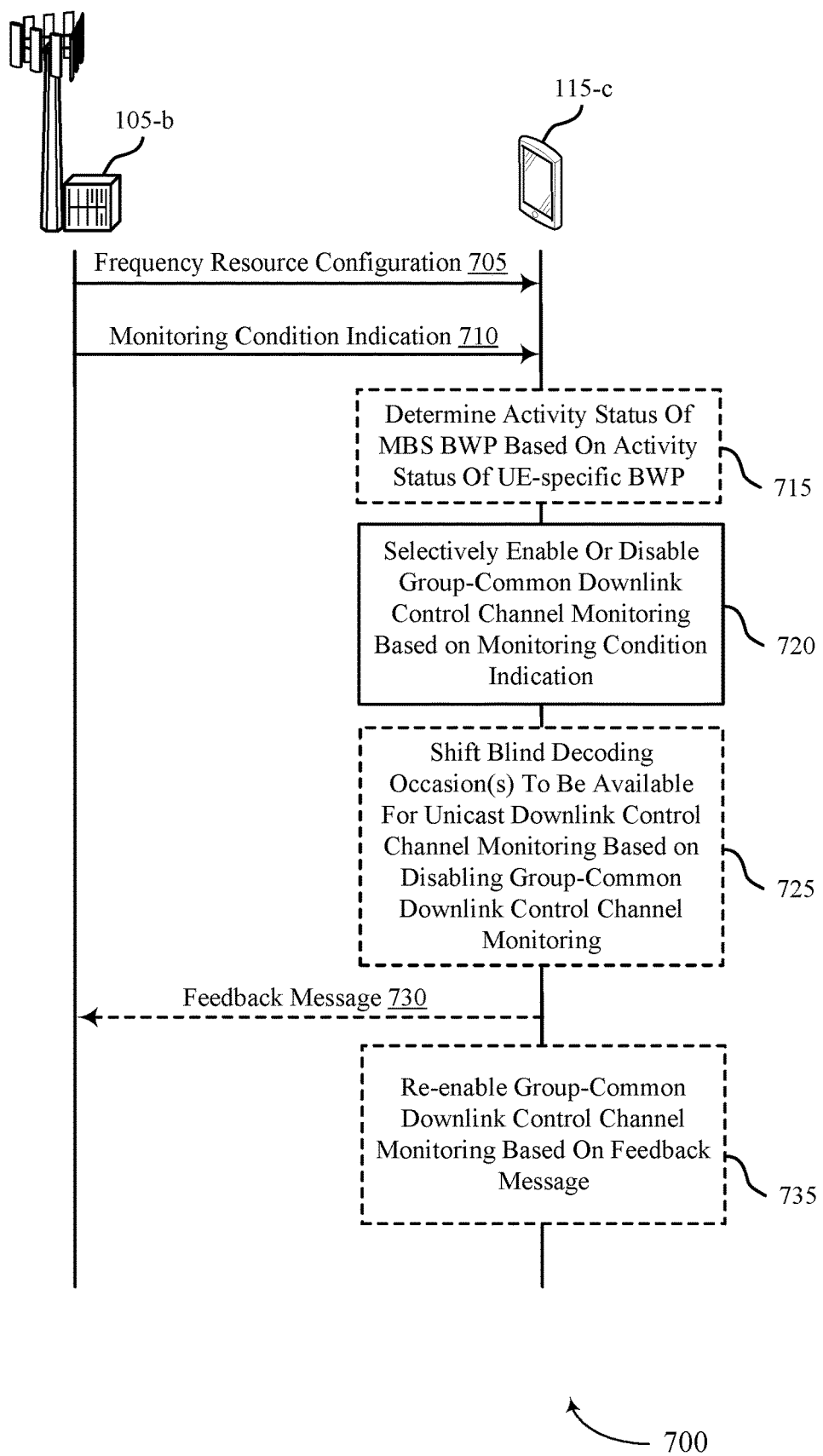
FIG. 7 illustrates an example of a process flow that supports downlink control channel monitoring for MBS in accordance with aspects of the present disclosure.

FIG. 7 illustrates an example of a process flow 700 that supports downlink control channel monitoring for MBS in accordance with aspects of the present disclosure. In some examples, process flow 700 may implement aspects of wireless communications system 100, wireless communication system 200, and resource diagram 300 through resource diagrams 600-b. The process flow 700 may illustrate an example of a base station 105-b configuring UE 115-c with a monitoring condition for group-common downlink control channel monitoring within a frequency resource. Alternative examples of the following may be implemented, where some processes are performed in a different order than described or are not performed. In some cases, processes may include additional features not mentioned below, or further processes may be added.

At 705, base station 105-b may transmit a configuration to UE 115-c identifying a frequency resource for an MBS service to be monitored by UE 115-c for one or more group-common downlink control channels (e.g., GC-PDCCH channels). In some examples, the frequency resource may include one or more MBS BWPs.

At 710, base station 105-b may transmit a message to UE 115-c indicating a monitoring condition for group-common downlink control channel monitoring within the frequency resource. For example, base station 105-b may transmit an explicit indication of the monitoring condition via one of an RRC message, a MAC-CE, or a DCI message. In some examples, base station 105-b may transmit the explicit indication as a timer via an RRC message. Base station 105-b transmit the explicit indication as a bitmap field via a DCI message. In some cases, the DCI message may be a UE-specific PDCCH message received in an active dedicated BWP, a GC-PDCCH message (e.g., where the bitmap field includes an indication of to at least one frequency resources for the MBS), a GC-WUS received in an MBS BWP during an inactive time, a dormant time, or an active time. The bitmap field may be included in a BWP identification field when the BWP identification field is not being used to indicate BWP switching, in a new field of the DCI message dedicated to enabling or disabling the group-common downlink control channel monitoring, or the like. In some examples, a size of the bitmap field may be based on a number of frequency resources configured for the MBS within a dedicated bandwidth.

In some examples, UE 115-c may receive an explicit indication of the monitoring condition as a search space set group switch indicating one or more search space set groups that are active for the group-common downlink control channel monitoring. For example, UE 115-c may receive the search space set group switch in a DCI message encoded with a group-common slot format indication (SFI) RNTI configured for the MBS, an SFI radio network temporary identifier, or the like, where the search space set groups are configured via RRC signaling. UE 115-c may receive an RRC message including one or more expiration timers for respective search space set groups, where the RRC message configures the search space set groups.

In some cases, UE 115-c may receive an indication of an activity status (e.g., a monitoring condition) for the frequency resource. For example, UE 115-c may receive an activity status for an MBS BWP.

In some examples, base station 105-b may transmit an indication to UE 115-c to disable the group-common downlink control channel monitoring based on an MBS traffic threshold being satisfied.

At 715, UE 115-c may determine an activity status of the MBS BWP based on an activity status of a UE-specific bandwidth part. For example, UE 115-c may receive an indication of the activity status of the UE-specific BWP that includes the MBS BWP (e.g., the frequency resource).

At 720, UE 115-c may apply the monitoring condition within the frequency resource. For example, UE 115-c may enable or disable the group-common downlink control channel monitoring within the frequency resource. In some cases, UE 115-c may disable the group-common downlink control channel monitoring prior to expiration of a DRX active timer. UE 115-c may disable the group-common downlink control channel monitoring for the duration of the timer received via RRC signaling at 710. Additionally or alternatively, UE 115-c may enable or disable the group-common downlink control channel monitoring on a frequency resource basis based at on the bitmap field in the DCI message.

In some examples, UE 115-c may apply the monitoring condition by enabling or disabling the group-common downlink control channel monitoring based on the activity status for the MBS BWP, where the frequency resource may include the MBS BWP. UE 115-c may enable or disable the group-common downlink control channel monitoring based on the activity status of the MBS BWP (e.g., based on whether the MBS BWP is active, non-dormant, inactive, or dormant).

In some cases, UE 115-c may disable the group-common downlink control channel monitoring while still performing a CSI measurement, a beam management operation, an uplink feedback transmission, a CSI report transmission, an SRS transmission, or a combination thereof.

At 725, UE 115-c may shift one or more blind decoding resources, or blind decoding occasions, and CCEs to be available for unicast downlink control channel monitoring. For example, UE 115-c may disable the group-common downlink control channel monitoring and may identify one or more blind decoding occasions are available due to the disabling of the group-common downlink control channel monitoring.

At 730, UE 115-c may transmit a NACK for a multicast reception (e.g., where multicast NACK is configured at UE 115-c). In some examples, if UE 115-c disabled the group-common downlink control channel monitoring based on the monitoring condition, UE 115-c may re-enable the group-common downlink control channel monitoring based on transmission of the NACK.

In some examples, such as when UE 115-c is configured with UE-specific feedback, UE 115-c may transmit a NACK for the multicast reception. If UE 115-c disabled the group-common downlink control channel monitoring, UE 115-c may monitor for a UE-specific downlink control channel message including a retransmission of a group-common downlink shared channel message with which the NACK may be associated.

UE 115-c may transmit a UE-specific ACK or a UE-specific NACK of receipt of the message indicating the monitoring condition, where the UE-specific ACK or the UE-specific NACK may be transmitted as feedback for receipt of data scheduled by the message. In some cases, UE 115-c may transmit an ACK or a NACK of receipt of the message indicating the monitoring condition, where the ACK or the NACK may be transmitted as feedback for receipt of the message.

At 735, UE 115-c may re-enable of the group-common downlink control channel monitoring a time offset after transmission of the NACK. In some cases, the time offset may be set by a UE-specific downlink RTT timer or may be configured by base station 105-b. UE 115-c may re-enable the group-common downlink control channel monitoring (e.g., a time offset after transmission of the NACK) based on an absence of the UE-specific downlink control channel message including the retransmission of the group-common downlink shared channel message.

Figure 8:
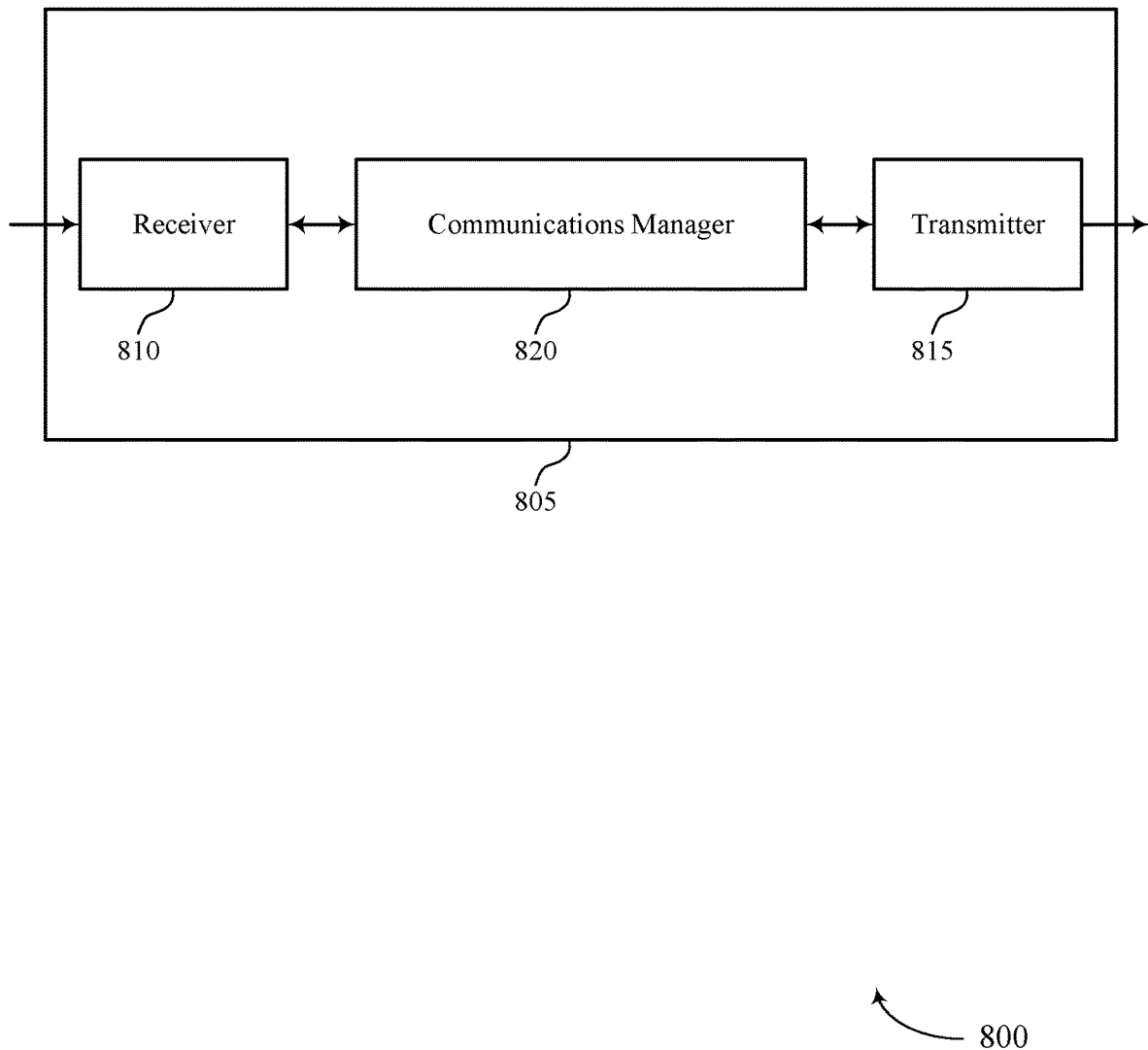
FIGS. 8 and 9 show block diagrams of devices that support downlink control channel monitoring for MBS in accordance with aspects of the present disclosure.

FIG. 8 shows a block diagram 800 of a device 805 that supports downlink control channel monitoring for MBS in accordance with aspects of the present disclosure. The device 805 may be an example of aspects of a UE 115 as described herein. The device 805 may include a receiver 810, a transmitter 815, and a communications manager 820. The device 805 may also include a processor. Each of these components may be in communication with one another (e.g., via one or more buses).

The receiver 810 may provide a means for receiving information such as packets, user data, control information, or any combination thereof associated with various information channels (e.g., control channels, data channels, information channels related to downlink control channel monitoring for MBS). Information may be passed on to other components of the device 805. The receiver 810 may utilize a single antenna or a set of multiple antennas.

The transmitter 815 may provide a means for transmitting signals generated by other components of the device 805. For example, the transmitter 815 may transmit information such as packets, user data, control information, or any combination thereof associated with various information channels (e.g., control channels, data channels, information channels related to downlink control channel monitoring for MBS). In some examples, the transmitter 815 may be co-located with a receiver 810 in a transceiver module. The transmitter 815 may utilize a single antenna or a set of multiple antennas.

The communications manager 820, the receiver 810, the transmitter 815, or various combinations thereof or various components thereof may be examples of means for performing various aspects of downlink control channel monitoring for MBS as described herein. For example, the communications manager 820, the receiver 810, the transmitter 815, or various combinations or components thereof may support a method for performing one or more of the functions described herein.

In some examples, the communications manager 820, the receiver 810, the transmitter 815, or various combinations or components thereof may be implemented in hardware (e.g., in communications management circuitry). The hardware may include a processor, a digital signal processor (DSP), an application-specific integrated circuit (ASIC), a field-programmable gate array (FPGA) or other programmable logic device, a discrete gate or transistor logic, discrete hardware components, or any combination thereof configured as or otherwise supporting a means for performing the functions described in the present disclosure. In some examples, a processor and memory coupled with the processor may be configured to perform one or more of the functions described herein (e.g., by executing, by the processor, instructions stored in the memory).

Additionally or alternatively, in some examples, the communications manager 820, the receiver 810, the transmitter 815, or various combinations or components thereof may be implemented in code (e.g., as communications management software or firmware) executed by a processor. If implemented in code executed by a processor, the functions of the communications manager 820, the receiver 810, the transmitter 815, or various combinations or components thereof may be performed by a general-purpose processor, a DSP, a central processing unit (CPU), an ASIC, an FPGA, or any combination of these or other programmable logic devices (e.g., configured as or otherwise supporting a means for performing the functions described in the present disclosure).

In some examples, the communications manager 820 may be configured to perform various operations (e.g., receiving, monitoring, transmitting) using or otherwise in cooperation with the receiver 810, the transmitter 815, or both. For example, the communications manager 820 may receive information from the receiver 810, send information to the transmitter 815, or be integrated in combination with the receiver 810, the transmitter 815, or both to receive information, transmit information, or perform various other operations as described herein.

The communications manager 820 may support wireless communications at a UE in accordance with examples as disclosed herein. For example, the communications manager 820 may be configured as or otherwise support a means for receiving a configuration identifying a frequency resource for a multicast/broadcast service to be monitored by the UE for one or more group-common downlink control channels. The communications manager 820 may be configured as or otherwise support a means for receiving a message indicating a monitoring condition for group-common downlink control channel monitoring within the frequency resource. The communications manager 820 may be configured as or otherwise support a means for applying the monitoring condition by selectively enabling or disabling the group-common downlink control channel monitoring within the frequency resource.

By including or configuring the communications manager 820 in accordance with examples as described herein, the device 805 (e.g., a processor controlling or otherwise coupled to the receiver 810, the transmitter 815, the communications manager 820, or a combination thereof) may support techniques for controlling monitoring of a downlink control channel for multicast transmissions at a UE by configuring the UE with a monitoring condition for one or more frequency resources which may reduce processing, reduced power consumption, and cause more efficient utilization of communication resources.

Figure 9:
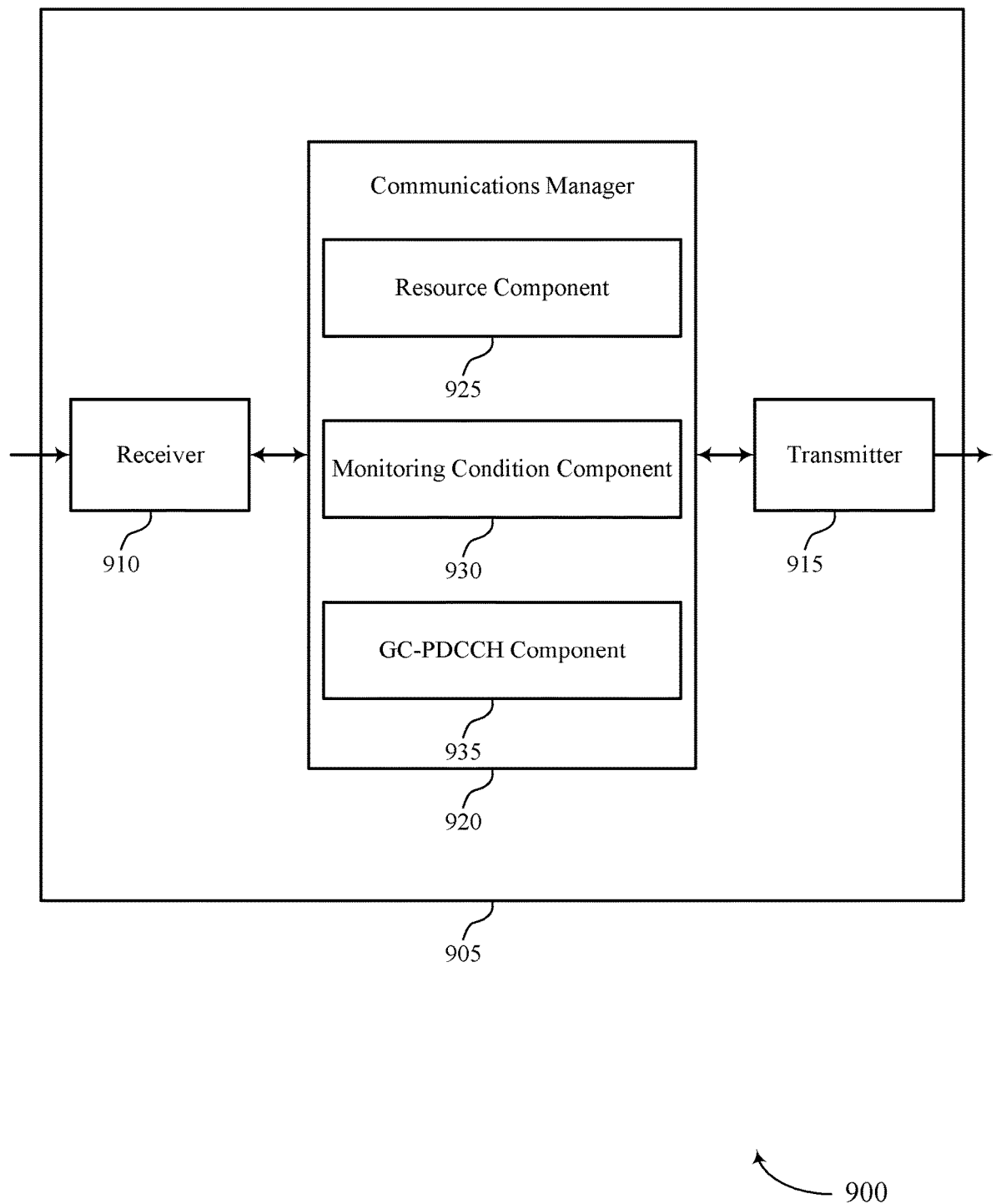

FIG. 9 shows a block diagram 900 of a device 905 that supports downlink control channel monitoring for MBS in accordance with aspects of the present disclosure. The device 905 may be an example of aspects of a device 805 or a UE 115 as described herein. The device 905 may include a receiver 910, a transmitter 915, and a communications manager 920. The device 905 may also include a processor. Each of these components may be in communication with one another (e.g., via one or more buses).

The receiver 910 may provide a means for receiving information such as packets, user data, control information, or any combination thereof associated with various information channels (e.g., control channels, data channels, information channels related to downlink control channel monitoring for MBS). Information may be passed on to other components of the device 905. The receiver 910 may utilize a single antenna or a set of multiple antennas.

The transmitter 915 may provide a means for transmitting signals generated by other components of the device 905. For example, the transmitter 915 may transmit information such as packets, user data, control information, or any combination thereof associated with various information channels (e.g., control channels, data channels, information channels related to downlink control channel monitoring for MBS). In some examples, the transmitter 915 may be co-located with a receiver 910 in a transceiver module. The transmitter 915 may utilize a single antenna or a set of multiple antennas.

The device 905, or various components thereof, may be an example of means for performing various aspects of downlink control channel monitoring for MBS as described herein. For example, the communications manager 920 may include a resource component 925, a monitoring condition component 930, a GC-PDCCH component 935, or any combination thereof. The communications manager 920 may be an example of aspects of a communications manager 820 as described herein. In some examples, the communications manager 920, or various components thereof, may be configured to perform various operations (e.g., receiving, monitoring, transmitting) using or otherwise in cooperation with the receiver 910, the transmitter 915, or both. For example, the communications manager 920 may receive information from the receiver 910, send information to the transmitter 915, or be integrated in combination with the receiver 910, the transmitter 915, or both to receive information, transmit information, or perform various other operations as described herein.

The communications manager 920 may support wireless communications at a UE in accordance with examples as disclosed herein. The resource component 925 may be configured as or otherwise support a means for receiving a configuration identifying a frequency resource for a multicast/broadcast service to be monitored by the UE for one or more group-common downlink control channels. The monitoring condition component 930 may be configured as or otherwise support a means for receiving a message indicating a monitoring condition for group-common downlink control channel monitoring within the frequency resource. The GC-PDCCH component 935 may be configured as or otherwise support a means for applying the monitoring condition by selectively enabling or disabling the group-common downlink control channel monitoring within the frequency resource.

Figure 10:
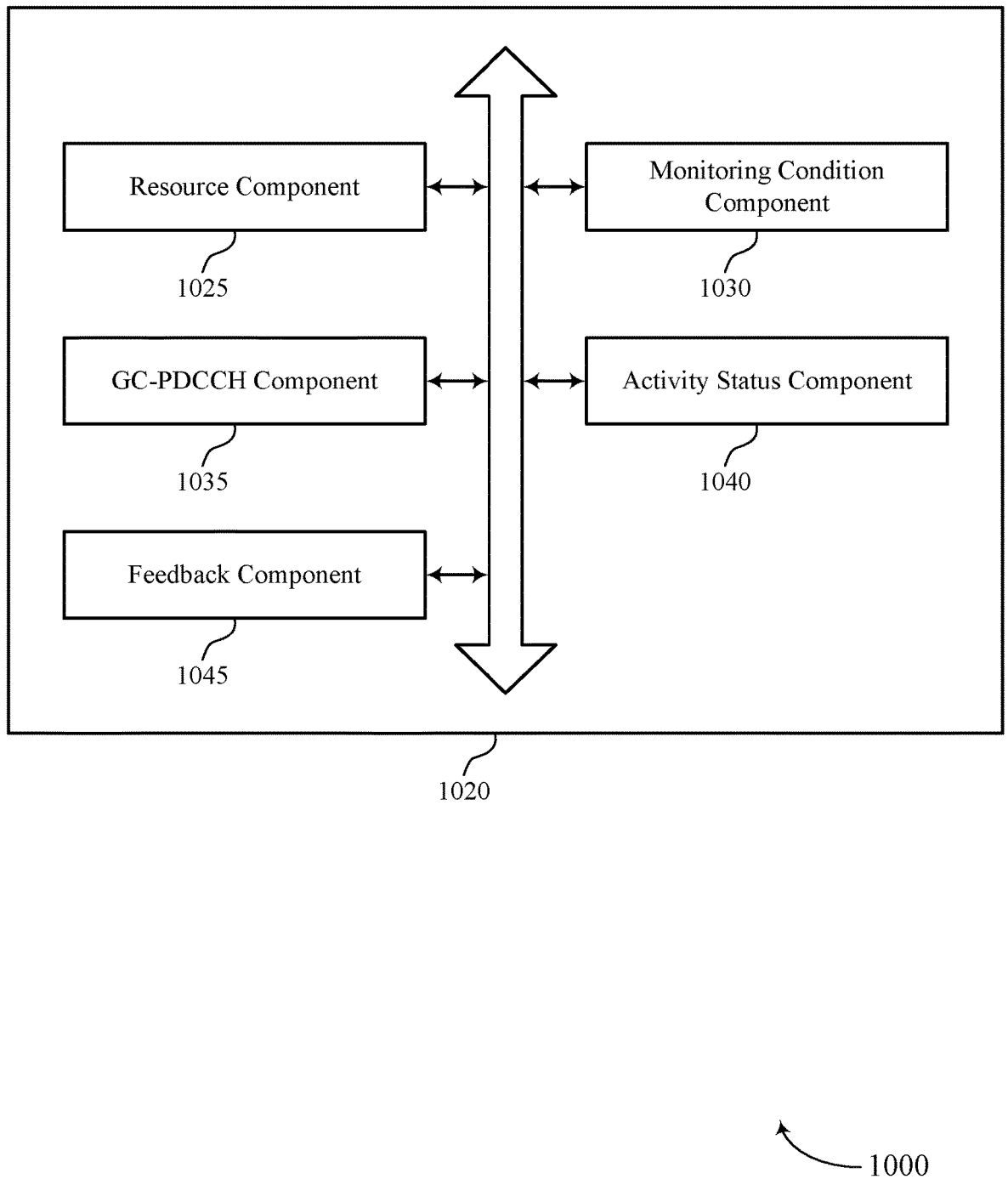
FIG. 10 shows a block diagram of a communications manager that supports downlink control channel monitoring for MB S in accordance with aspects of the present disclosure.

FIG. 10 shows a block diagram 1000 of a communications manager 1020 that supports downlink control channel monitoring for MBS in accordance with aspects of the present disclosure. The communications manager 1020 may be an example of aspects of a communications manager 820, a communications manager 920, or both, as described herein. The communications manager 1020, or various components thereof, may be an example of means for performing various aspects of downlink control channel monitoring for MBS as described herein. For example, the communications manager 1020 may include a resource component 1025, a monitoring condition component 1030, a GC-PDCCH component 1035, an activity status component 1040, a feedback component 1045, or any combination thereof. Each of these components may communicate, directly or indirectly, with one another (e.g., via one or more buses).

The communications manager 1020 may support wireless communications at a UE in accordance with examples as disclosed herein. The resource component 1025 may be configured as or otherwise support a means for receiving a configuration identifying a frequency resource for a multicast/broadcast service to be monitored by the UE for one or more group-common downlink control channels. The monitoring condition component 1030 may be configured as or otherwise support a means for receiving a message indicating a monitoring condition for group-common downlink control channel monitoring within the frequency resource. The GC-PDCCH component 1035 may be configured as or otherwise support a means for applying the monitoring condition by selectively enabling or disabling the group-common downlink control channel monitoring within the frequency resource.

In some examples, to support applying the monitoring condition by selectively enabling or disabling the group-common downlink control channel monitoring within the frequency resource, the GC-PDCCH component 1035 may be configured as or otherwise support a means for disabling the group-common downlink control channel monitoring prior to expiration of a DRX active timer.

In some examples, to support receiving the message, the monitoring condition component 1030 may be configured as or otherwise support a means for receiving an explicit indication of the monitoring condition via one of an RRC message, a MAC-CE, or a DCI message.

In some examples, to support receiving the message, the monitoring condition component 1030 may be configured as or otherwise support a means for receiving an explicit indication of the monitoring condition as a timer via an RRC message, where applying the monitoring condition includes selectively disabling the group-common downlink control channel monitoring during pendency of the timer.

In some examples, to support receiving the message, the monitoring condition component 1030 may be configured as or otherwise support a means for receiving an explicit indication of the monitoring condition as a bitmap field via a DCI message, where applying the monitoring condition includes selectively enabling or disabling the group-common downlink control channel monitoring on a frequency resource basis based on the bitmap field.

In some examples, to support receiving the explicit indication of the monitoring condition as the bitmap field, the monitoring condition component 1030 may be configured as or otherwise support a means for receiving the bitmap field in a BWP identification field when the BWP identification field is not being used to indicate BWP switching.

In some examples, to support receiving the explicit indication of the monitoring condition as the bitmap field, the monitoring condition component 1030 may be configured as or otherwise support a means for receiving the bitmap field in a field of the DCI message dedicated to selectively enabling or disabling the group-common downlink control channel monitoring, a size of the bitmap field based on a number of frequency resources configured for the multicast/broadcast service within a dedicated bandwidth.

In some examples, the DCI message is a UE-specific physical downlink control channel message received in an active dedicated BWP. In some examples, the DCI message is a group-common physical downlink control channel message, and the bitmap field pertains to at least one of a set of multiple frequency resources for the multicast/broadcast service associated with the group-common physical downlink control channel message or another frequency resource for the multicast/broadcast service. In some examples, the set of multiple frequency resources include the frequency resource. In some examples, the DCI message is a group-common wake-up signal received in a multicast/broadcast service BWP during an inactive time, a dormant time, or an active time.

In some examples, to support receiving the message, the monitoring condition component 1030 may be configured as or otherwise support a means for receiving an explicit indication of the monitoring condition as a search space set group switch indicating at least one of a set of multiple search space set groups that are active for the group-common downlink control channel monitoring.

In some examples, to support receiving the explicit indication of the monitoring condition as the search space set group switch, the monitoring condition component 1030 may be configured as or otherwise support a means for receiving the search space set group switch in a DCI message encoded with a group-common slot format indication radio network temporary identifier configured for the multicast/broadcast service, where the set of multiple search space set groups are configured via RRC signaling.

In some examples, to support receiving the explicit indication of the monitoring condition as the search space set group switch, the monitoring condition component 1030 may be configured as or otherwise support a means for receiving the search space set group switch in a DCI message encoded with a slot format indication radio network temporary identifier, where the set of multiple search space set groups are configured via RRC signaling.

In some examples, the monitoring condition component 1030 may be configured as or otherwise support a means for receiving an RRC message configuring the set of multiple search space set groups, where the RRC message includes one or more expiration timers pertaining to respective search space set groups.

In some examples, to support receiving the message, the activity status component 1040 may be configured as or otherwise support a means for receiving an indication of an activity status for the frequency resource, where the frequency resource is a multicast/broadcast service BWP and the monitoring condition is the activity status, and where applying the monitoring condition includes selectively enabling or disabling the group-common downlink control channel monitoring based on the activity status.

In some examples, the activity status component 1040 may be configured as or otherwise support a means for receiving an indication of a first activity status of a UE-specific BWP that is associated with the frequency resource, where the frequency resource is a multicast/broadcast service BWP and the monitoring condition is the first activity status. In some examples, the activity status component 1040 may be configured as or otherwise support a means for determining a second activity status of the multicast/broadcast service BWP based on the first activity status of the UE-specific BWP, where applying the monitoring condition includes selectively enabling or disabling the group-common downlink control channel monitoring based on the second activity status.

In some examples, the GC-PDCCH component 1035 may be configured as or otherwise support a means for receiving, from a base station, an indication to disable the group-common downlink control channel monitoring based on a multicast/broadcast service traffic threshold being satisfied.

In some examples, to support applying the monitoring condition, the GC-PDCCH component 1035 may be configured as or otherwise support a means for disabling the group-common downlink control channel monitoring while still performing a channel state information measurement, a beam management operation, an uplink feedback transmission, a channel state information report transmission, a sounding reference signal transmission, or a combination thereof.

In some examples, to support applying the monitoring condition, the GC-PDCCH component 1035 may be configured as or otherwise support a means for disabling the group-common downlink control channel monitoring. In some examples, to support applying the monitoring condition, the GC-PDCCH component 1035 may be configured as or otherwise support a means for identifying one or more blind decoding occasions that are available due to the disabling of the group-common downlink control channel monitoring. In some examples, to support applying the monitoring condition, the GC-PDCCH component 1035 may be configured as or otherwise support a means for shifting the one or more blind decoding occasions to be available for unicast downlink control channel monitoring.

In some examples, to support applying the monitoring condition, the feedback component 1045 may be configured as or otherwise support a means for disabling the group-common downlink control channel monitoring based on the monitoring condition. In some examples, to support applying the monitoring condition, the feedback component 1045 may be configured as or otherwise support a means for determining that a negative acknowledgment pertaining to multicast reception was transmitted by the UE, where multicast negative acknowledgment only is configured. In some examples, to support applying the monitoring condition, the feedback component 1045 may be configured as or otherwise support a means for re-enabling the group-common downlink control channel monitoring based on transmission of the negative acknowledgment, where the re-enabling of the group-common downlink control channel monitoring occurs a time offset after transmission of the negative acknowledgment. In some examples, the time offset is set by a UE-specific downlink RTT timer or is configured by a base station.

In some examples, to support applying the monitoring condition, the feedback component 1045 may be configured as or otherwise support a means for disabling the group-common downlink control channel monitoring based on the monitoring condition. In some examples, to support applying the monitoring condition, the feedback component 1045 may be configured as or otherwise support a means for determining that a negative acknowledgment pertaining to multicast reception was transmitted by the UE, where UE-specific acknowledgment and negative acknowledgment for multicast reception is configured. In some examples, to support applying the monitoring condition, the feedback component 1045 may be configured as or otherwise support a means for monitoring for a UE-specific downlink control channel message pertaining to retransmission of a group-common downlink shared channel message with which the negative acknowledgment is associated.

In some examples, the feedback component 1045 may be configured as or otherwise support a means for re-enabling the group-common downlink control channel monitoring based on an absence of the UE-specific downlink control channel message pertaining to retransmission of the group-common downlink shared channel message, where the re-enabling of the group-common downlink control channel monitoring occurs a time offset after transmission of the negative acknowledgment.

In some examples, the feedback component 1045 may be configured as or otherwise support a means for transmitting a UE-specific acknowledgment or a UE-specific negative acknowledgment of receipt of the message, where the UE-specific acknowledgment or the UE-specific negative acknowledgment is transmitted as feedback for receipt of data scheduled by the message.

In some examples, the feedback component 1045 may be configured as or otherwise support a means for transmitting an acknowledgment or a negative acknowledgment of receipt of the message, where the acknowledgment or the negative acknowledgment is transmitted as feedback for receipt of the message.

Figure 11:
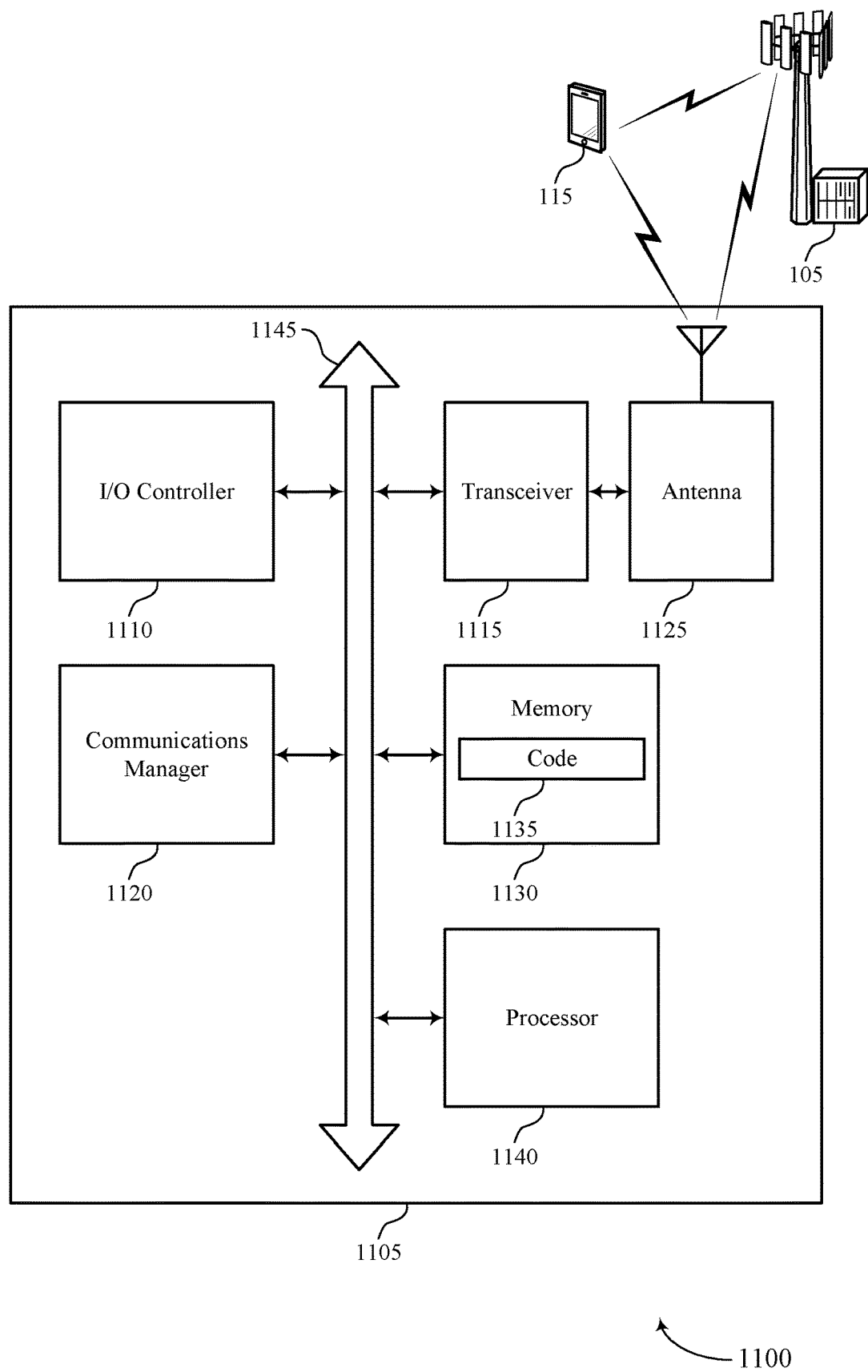
FIG. 11 shows a diagram of a system including a device that supports downlink control channel monitoring for MBS in accordance with aspects of the present disclosure.

FIG. 11 shows a diagram of a system 1100 including a device 1105 that supports downlink control channel monitoring for MB S in accordance with aspects of the present disclosure. The device 1105 may be an example of or include the components of a device 805, a device 905, or a UE 115 as described herein. The device 1105 may communicate wirelessly with one or more base stations 105, UEs 115, or any combination thereof. The device 1105 may include components for bi-directional voice and data communications including components for transmitting and receiving communications, such as a communications manager 1120, an input/output (I/O) controller 1110, a transceiver 1115, an antenna 1125, a memory 1130, code 1135, and a processor 1140. These components may be in electronic communication or otherwise coupled (e.g., operatively, communicatively, functionally, electronically, electrically) via one or more buses (e.g., a bus 1145).

The I/O controller 1110 may manage input and output signals for the device 1105. The I/O controller 1110 may also manage peripherals not integrated into the device 1105. In some cases, the I/O controller 1110 may represent a physical connection or port to an external peripheral. In some cases, the I/O controller 1110 may utilize an operating system such as iOS®, ANDROID®, MS-DOS®, MS-WINDOWS®, OS/2®, UNIX®, LINUX®, or another known operating system. Additionally or alternatively, the I/O controller 1110 may represent or interact with a modem, a keyboard, a mouse, a touchscreen, or a similar device. In some cases, the I/O controller 1110 may be implemented as part of a processor, such as the processor 1140. In some cases, a user may interact with the device 1105 via the I/O controller 1110 or via hardware components controlled by the I/O controller 1110.

In some cases, the device 1105 may include a single antenna 1125. However, in some other cases, the device 1105 may have more than one antenna 1125, which may be capable of concurrently transmitting or receiving multiple wireless transmissions. The transceiver 1115 may communicate bi-directionally, via the one or more antennas 1125, wired, or wireless links as described herein. For example, the transceiver 1115 may represent a wireless transceiver and may communicate bi-directionally with another wireless transceiver. The transceiver 1115 may also include a modem to modulate the packets, to provide the modulated packets to one or more antennas 1125 for transmission, and to demodulate packets received from the one or more antennas 1125. The transceiver 1115, or the transceiver 1115 and one or more antennas 1125, may be an example of a transmitter 815, a transmitter 915, a receiver 810, a receiver 910, or any combination thereof or component thereof, as described herein.

The memory 1130 may include random access memory (RAM) and read-only memory (ROM). The memory 1130 may store computer-readable, computer-executable code 1135 including instructions that, when executed by the processor 1140, cause the device 1105 to perform various functions described herein. The code 1135 may be stored in a non-transitory computer-readable medium such as system memory or another type of memory. In some cases, the code 1135 may not be directly executable by the processor 1140 but may cause a computer (e.g., when compiled and executed) to perform functions described herein. In some cases, the memory 1130 may contain, among other things, a basic I/O system (BIOS) which may control basic hardware or software operation such as the interaction with peripheral components or devices.

The processor 1140 may include an intelligent hardware device (e.g., a general-purpose processor, a DSP, a CPU, a microcontroller, an ASIC, an FPGA, a programmable logic device, a discrete gate or transistor logic component, a discrete hardware component, or any combination thereof). In some cases, the processor 1140 may be configured to operate a memory array using a memory controller. In some other cases, a memory controller may be integrated into the processor 1140. The processor 1140 may be configured to execute computer-readable instructions stored in a memory (e.g., the memory 1130) to cause the device 1105 to perform various functions (e.g., functions or tasks supporting downlink control channel monitoring for MBS). For example, the device 1105 or a component of the device 1105 may include a processor 1140 and memory 1130 coupled to the processor 1140, the processor 1140 and memory 1130 configured to perform various functions described herein.

The communications manager 1120 may support wireless communications at a UE in accordance with examples as disclosed herein. For example, the communications manager 1120 may be configured as or otherwise support a means for receiving a configuration identifying a frequency resource for a multicast/broadcast service to be monitored by the UE for one or more group-common downlink control channels. The communications manager 1120 may be configured as or otherwise support a means for receiving a message indicating a monitoring condition for group-common downlink control channel monitoring within the frequency resource. The communications manager 1120 may be configured as or otherwise support a means for applying the monitoring condition by selectively enabling or disabling the group-common downlink control channel monitoring within the frequency resource.

By including or configuring the communications manager 1120 in accordance with examples as described herein, the device 1105 may support techniques for controlling monitoring of a downlink control channel for multicast transmissions at a UE by configuring the UE with a monitoring condition for one or more frequency resources which may reduce power consumption, cause more efficient utilization of communication resources, improve coordination between devices, and improved utilization of processing capability.

In some examples, the communications manager 1120 may be configured to perform various operations (e.g., receiving, monitoring, transmitting) using or otherwise in cooperation with the transceiver 1115, the one or more antennas 1125, or any combination thereof. Although the communications manager 1120 is illustrated as a separate component, in some examples, one or more functions described with reference to the communications manager 1120 may be supported by or performed by the processor 1140, the memory 1130, the code 1135, or any combination thereof. For example, the code 1135 may include instructions executable by the processor 1140 to cause the device 1105 to perform various aspects of downlink control channel monitoring for MBS as described herein, or the processor 1140 and the memory 1130 may be otherwise configured to perform or support such operations.

Figure 12:
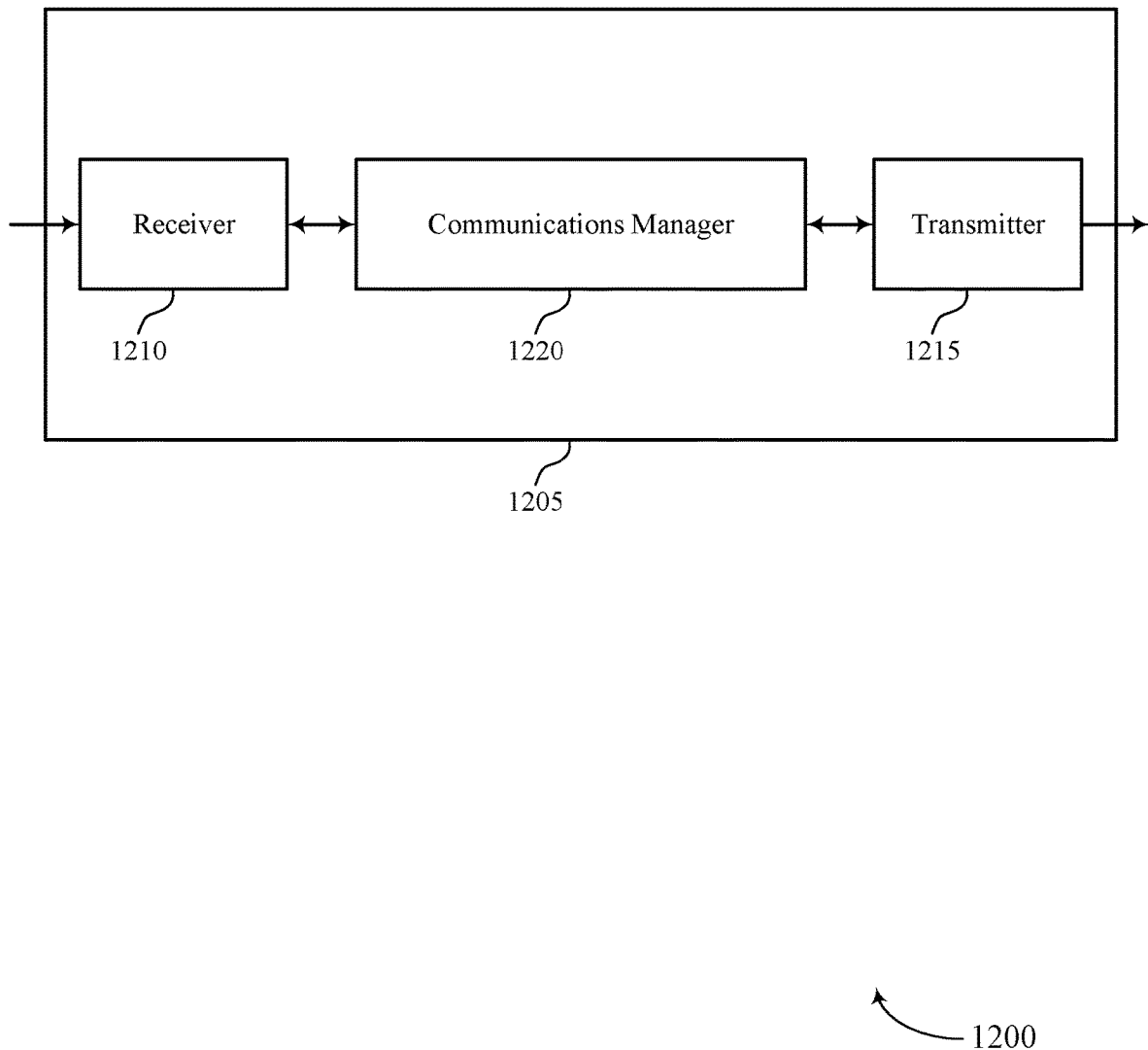
FIGS. 12 and 13 show block diagrams of devices that support downlink control channel monitoring for MBS in accordance with aspects of the present disclosure.

FIG. 12 shows a block diagram 1200 of a device 1205 that supports downlink control channel monitoring for MBS in accordance with aspects of the present disclosure. The device 1205 may be an example of aspects of a base station 105 as described herein. The device 1205 may include a receiver 1210, a transmitter 1215, and a communications manager 1220. The device 1205 may also include a processor. Each of these components may be in communication with one another (e.g., via one or more buses).

The receiver 1210 may provide a means for receiving information such as packets, user data, control information, or any combination thereof associated with various information channels (e.g., control channels, data channels, information channels related to downlink control channel monitoring for MBS). Information may be passed on to other components of the device 1205. The receiver 1210 may utilize a single antenna or a set of multiple antennas.

The transmitter 1215 may provide a means for transmitting signals generated by other components of the device 1205. For example, the transmitter 1215 may transmit information such as packets, user data, control information, or any combination thereof associated with various information channels (e.g., control channels, data channels, information channels related to downlink control channel monitoring for MBS). In some examples, the transmitter 1215 may be co-located with a receiver 1210 in a transceiver module. The transmitter 1215 may utilize a single antenna or a set of multiple antennas.

The communications manager 1220, the receiver 1210, the transmitter 1215, or various combinations thereof or various components thereof may be examples of means for performing various aspects of downlink control channel monitoring for MBS as described herein. For example, the communications manager 1220, the receiver 1210, the transmitter 1215, or various combinations or components thereof may support a method for performing one or more of the functions described herein.

In some examples, the communications manager 1220, the receiver 1210, the transmitter 1215, or various combinations or components thereof may be implemented in hardware (e.g., in communications management circuitry). The hardware may include a processor, a DSP, an ASIC, an FPGA or other programmable logic device, a discrete gate or transistor logic, discrete hardware components, or any combination thereof configured as or otherwise supporting a means for performing the functions described in the present disclosure. In some examples, a processor and memory coupled with the processor may be configured to perform one or more of the functions described herein (e.g., by executing, by the processor, instructions stored in the memory).

Additionally or alternatively, in some examples, the communications manager 1220, the receiver 1210, the transmitter 1215, or various combinations or components thereof may be implemented in code (e.g., as communications management software or firmware) executed by a processor. If implemented in code executed by a processor, the functions of the communications manager 1220, the receiver 1210, the transmitter 1215, or various combinations or components thereof may be performed by a general-purpose processor, a DSP, a CPU, an ASIC, an FPGA, or any combination of these or other programmable logic devices (e.g., configured as or otherwise supporting a means for performing the functions described in the present disclosure).

In some examples, the communications manager 1220 may be configured to perform various operations (e.g., receiving, monitoring, transmitting) using or otherwise in cooperation with the receiver 1210, the transmitter 1215, or both. For example, the communications manager 1220 may receive information from the receiver 1210, send information to the transmitter 1215, or be integrated in combination with the receiver 1210, the transmitter 1215, or both to receive information, transmit information, or perform various other operations as described herein.

The communications manager 1220 may support wireless communications at a base station in accordance with examples as disclosed herein. For example, the communications manager 1220 may be configured as or otherwise support a means for transmitting a configuration identifying a frequency resource for a multicast/broadcast service to be monitored by a UE for one or more group-common downlink control channels. The communications manager 1220 may be configured as or otherwise support a means for transmitting a message indicating a monitoring condition for group-common downlink control channel monitoring within the frequency resource. The communications manager 1220 may be configured as or otherwise support a means for communicating with the UE in accordance with the monitoring condition, where the monitoring condition selectively enables or disables the group-common downlink control channel monitoring within the frequency resource.

By including or configuring the communications manager 1220 in accordance with examples as described herein, the device 1205 (e.g., a processor controlling or otherwise coupled to the receiver 1210, the transmitter 1215, the communications manager 1220, or a combination thereof) may support techniques for controlling monitoring of a downlink control channel for multicast transmissions at a UE by configuring the UE with a monitoring condition for one or more frequency resources which may reduce processing, reduce power consumption, and cause more efficient utilization of communication resources.

Figure 13:
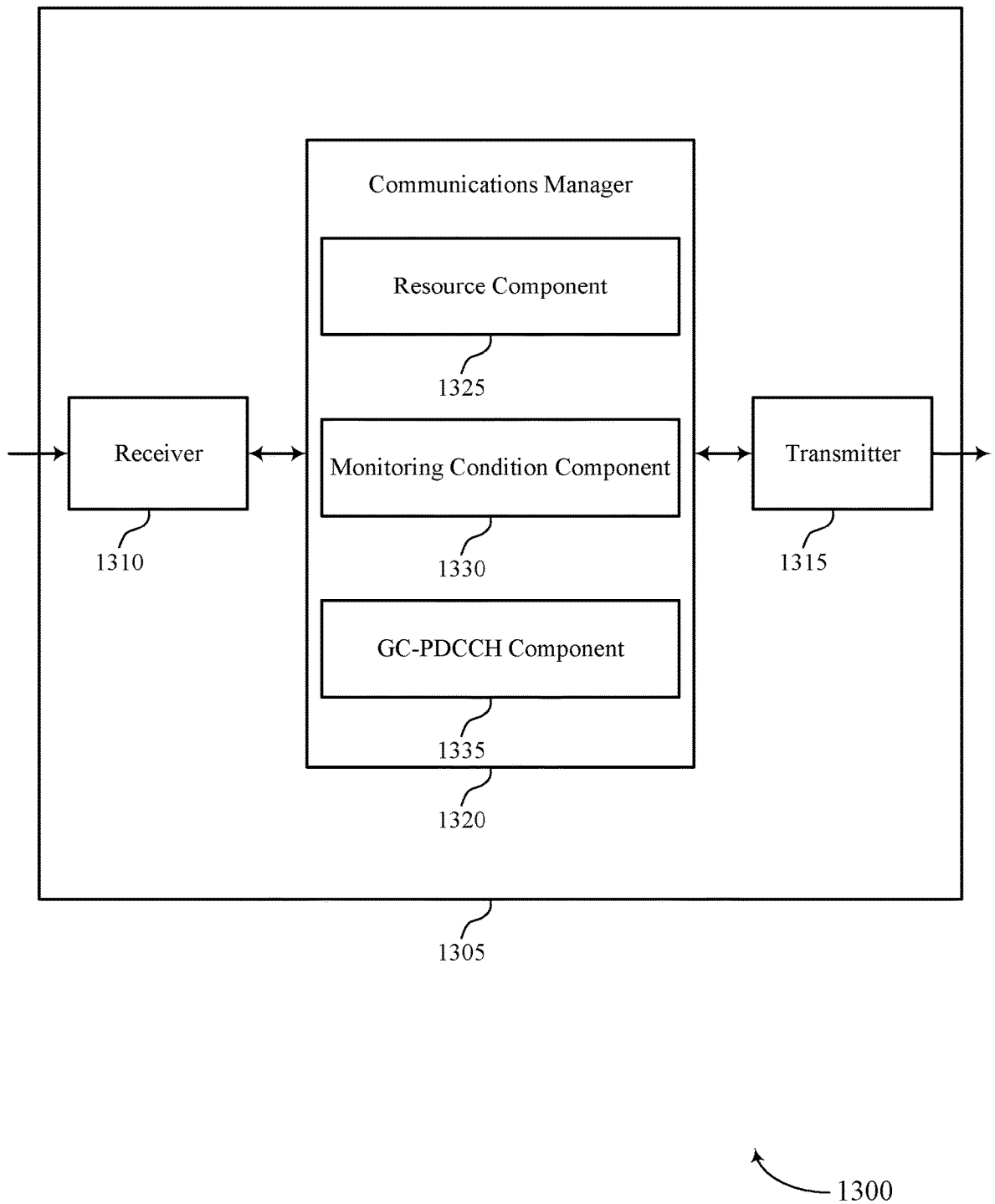

FIG. 13 shows a block diagram 1300 of a device 1305 that supports downlink control channel monitoring for MBS in accordance with aspects of the present disclosure. The device 1305 may be an example of aspects of a device 1205 or a base station 105 as described herein. The device 1305 may include a receiver 1310, a transmitter 1315, and a communications manager 1320. The device 1305 may also include a processor. Each of these components may be in communication with one another (e.g., via one or more buses).

The receiver 1310 may provide a means for receiving information such as packets, user data, control information, or any combination thereof associated with various information channels (e.g., control channels, data channels, information channels related to downlink control channel monitoring for MBS). Information may be passed on to other components of the device 1305. The receiver 1310 may utilize a single antenna or a set of multiple antennas.

The transmitter 1315 may provide a means for transmitting signals generated by other components of the device 1305. For example, the transmitter 1315 may transmit information such as packets, user data, control information, or any combination thereof associated with various information channels (e.g., control channels, data channels, information channels related to downlink control channel monitoring for MBS). In some examples, the transmitter 1315 may be co-located with a receiver 1310 in a transceiver module. The transmitter 1315 may utilize a single antenna or a set of multiple antennas.

The device 1305, or various components thereof, may be an example of means for performing various aspects of downlink control channel monitoring for MBS as described herein. For example, the communications manager 1320 may include a resource component 1325, a monitoring condition component 1330, a GC-PDCCH component 1335, or any combination thereof. The communications manager 1320 may be an example of aspects of a communications manager 1220 as described herein. In some examples, the communications manager 1320, or various components thereof, may be configured to perform various operations (e.g., receiving, monitoring, transmitting) using or otherwise in cooperation with the receiver 1310, the transmitter 1315, or both. For example, the communications manager 1320 may receive information from the receiver 1310, send information to the transmitter 1315, or be integrated in combination with the receiver 1310, the transmitter 1315, or both to receive information, transmit information, or perform various other operations as described herein.

The communications manager 1320 may support wireless communications at a base station in accordance with examples as disclosed herein. The resource component 1325 may be configured as or otherwise support a means for transmitting a configuration identifying a frequency resource for a multicast/broadcast service to be monitored by a UE for one or more group-common downlink control channels. The monitoring condition component 1330 may be configured as or otherwise support a means for transmitting a message indicating a monitoring condition for group-common downlink control channel monitoring within the frequency resource. The GC-PDCCH component 1335 may be configured as or otherwise support a means for communicating with the UE in accordance with the monitoring condition, where the monitoring condition selectively enables or disables the group-common downlink control channel monitoring within the frequency resource.

Figure 14:
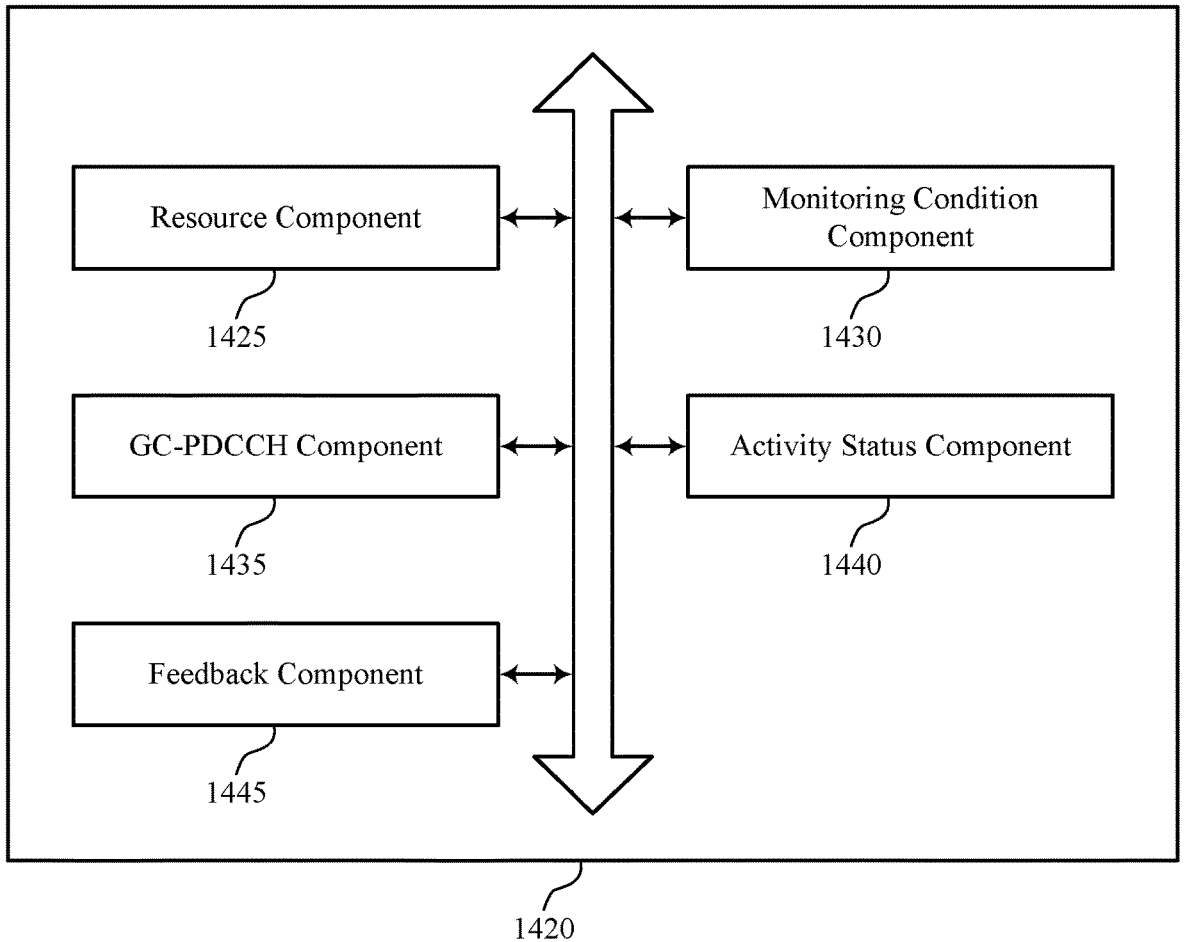
FIG. 14 shows a block diagram of a communications manager that supports downlink control channel monitoring for MB S in accordance with aspects of the present disclosure.

FIG. 14 shows a block diagram 1400 of a communications manager 1420 that supports downlink control channel monitoring for MB S in accordance with aspects of the present disclosure. The communications manager 1420 may be an example of aspects of a communications manager 1220, a communications manager 1320, or both, as described herein. The communications manager 1420, or various components thereof, may be an example of means for performing various aspects of downlink control channel monitoring for MBS as described herein. For example, the communications manager 1420 may include a resource component 1425, a monitoring condition component 1430, a GC-PDCCH component 1435, an activity status component 1440, a feedback component 1445, or any combination thereof. Each of these components may communicate, directly or indirectly, with one another (e.g., via one or more buses).

The communications manager 1420 may support wireless communications at a base station in accordance with examples as disclosed herein. The resource component 1425 may be configured as or otherwise support a means for transmitting a configuration identifying a frequency resource for a multicast/broadcast service to be monitored by a UE for one or more group-common downlink control channels. The monitoring condition component 1430 may be configured as or otherwise support a means for transmitting a message indicating a monitoring condition for group-common downlink control channel monitoring within the frequency resource. The GC-PDCCH component 1435 may be configured as or otherwise support a means for communicating with the UE in accordance with the monitoring condition, where the monitoring condition selectively enables or disables the group-common downlink control channel monitoring within the frequency resource.

In some examples, the monitoring condition disables the group-common downlink control channel monitoring prior to expiration of a DRX active timer.

In some examples, to support transmitting the message, the monitoring condition component 1430 may be configured as or otherwise support a means for transmitting an explicit indication of the monitoring condition via one of an RRC message, a MAC-CE, or a DCI message.

In some examples, to support transmitting the message, the monitoring condition component 1430 may be configured as or otherwise support a means for transmitting an explicit indication of the monitoring condition as a timer via an RRC message, where the monitoring condition selectively disables the group-common downlink control channel monitoring during pendency of the timer.

In some examples, to support transmitting the message, the monitoring condition component 1430 may be configured as or otherwise support a means for transmitting an explicit indication of the monitoring condition as a bitmap field via a DCI message, where the monitoring condition selectively enables or disables the group-common downlink control channel monitoring on a frequency resource basis based on the bitmap field.

In some examples, to support transmitting the explicit indication of the monitoring condition as the bitmap field, the monitoring condition component 1430 may be configured as or otherwise support a means for transmitting the bitmap field in a BWP identification field when the BWP identification field is not being used to indicate BWP switching.

In some examples, to support transmitting the explicit indication of the monitoring condition as the bitmap field, the monitoring condition component 1430 may be configured as or otherwise support a means for transmitting the bitmap field in a field of the DCI message dedicated to selectively enabling or disabling the group-common downlink control channel monitoring, a size of the bitmap field based on a number of frequency resources configured for the multicast/broadcast service within a dedicated bandwidth.

In some examples, the DCI message is a UE-specific physical downlink control channel message transmitted in an active dedicated BWP.

In some examples, the DCI message is a group-common physical downlink control channel message, and the bitmap field pertains to at least one of a set of multiple frequency resources for the multicast/broadcast service associated with the group-common physical downlink control channel message or another frequency resource for the multicast/broadcast service. In some examples, the set of multiple frequency resources include the frequency resource.

In some examples, the DCI message is a group-common wake-up signal transmitted in a multicast/broadcast service BWP during an inactive time, a dormant time, or an active time.

In some examples, to support transmitting the message, the monitoring condition component 1430 may be configured as or otherwise support a means for transmitting an explicit indication of the monitoring condition as a search space set group switch indicating at least one of a set of multiple search space set groups that are active for the group-common downlink control channel monitoring.

In some examples, to support transmitting the explicit indication of the monitoring condition as the search space set group switch, the monitoring condition component 1430 may be configured as or otherwise support a means for transmitting the search space set group switch in a DCI message encoded with a group-common slot format indication radio network temporary identifier configured for the multicast/broadcast service, where the set of multiple search space set groups are configured via RRC signaling.

In some examples, to support transmitting the explicit indication of the monitoring condition as the search space set group switch, the monitoring condition component 1430 may be configured as or otherwise support a means for transmitting the search space set group switch in a DCI message encoded with a slot format indication radio network temporary identifier, where the set of multiple search space set groups are configured via RRC signaling.

In some examples, the monitoring condition component 1430 may be configured as or otherwise support a means for transmitting an RRC message configuring the set of multiple search space set groups, where the RRC message includes one or more expiration timers pertaining to respective search space set groups.

In some examples, to support transmitting the message, the activity status component 1440 may be configured as or otherwise support a means for transmitting an indication of an activity status for the frequency resource, where the frequency resource is a multicast/broadcast service BWP and the monitoring condition is the activity status, and where the monitoring condition selectively enables or disables the group-common downlink control channel monitoring based on the activity status.

In some examples, the activity status component 1440 may be configured as or otherwise support a means for transmitting an indication of a first activity status of a UE-specific BWP that is associated with the frequency resource, where the frequency resource is a multicast/broadcast service BWP and the monitoring condition is the first activity status.

In some examples, the GC-PDCCH component 1435 may be configured as or otherwise support a means for transmitting, to the UE, an indication to disable the group-common downlink control channel monitoring based on a multicast/broadcast service traffic threshold being satisfied.

In some examples, the monitoring condition disables the group-common downlink control channel monitoring while still performing a channel state information measurement, a beam management operation, an uplink feedback transmission, a channel state information report transmission, a sounding reference signal transmission, or a combination thereof.

In some examples, the feedback component 1445 may be configured as or otherwise support a means for receiving a UE-specific acknowledgment or a UE-specific negative acknowledgment of receipt of the message, where the UE-specific acknowledgment or the UE-specific negative acknowledgement is received as feedback for receipt of data scheduled by the message.

In some examples, the feedback component 1445 may be configured as or otherwise support a means for receiving an acknowledgment or a negative acknowledgment of receipt of the message, where the acknowledgment or the negative acknowledgement is received as feedback for receipt of the message.

Figure 15:
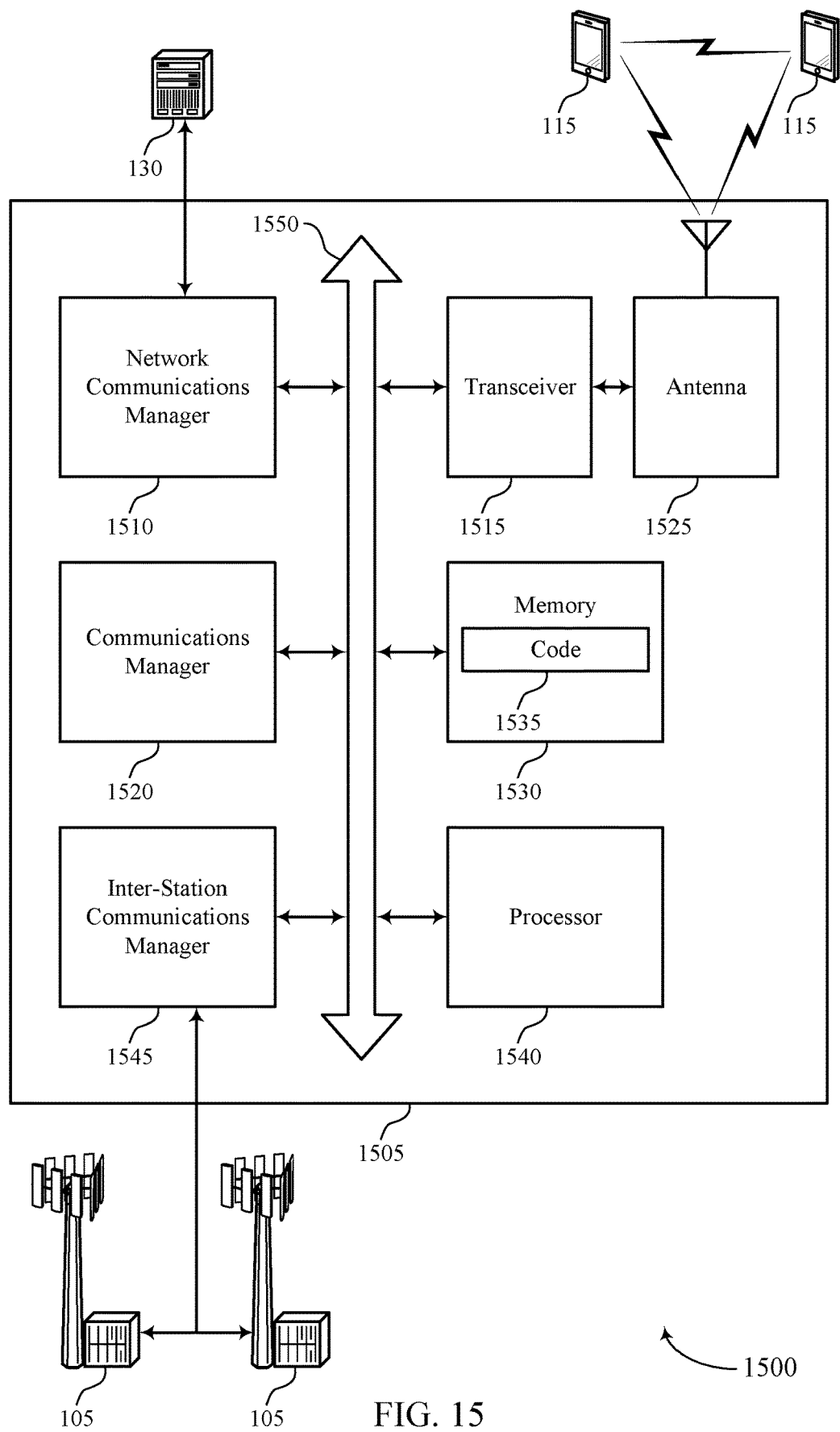
FIG. 15 shows a diagram of a system including a device that supports downlink control channel monitoring for MBS in accordance with aspects of the present disclosure.

FIG. 15 shows a diagram of a system 1500 including a device 1505 that supports downlink control channel monitoring for MBS in accordance with aspects of the present disclosure. The device 1505 may be an example of or include the components of a device 1205, a device 1305, or a base station 105 as described herein. The device 1505 may communicate wirelessly with one or more base stations 105, UEs 115, or any combination thereof. The device 1505 may include components for bi-directional voice and data communications including components for transmitting and receiving communications, such as a communications manager 1520, a network communications manager 1510, a transceiver 1515, an antenna 1525, a memory 1530, code 1535, a processor 1540, and an inter-station communications manager 1545. These components may be in electronic communication or otherwise coupled (e.g., operatively, communicatively, functionally, electronically, electrically) via one or more buses (e.g., a bus 1550).

The network communications manager 1510 may manage communications with a core network 130 (e.g., via one or more wired backhaul links). For example, the network communications manager 1510 may manage the transfer of data communications for client devices, such as one or more UEs 115.

In some cases, the device 1505 may include a single antenna 1525. However, in some other cases the device 1505 may have more than one antenna 1525, which may be capable of concurrently transmitting or receiving multiple wireless transmissions. The transceiver 1515 may communicate bi-directionally, via the one or more antennas 1525, wired, or wireless links as described herein. For example, the transceiver 1515 may represent a wireless transceiver and may communicate bi-directionally with another wireless transceiver. The transceiver 1515 may also include a modem to modulate the packets, to provide the modulated packets to one or more antennas 1525 for transmission, and to demodulate packets received from the one or more antennas 1525. The transceiver 1515, or the transceiver 1515 and one or more antennas 1525, may be an example of a transmitter 1215, a transmitter 1315, a receiver 1210, a receiver 1310, or any combination thereof or component thereof, as described herein.

The memory 1530 may include RAM and ROM. The memory 1530 may store computer-readable, computer-executable code 1535 including instructions that, when executed by the processor 1540, cause the device 1505 to perform various functions described herein. The code 1535 may be stored in a non-transitory computer-readable medium such as system memory or another type of memory. In some cases, the code 1535 may not be directly executable by the processor 1540 but may cause a computer (e.g., when compiled and executed) to perform functions described herein. In some cases, the memory 1530 may contain, among other things, a BIOS which may control basic hardware or software operation such as the interaction with peripheral components or devices.

The processor 1540 may include an intelligent hardware device (e.g., a general-purpose processor, a DSP, a CPU, a microcontroller, an ASIC, an FPGA, a programmable logic device, a discrete gate or transistor logic component, a discrete hardware component, or any combination thereof). In some cases, the processor 1540 may be configured to operate a memory array using a memory controller. In some other cases, a memory controller may be integrated into the processor 1540. The processor 1540 may be configured to execute computer-readable instructions stored in a memory (e.g., the memory 1530) to cause the device 1505 to perform various functions (e.g., functions or tasks supporting downlink control channel monitoring for MBS). For example, the device 1505 or a component of the device 1505 may include a processor 1540 and memory 1530 coupled to the processor 1540, the processor 1540 and memory 1530 configured to perform various functions described herein.

The inter-station communications manager 1545 may manage communications with other base stations 105, and may include a controller or scheduler for controlling communications with UEs 115 in cooperation with other base stations 105. For example, the inter-station communications manager 1545 may coordinate scheduling for transmissions to UEs 115 for various interference mitigation techniques such as beamforming or joint transmission. In some examples, the inter-station communications manager 1545 may provide an X2 interface within an LTE/LTE-A wireless communications network technology to provide communication between base stations 105.

The communications manager 1520 may support wireless communications at a base station in accordance with examples as disclosed herein. For example, the communications manager 1520 may be configured as or otherwise support a means for transmitting a configuration identifying a frequency resource for a multicast/broadcast service to be monitored by a UE for one or more group-common downlink control channels. The communications manager 1520 may be configured as or otherwise support a means for transmitting a message indicating a monitoring condition for group-common downlink control channel monitoring within the frequency resource. The communications manager 1520 may be configured as or otherwise support a means for communicating with the UE in accordance with the monitoring condition, where the monitoring condition selectively enables or disables the group-common downlink control channel monitoring within the frequency resource.

By including or configuring the communications manager 1520 in accordance with examples as described herein, the device 1505 may support techniques for controlling monitoring of a downlink control channel for multicast transmissions at a UE by configuring the UE with a monitoring condition for one or more frequency resources which may improve communication reliability, improve user experience related to reduced processing, reduce power consumption, cause more efficient utilization of communication resources, improve coordination between devices, increase battery life, and improve utilization of processing capability.

In some examples, the communications manager 1520 may be configured to perform various operations (e.g., receiving, monitoring, transmitting) using or otherwise in cooperation with the transceiver 1515, the one or more antennas 1525, or any combination thereof. Although the communications manager 1520 is illustrated as a separate component, in some examples, one or more functions described with reference to the communications manager 1520 may be supported by or performed by the processor 1540, the memory 1530, the code 1535, or any combination thereof. For example, the code 1535 may include instructions executable by the processor 1540 to cause the device 1505 to perform various aspects of downlink control channel monitoring for MBS as described herein, or the processor 1540 and the memory 1530 may be otherwise configured to perform or support such operations.

Figure 16:
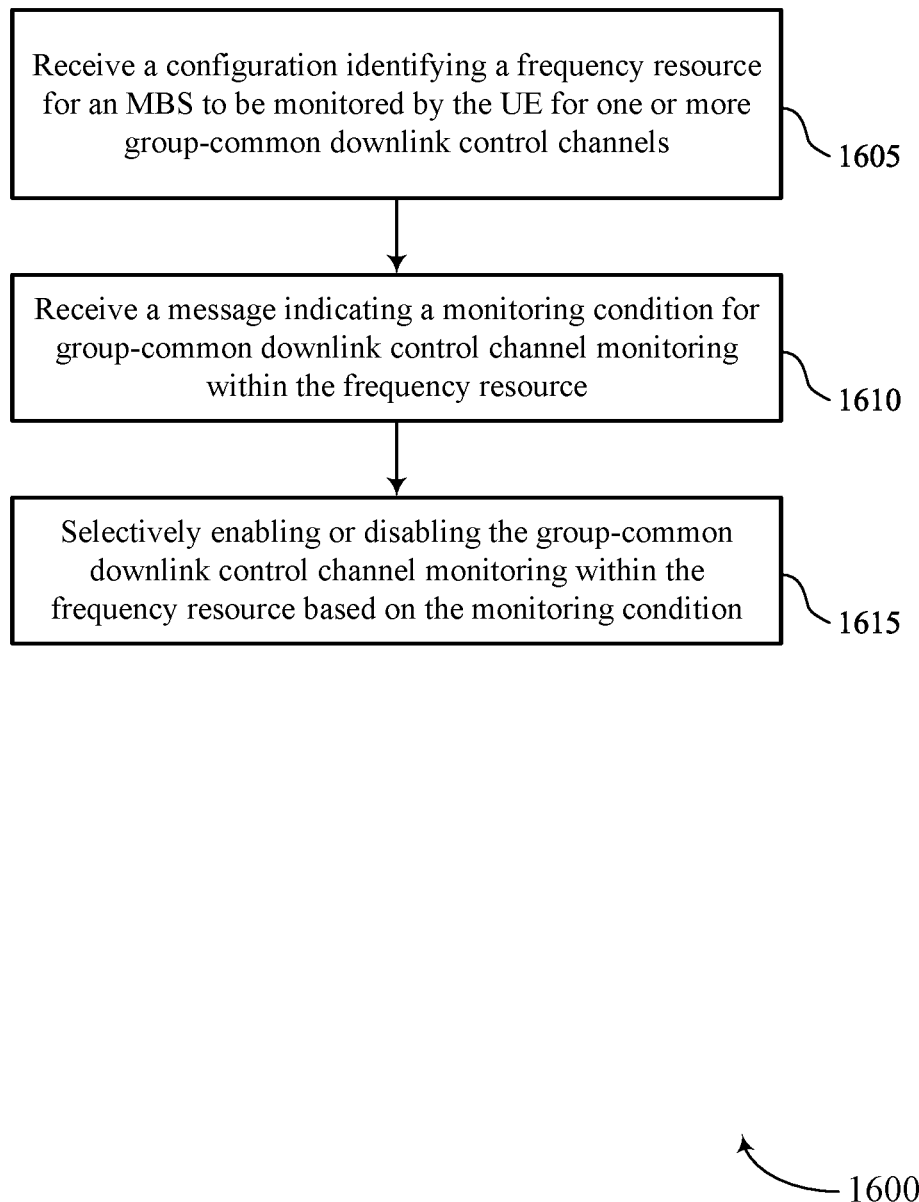
FIGS. 16 through 20 show flowcharts illustrating methods that support downlink control channel monitoring for MBS in accordance with aspects of the present disclosure.

FIG. 16 shows a flowchart illustrating a method 1600 that supports downlink control channel monitoring for MBS in accordance with aspects of the present disclosure. The operations of the method 1600 may be implemented by a UE or its components as described herein. For example, the operations of the method 1600 may be performed by a UE 115 as described with reference to FIGS. 1 through 11. In some examples, a UE may execute a set of instructions to control the functional elements of the UE to perform the described functions. Additionally or alternatively, the UE may perform aspects of the described functions using special-purpose hardware.

At 1605, the method may include receiving a configuration identifying a frequency resource for a multicast/broadcast service to be monitored by the UE for one or more group-common downlink control channels. The operations of 1605 may be performed in accordance with examples as disclosed herein. In some examples, aspects of the operations of 1605 may be performed by a resource component 1025 as described with reference to FIG. 10.

At 1610, the method may include receiving a message indicating a monitoring condition for group-common downlink control channel monitoring within the frequency resource. The operations of 1610 may be performed in accordance with examples as disclosed herein. In some examples, aspects of the operations of 1610 may be performed by a monitoring condition component 1030 as described with reference to FIG. 10.

At 1615, the method may include selectively enabling or disabling the group-common downlink control channel monitoring within the frequency resource based on the monitoring condition. The operations of 1615 may be performed in accordance with examples as disclosed herein. In some examples, aspects of the operations of 1615 may be performed by a GC-PDCCH component 1035 as described with reference to FIG. 10.

Figure 17:
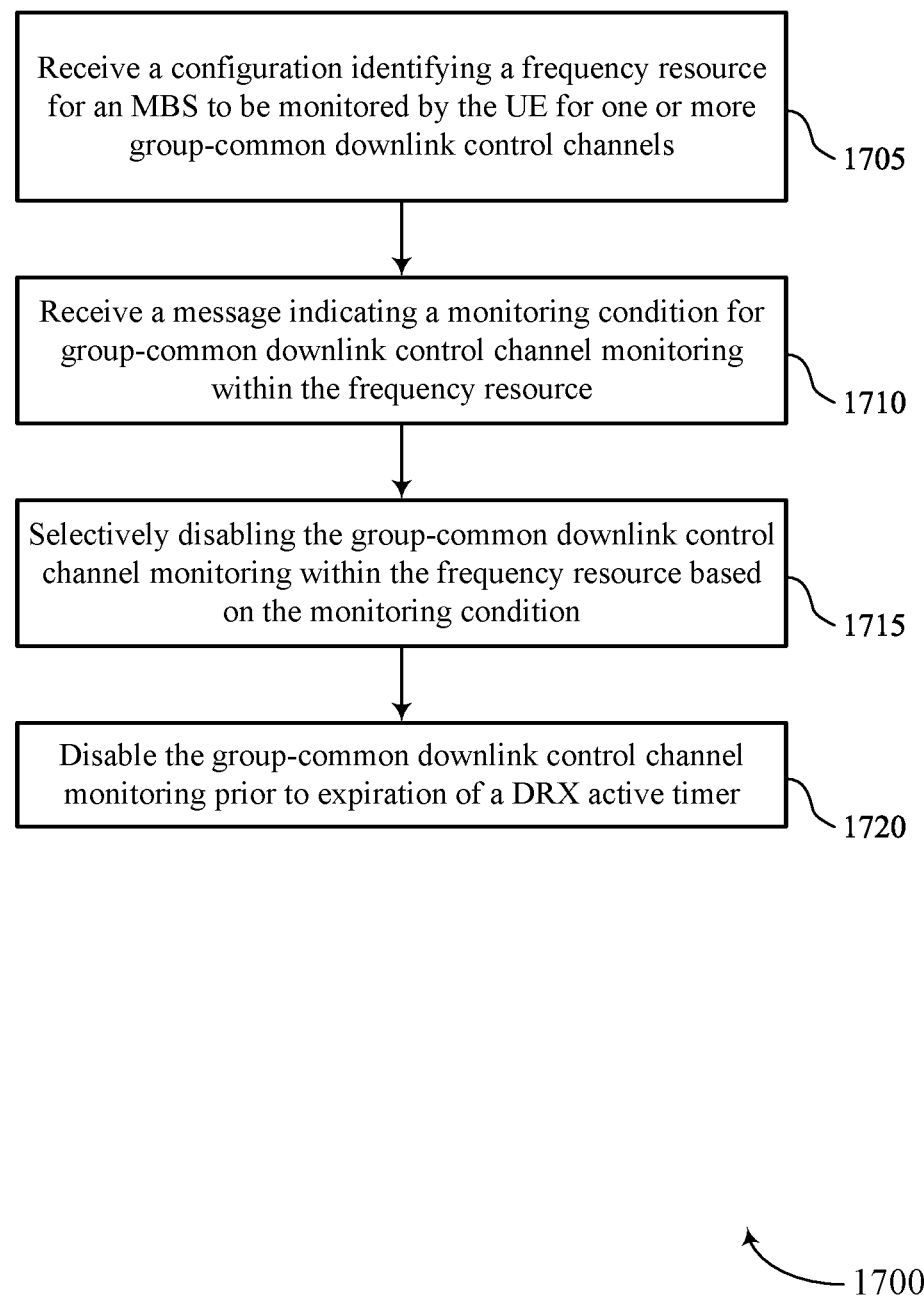

FIG. 17 shows a flowchart illustrating a method 1700 that supports downlink control channel monitoring for MBS in accordance with aspects of the present disclosure. The operations of the method 1700 may be implemented by a UE or its components as described herein. For example, the operations of the method 1700 may be performed by a UE 115 as described with reference to FIGS. 1 through 11. In some examples, a UE may execute a set of instructions to control the functional elements of the UE to perform the described functions. Additionally or alternatively, the UE may perform aspects of the described functions using special-purpose hardware.

At 1705, the method may include receiving a configuration identifying a frequency resource for a multicast/broadcast service to be monitored by the UE for one or more group-common downlink control channels. The operations of 1705 may be performed in accordance with examples as disclosed herein. In some examples, aspects of the operations of 1705 may be performed by a resource component 1025 as described with reference to FIG. 10.

At 1710, the method may include receiving a message indicating a monitoring condition for group-common downlink control channel monitoring within the frequency resource. The operations of 1710 may be performed in accordance with examples as disclosed herein. In some examples, aspects of the operations of 1710 may be performed by a monitoring condition component 1030 as described with reference to FIG. 10.

At 1715, the method may include selectively disabling the group-common downlink control channel monitoring within the frequency resource based on the monitoring condition. The operations of 1715 may be performed in accordance with examples as disclosed herein. In some examples, aspects of the operations of 1715 may be performed by a GC-PDCCH component 1035 as described with reference to FIG. 10.

At 1720, the method may include disabling the group-common downlink control channel monitoring prior to expiration of a DRX active timer. The operations of 1720 may be performed in accordance with examples as disclosed herein. In some examples, aspects of the operations of 1720 may be performed by a GC-PDCCH component 1035 as described with reference to FIG. 10.

Figure 18:
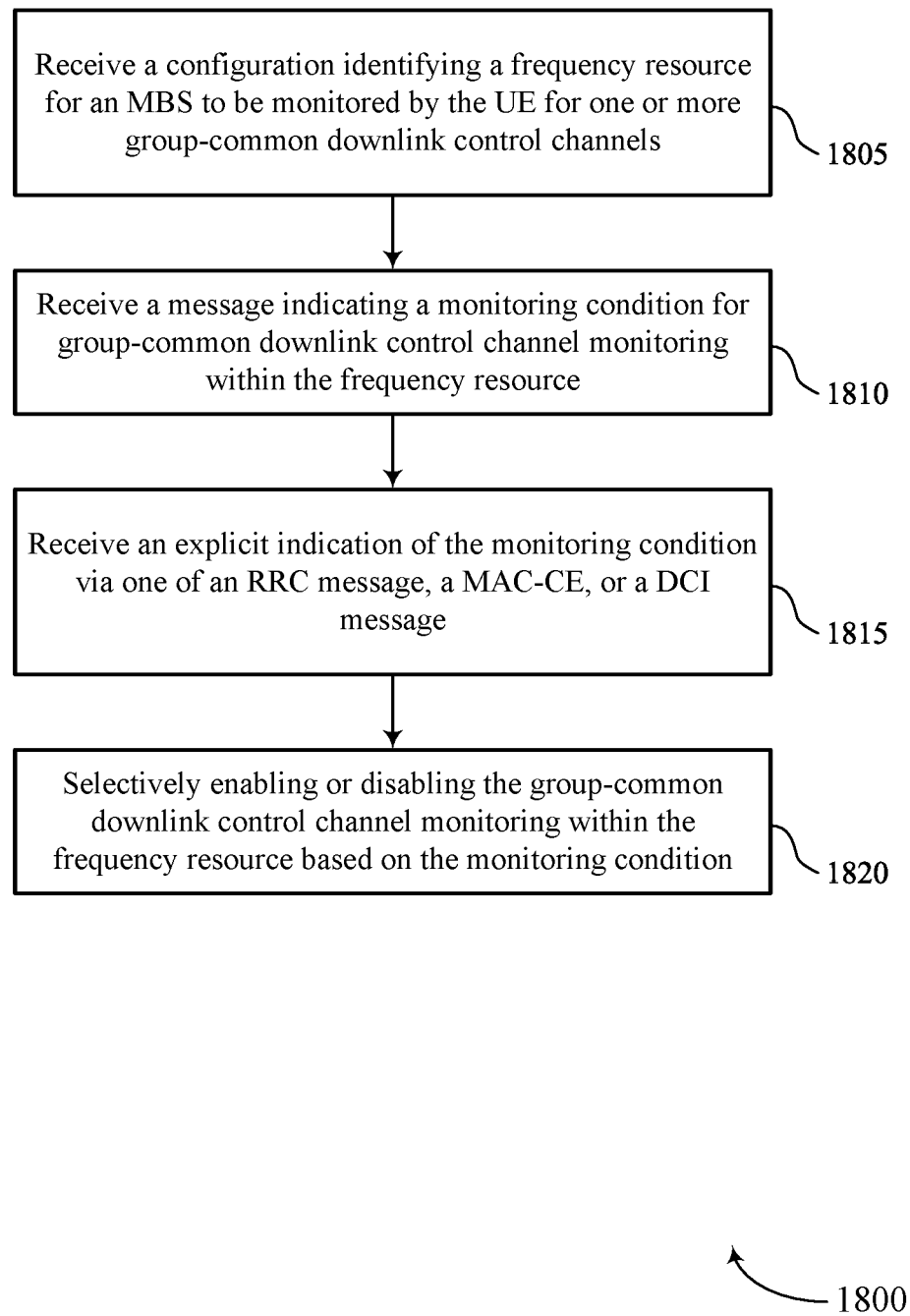

FIG. 18 shows a flowchart illustrating a method 1800 that supports downlink control channel monitoring for MBS in accordance with aspects of the present disclosure. The operations of the method 1800 may be implemented by a UE or its components as described herein. For example, the operations of the method 1800 may be performed by a UE 115 as described with reference to FIGS. 1 through 11. In some examples, a UE may execute a set of instructions to control the functional elements of the UE to perform the described functions. Additionally or alternatively, the UE may perform aspects of the described functions using special-purpose hardware.

At 1805, the method may include receiving a configuration identifying a frequency resource for a multicast/broadcast service to be monitored by the UE for one or more group-common downlink control channels. The operations of 1805 may be performed in accordance with examples as disclosed herein. In some examples, aspects of the operations of 1805 may be performed by a resource component 1025 as described with reference to FIG. 10.

At 1810, the method may include receiving a message indicating a monitoring condition for group-common downlink control channel monitoring within the frequency resource. The operations of 1810 may be performed in accordance with examples as disclosed herein. In some examples, aspects of the operations of 1810 may be performed by a monitoring condition component 1030 as described with reference to FIG. 10.

At 1815, the method may include receiving an explicit indication of the monitoring condition via one of an RRC message, a MAC-CE, or a DCI message. The operations of 1815 may be performed in accordance with examples as disclosed herein. In some examples, aspects of the operations of 1815 may be performed by a monitoring condition component 1030 as described with reference to FIG. 10.

At 1820, the method may include selectively enabling or disabling the group-common downlink control channel monitoring within the frequency resource based on the monitoring condition. The operations of 1820 may be performed in accordance with examples as disclosed herein. In some examples, aspects of the operations of 1820 may be performed by a GC-PDCCH component 1035 as described with reference to FIG. 10.

Figure 19:
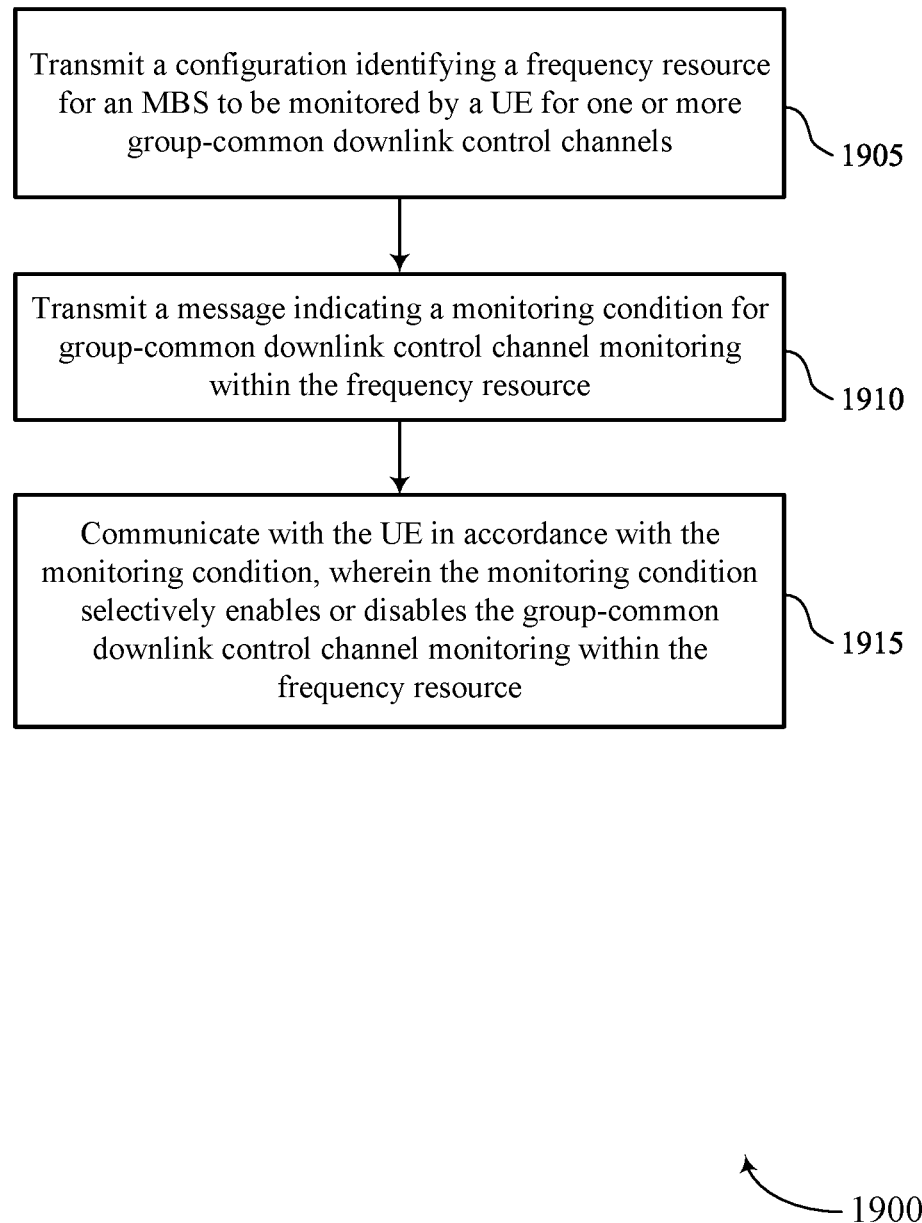

FIG. 19 shows a flowchart illustrating a method 1900 that supports downlink control channel monitoring for MBS in accordance with aspects of the present disclosure. The operations of the method 1900 may be implemented by a base station or its components as described herein. For example, the operations of the method 1900 may be performed by a base station 105 as described with reference to FIGS. 1 through 7 and 12 through 15. In some examples, a base station may execute a set of instructions to control the functional elements of the base station to perform the described functions. Additionally or alternatively, the base station may perform aspects of the described functions using special-purpose hardware.

At 1905, the method may include transmitting a configuration identifying a frequency resource for a multicast/ broadcast service to be monitored by a UE for one or more group-common downlink control channels. The operations of 1905 may be performed in accordance with examples as disclosed herein. In some examples, aspects of the operations of 1905 may be performed by a resource component 1425 as described with reference to FIG. 14.

At 1910, the method may include transmitting a message indicating a monitoring condition for group-common downlink control channel monitoring within the frequency resource. The operations of 1910 may be performed in accordance with examples as disclosed herein. In some examples, aspects of the operations of 1910 may be performed by a monitoring condition component 1430 as described with reference to FIG. 14.

At 1915, the method may include communicating with the UE in accordance with the monitoring condition, where the monitoring condition selectively enables or disables the group-common downlink control channel monitoring within the frequency resource. The operations of 1915 may be performed in accordance with examples as disclosed herein. In some examples, aspects of the operations of 1915 may be performed by a GC-PDCCH component 1435 as described with reference to FIG. 14.

Figure 20:
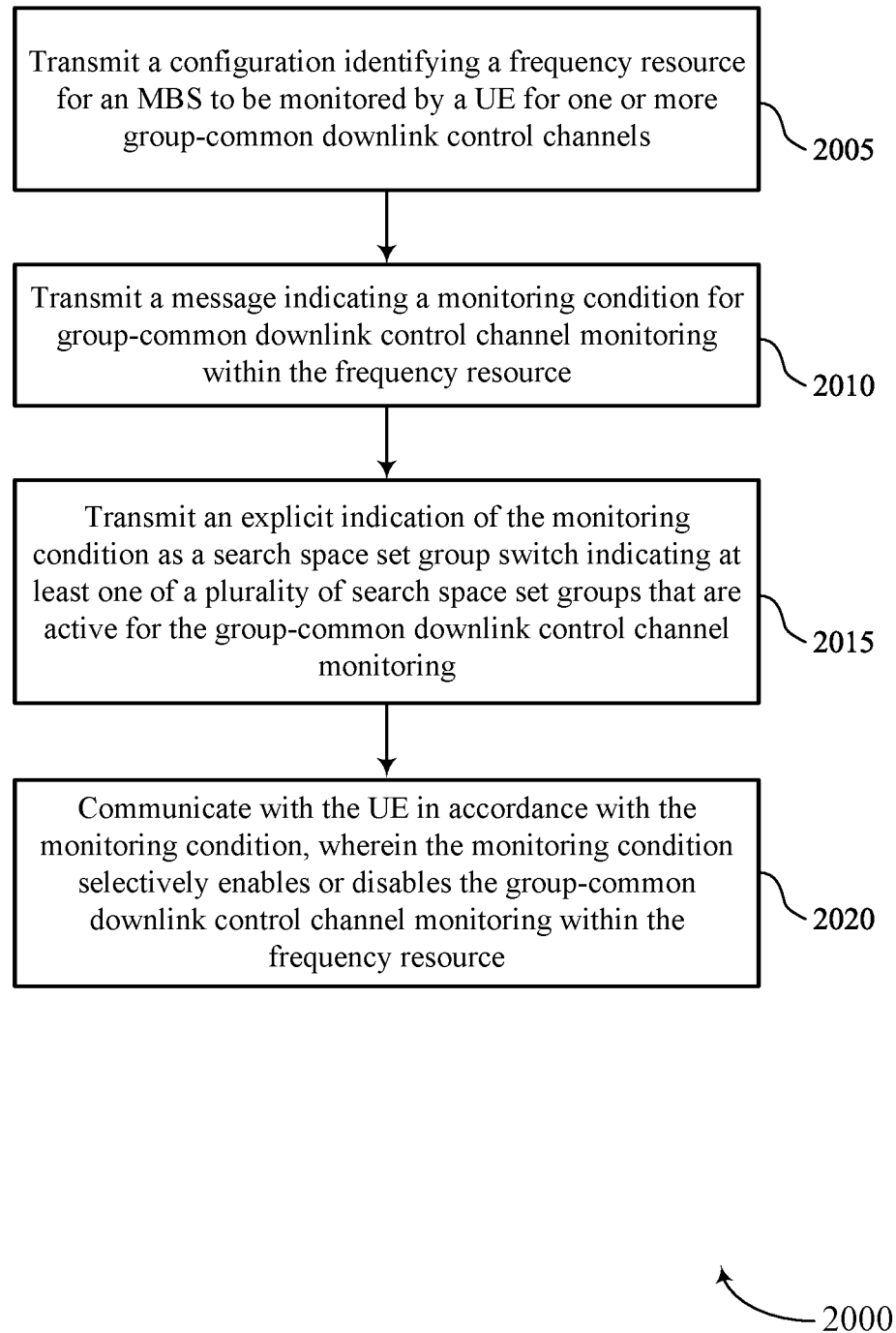

FIG. 20 shows a flowchart illustrating a method 2000 that supports downlink control channel monitoring for MBS in accordance with aspects of the present disclosure. The operations of the method 2000 may be implemented by a base station or its components as described herein. For example, the operations of the method 2000 may be performed by a base station 105 as described with reference to FIGS. 1 through 7 and 12 through 15. In some examples, a base station may execute a set of instructions to control the functional elements of the base station to perform the described functions. Additionally or alternatively, the base station may perform aspects of the described functions using special-purpose hardware.

At 2005, the method may include transmitting a configuration identifying a frequency resource for a multicast/ broadcast service to be monitored by a UE for one or more group-common downlink control channels. The operations of 2005 may be performed in accordance with examples as disclosed herein. In some examples, aspects of the operations of 2005 may be performed by a resource component 1425 as described with reference to FIG. 14.

At 2010, the method may include transmitting a message indicating a monitoring condition for group-common downlink control channel monitoring within the frequency resource. The operations of 2010 may be performed in accordance with examples as disclosed herein. In some examples, aspects of the operations of 2010 may be performed by a monitoring condition component 1430 as described with reference to FIG. 14.

At 2015, the method may include transmitting an explicit indication of the monitoring condition as a search space set group switch indicating at least one of a set of multiple search space set groups that are active for the group-common downlink control channel monitoring. The operations of 2015 may be performed in accordance with examples as disclosed herein. In some examples, aspects of the operations of 2015 may be performed by a monitoring condition component 1430 as described with reference to FIG. 14.

At 2020, the method may include communicating with the UE in accordance with the monitoring condition, where the monitoring condition selectively enables or disables the group-common downlink control channel monitoring within the frequency resource. The operations of 2020 may be performed in accordance with examples as disclosed herein. In some examples, aspects of the operations of 2020 may be performed by a GC-PDCCH component 1435 as described with reference to FIG. 14.

The following provides an overview of aspects of the present disclosure:

Aspect 1: A method for wireless communications at a UE, comprising: receiving a configuration identifying a frequency resource for a multicast/broadcast service to be monitored by the UE for one or more group-common downlink control channels; receiving a message indicating a monitoring condition for group-common downlink control channel monitoring within the frequency resource; and selectively enabling or disabling the group-common downlink control channel monitoring within the frequency resource based on the monitoring condition.

Aspect 2: The method of aspect 1, wherein selectively enabling or disabling the group-common downlink control channel monitoring within the frequency resource further comprises: disabling the group-common downlink control channel monitoring prior to expiration of a DRX active timer.

Aspect 3: The method of any of aspects 1 through 2, wherein receiving the message further comprises: receiving an explicit indication of the monitoring condition as a timer value via a radio resource control message, wherein selectively enabling or disabling the group-common downlink control channel monitoring within the frequency resource further comprises selectively disabling the group-common downlink control channel monitoring during a pendency of the timer.

Aspect 4: The method of any of aspects 1 through 2, wherein receiving the message further comprises: receiving an explicit indication of the monitoring condition as a bitmap via a downlink control information message, wherein selectively enabling or disabling the group-common downlink control channel monitoring within the frequency resource comprises selectively enabling or disabling the group-common downlink control channel monitoring on a frequency resource basis based at least in part on the bitmap.

Aspect 5: The method of aspect 4, wherein receiving the explicit indication of the monitoring condition as the bitmap further comprises: receiving the bitmap in a bandwidth part identification field when the bandwidth part identification field is not being used to indicate bandwidth part switching.

Aspect 6: The method of aspect 4, wherein receiving the explicit indication of the monitoring condition as the bitmap further comprises: receiving the bitmap in a field of the downlink control information message dedicated to selectively enabling or disabling the group-common downlink control channel monitoring, a size of the bitmap based at least in part on a number of frequency resources configured for the multicast/broadcast service within a dedicated bandwidth.

Aspect 7: The method of any of aspects 4 through 6, wherein the downlink control information message is a UE-specific physical downlink control channel message received in an active dedicated bandwidth part.

Aspect 8: The method of any of aspects 4 through 6, wherein the downlink control information message is a group-common physical downlink control channel message, and the bitmap pertains to at least one of a bandwidth part for the multicast/broadcast service associated with the group-common physical downlink control channel message or another bandwidth part for the multicast/broadcast service, the bandwidth part for the multicast/broadcast service associated with the group-common physical downlink control channel message comprises the frequency resource.

Aspect 9: The method of any of aspects 4 through 6, wherein the downlink control information message is a group-common wake-up signal received in a multicast/broadcast service bandwidth part during an inactive state, a dormant time, or an active time.

Aspect 10: The method of any of aspects 1 through 9, wherein receiving the message further comprises: receiving an explicit indication of the monitoring condition as a search space set group switch indicating at least one of a plurality of search space set groups that are active for the group-common downlink control channel monitoring.

Aspect 11: The method of aspect 10, wherein receiving the explicit indication of the monitoring condition as the search space set group switch further comprises: receiving the search space set group switch in a downlink control information message whose cyclic redundancy check is scrambled with a group-common slot format indication radio network temporary identifier configured for the multicast/broadcast service, wherein the plurality of search space set groups are configured via radio resource control signaling.

Aspect 12: The method of any of aspects 10 through 11, wherein receiving the explicit indication of the monitoring condition as the search space set group switch further comprises: receiving the search space set group switch in a downlink control information message whose cyclic redundancy check is scrambled with a slot format indication radio network temporary identifier, wherein the plurality of search space set groups are configured via radio resource control signaling.

Aspect 13: The method of any of aspects 10 through 12, further comprising: receiving a radio resource control message configuring the plurality of search space set groups, wherein the radio resource control message includes one or more expiration timers pertaining to respective search space set groups.

Aspect 14: The method of any of aspects 1 through 13, wherein receiving the message further comprises: receiving an indication of an activity status for the frequency resource, wherein the frequency resource is a multicast/broadcast service bandwidth part and the monitoring condition is the activity status, and wherein selectively enabling or disabling the group-common downlink control channel monitoring is based at least in part on the activity status.

Aspect 15: The method of any of aspects 1 through 14, further comprising: receiving an indication of a first activity status of a UE-specific bandwidth part that is associated with the frequency resource, wherein the frequency resource is a multicast/broadcast service bandwidth part within the UE-specific bandwidth part and the monitoring condition is the first activity status; and determining a second activity status of the multicast/broadcast service bandwidth part based at least in part on the first activity status of the UE-specific bandwidth part, wherein selectively enabling or disabling the group-common downlink control channel monitoring is based at least in part on the second activity status.

Aspect 16: The method of any of aspects 1 through 15, further comprising: receiving, from a base station, an indication to disable the group-common downlink control channel monitoring based on a multicast/broadcast service traffic threshold being satisfied.

Aspect 17: The method of any of aspects 1 through 16, wherein selectively enabling or disabling the group-common downlink control channel monitoring within the frequency resource further comprises: disabling the group-common downlink control channel monitoring while still performing a channel state information measurement, a beam management operation, an uplink feedback transmission, a channel state information report transmission, a sounding reference signal transmission, or a combination thereof with respect to the frequency resource for the multicast/broadcast service.

Aspect 18: The method of any of aspects 1 through 17, wherein selectively enabling or disabling the group-common downlink control channel monitoring within the frequency resource further comprises: disabling the group-common downlink control channel monitoring; identifying one or more blind decoding occasions that are available due to the disabling of the group-common downlink control channel monitoring; and shifting the one or more blind decoding occasions to be available for unicast downlink control channel monitoring.

Aspect 19: The method of any of aspects 1 through 18, wherein selectively enabling or disabling the group-common downlink control channel monitoring within the frequency resource further comprises: disabling the group-common downlink control channel monitoring based at least in part on the monitoring condition; determining that the UE is configured for multicast negative acknowledgment only for multicast reception; and re-enabling the group-common downlink control channel monitoring based at least in part on transmission of a negative acknowledgment by the UE, wherein the re-enabling of the group-common downlink control channel monitoring occurs a time offset after the transmission of the negative acknowledgment.

Aspect 20: The method of any of aspects 1 through 19, wherein selectively enabling or disabling the group-common downlink control channel monitoring within the frequency resource further comprises: disabling the group-common downlink control channel monitoring based at least in part on the monitoring condition; determining that the UE is configured for UE-specific acknowledgment and negative acknowledgment for multicast reception; and monitoring for a UE-specific downlink control channel message pertaining to retransmission of a group-common downlink shared channel message with which the negative acknowledgment is associated.

Aspect 21: The method of aspect 20, further comprising: re-enabling the group-common downlink control channel monitoring based at least in part on an absence of the UE-specific downlink control channel message pertaining to retransmission of the group-common downlink shared channel message, wherein the re-enabling of the group-common downlink control channel monitoring occurs a time offset after transmission of the negative acknowledgment.

Aspect 22: The method of any of aspects 1 through 21, further comprising: transmitting a UE-specific acknowledgment or a UE-specific negative acknowledgment, wherein the UE-specific acknowledgment or the UE-specific negative acknowledgment is transmitted as feedback for receipt of data scheduled by the message.

Aspect 23: The method of any of aspects 1 through 22, further comprising: transmitting an acknowledgment or a negative acknowledgment, wherein the acknowledgment or the negative acknowledgment is transmitted as feedback for receipt of the message.

Aspect 24: A method for wireless communications at a base station, comprising: transmitting a configuration identifying a frequency resource for a multicast/broadcast service to be monitored by a UE for one or more group-common downlink control channels; transmitting a message indicating a monitoring condition for group-common downlink control channel monitoring within the frequency resource; and communicating with the UE in accordance with the monitoring condition, wherein the monitoring condition selectively enables or disables the group-common downlink control channel monitoring within the frequency resource.

Aspect 25: The method of aspect 24, wherein the monitoring condition disables the group-common downlink control channel monitoring prior to expiration of a DRX active timer.

Aspect 26: The method of any of aspects 24 through 25, wherein transmitting the message further comprises: transmitting an explicit indication of the monitoring condition as a timer value via a radio resource control message, wherein the monitoring condition selectively disables the group-common downlink control channel monitoring during a pendency of the timer.

Aspect 27: The method of any of aspects 24 through 25, wherein transmitting the message further comprises: transmitting an explicit indication of the monitoring condition as a bitmap via a downlink control information message, wherein the monitoring condition selectively enables or disables the group-common downlink control channel monitoring on a frequency resource basis based at least in part on the bitmap.

Aspect 28: The method of any of aspects 24 through 27, wherein transmitting the message further comprises: transmitting an explicit indication of the monitoring condition as a search space set group switch indicating at least one of a plurality of search space set groups that are active for the group-common downlink control channel monitoring.

Aspect 29: A UE, comprising a processor; memory coupled with the processor; and instructions stored in the memory and executable by the processor to cause the apparatus to perform a method of any of aspects 1 through 23.

Aspect 30: A UE, comprising at least one means for performing a method of any of aspects 1 through 23.

Aspect 31: A non-transitory computer-readable medium storing code for wireless communications at a UE, the code comprising instructions executable by a processor to perform a method of any of aspects 1 through 23.

Aspect 32: A base station, comprising a processor; memory coupled with the processor; and instructions stored in the memory and executable by the processor to cause the apparatus to perform a method of any of aspects 24 through 28.

Aspect 33: A base station, comprising at least one means for performing a method of any of aspects 24 through 28.

Aspect 34: A non-transitory computer-readable medium storing code for wireless communications at a base station, the code comprising instructions executable by a processor to perform a method of any of aspects 24 through 28.

It should be noted that the methods described herein describe possible implementations, and that the operations and the steps may be rearranged or otherwise modified and that other implementations are possible. Further, aspects from two or more of the methods may be combined.

Although aspects of an LTE, LTE-A, LTE-A Pro, or NR system may be described for purposes of example, and LTE, LTE-A, LTE-A Pro, or NR terminology may be used in much of the description, the techniques described herein are applicable beyond LTE, LTE-A, LTE-A Pro, or NR networks. For example, the described techniques may be applicable to various other wireless communications systems such as Ultra Mobile Broadband (UMB), Institute of Electrical and Electronics Engineers (IEEE) 802.11 (Wi-Fi), IEEE 802.16 (WiMAX), IEEE 802.20, Flash-OFDM, as well as other systems and radio technologies not explicitly mentioned herein.

Information and signals described herein may be represented using any of a variety of different technologies and techniques. For example, data, instructions, commands, information, signals, bits, symbols, and chips that may be referenced throughout the description may be represented by voltages, currents, electromagnetic waves, magnetic fields or particles, optical fields or particles, or any combination thereof.

The various illustrative blocks and components described in connection with the disclosure herein may be implemented or performed with a general-purpose processor, a DSP, an ASIC, a CPU, an FPGA or other programmable logic device, discrete gate or transistor logic, discrete hardware components, or any combination thereof designed to perform the functions described herein. A general-purpose processor may be a microprocessor, but in the alternative, the processor may be any processor, controller, microcontroller, or state machine. A processor may also be implemented as a combination of computing devices (e.g., a combination of a DSP and a microprocessor, multiple microprocessors, one or more microprocessors in conjunction with a DSP core, or any other such configuration).

The functions described herein may be implemented in hardware, software executed by a processor, firmware, or any combination thereof. If implemented in software executed by a processor, the functions may be stored on or transmitted over as one or more instructions or code on a computer-readable medium. Other examples and implementations are within the scope of the disclosure and appended claims. For example, due to the nature of software, functions described herein may be implemented using software executed by a processor, hardware, firmware, hardwiring, or combinations of any of these. Features implementing functions may also be physically located at various positions, including being distributed such that portions of functions are implemented at different physical locations.

Computer-readable media includes both non-transitory computer storage media and communication media including any medium that facilitates transfer of a computer program from one place to another. A non-transitory storage medium may be any available medium that may be accessed by a general-purpose or special-purpose computer. By way of example, and not limitation, non-transitory computer-readable media may include RAM, ROM, electrically erasable programmable ROM (EEPROM), flash memory, compact disk (CD) ROM or other optical disk storage, magnetic disk storage or other magnetic storage devices, or any other non-transitory medium that may be used to carry or store desired program code means in the form of instructions or data structures and that may be accessed by a general-purpose or special-purpose computer, or a general-purpose or special-purpose processor. Also, any connection is properly termed a computer-readable medium. For example, if the software is transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of computer-readable medium. Disk and disc, as used herein, include CD, laser disc, optical disc, digital versatile disc (DVD), floppy disk and Blu-ray disc where disks usually reproduce data magnetically, while discs reproduce data optically with lasers. Combinations of the above are also included within the scope of computer-readable media.

As used herein, including in the claims, "or" as used in a list of items (e.g., a list of items prefaced by a phrase such as "at least one of" or "one or more of") indicates an inclusive list such that, for example, a list of at least one of A, B, or C means A or B or C or AB or AC or BC or ABC (i.e., A and B and C). Also, as used herein, the phrase "based on" shall not be construed as a reference to a closed set of conditions. For example, an example step that is described as "based on condition A" may be based on both a condition A and a condition B without departing from the scope of the present disclosure. In other words, as used herein, the phrase "based on" shall be construed in the same manner as the phrase "based at least in part on."

In the appended figures, similar components or features may have the same reference label. Further, various components of the same type may be distinguished by following the reference label by a dash and a second label that distinguishes among the similar components. If just the first reference label is used in the specification, the description is applicable to any one of the similar components having the same first reference label irrespective of the second reference label, or other subsequent reference label.

The description set forth herein, in connection with the appended drawings, describes example configurations and does not represent all the examples that may be implemented or that are within the scope of the claims. The term "example" used herein means "serving as an example, instance, or illustration," and not "preferred" or "advantageous over other examples." The detailed description includes specific details for the purpose of providing an understanding of the described techniques. These techniques, however, may be practiced without these specific details. In some instances, known structures and devices are shown in block diagram form in order to avoid obscuring the concepts of the described examples.

The description herein is provided to enable a person having ordinary skill in the art to make or use the disclosure. Various modifications to the disclosure will be apparent to a person having ordinary skill in the art, and the generic principles defined herein may be applied to other variations without departing from the scope of the disclosure. Thus, the disclosure is not limited to the examples and designs described herein but is to be accorded the broadest scope consistent with the principles and novel features disclosed herein.

What is claimed is:

1. A method for wireless communications at a user equipment (UE), comprising:
    receiving a configuration identifying a first frequency resource for a multicast or broadcast service to be monitored by the UE for one or more group-common downlink control channels;
    receiving a message indicating a monitoring condition for group-common downlink control channel monitoring within the first frequency resource based at least in part on the first frequency resource for the multicast or broadcast service overlapping with a second frequency resource for a unicast service associated with one or more UE-specific downlink control channels;
    selectively enabling or disabling, during a discontinuous reception active time, the group-common downlink control channel monitoring within the first frequency resource based on the monitoring condition; and
    monitoring the one or more UE-specific downlink control channels, the one or more group-common downlink control channels, or both in accordance with the enabling or disabling of the group-common downlink control channel monitoring.

2. The method of claim 1, wherein selectively enabling or disabling the group-common downlink control channel monitoring within the first frequency resource further comprises:
    disabling the group-common downlink control channel monitoring prior to expiration of a discontinuous reception (DRX) active timer.

3. The method of claim 1, wherein receiving the message further comprises:
- receiving an explicit indication of the monitoring condition as a timer value via a radio resource control message, wherein selectively enabling or disabling the group-common downlink control channel monitoring within the first frequency resource further comprises:
- applying the monitoring condition comprises selectively disabling the group-common downlink control channel monitoring during a pendency of the timer value.

4. The method of claim 1, wherein receiving the message further comprises:
- receiving an explicit indication of the monitoring condition as a bitmap via a downlink control information message; and
- wherein selectively enabling or disabling the group-common downlink control channel monitoring within the first frequency resource further comprises:
- applying the monitoring condition comprises selectively enabling or disabling the group-common downlink control channel monitoring on respective frequency resources based at least in part on the bitmap.

5. The method of claim 4, wherein receiving the explicit indication of the monitoring condition as the bitmap further comprises:
- receiving the bitmap in a bandwidth part identification field when the bandwidth part identification field is not being used to indicate bandwidth part switching.

6. The method of claim 4, wherein receiving the explicit indication of the monitoring condition as the bitmap further comprises:
- receiving the bitmap in a field of the downlink control information message dedicated to selectively enabling or disabling the group-common downlink control channel monitoring, a size of the bitmap based at least in part on a number of frequency resources configured for the multicast or broadcast service within a dedicated bandwidth.

7. The method of claim 4, wherein the downlink control information message is a UE-specific physical downlink control channel message received in an active dedicated bandwidth part.

8. The method of claim 4, wherein the downlink control information message is a group-common physical downlink control channel message, and the bitmap pertains to at least one of: a bandwidth part for the multicast or broadcast service associated with the group-common physical downlink control channel message, or another bandwidth part for the multicast or broadcast service, and wherein the bandwidth part for the multicast or broadcast service associated with the group-common physical downlink control channel message comprises the first frequency resource.

9. The method of claim 4, wherein the downlink control information message is a group-common wake-up signal received in a multicast or broadcast service bandwidth part during an inactive state, a dormant time, or an active time.

10. The method of claim 1, wherein receiving the message further comprises:
- receiving an explicit indication of the monitoring condition as a search space set group switch indicating at least one of a plurality of search space set groups that are active for the group-common downlink control channel monitoring.

11. The method of claim 10, wherein receiving the explicit indication of the monitoring condition as the search space set group switch further comprises:
- receiving the search space set group switch in a downlink control information message whose cyclic redundancy check is scrambled with a group-common slot format indication radio network temporary identifier configured for the multicast or broadcast service, wherein the plurality of search space set groups are configured via radio resource control signaling.

12. The method of claim 10, wherein receiving the explicit indication of the monitoring condition as the search space set group switch further comprises:
- receiving the search space set group switch in a downlink control information message whose cyclic redundancy check is scrambled with a slot format indication radio network temporary identifier, wherein the plurality of search space set groups are configured via radio resource control signaling.

13. The method of claim 10, further comprising:
- receiving a radio resource control message configuring the plurality of search space set groups, wherein the radio resource control message includes one or more expiration timers pertaining to respective search space set groups.

14. The method of claim 1, wherein receiving the message further comprises:
- receiving an indication of an activity status for the first frequency resource, wherein the first frequency resource is a multicast or broadcast service bandwidth part and the monitoring condition is the activity status, and wherein selectively enabling or disabling the group-common downlink control channel monitoring is based at least in part on the activity status.

15. The method of claim 1, further comprising:
- receiving an indication of a first activity status of a UE-specific bandwidth part that is associated with the first frequency resource, wherein the first frequency resource is a multicast or broadcast service bandwidth part within the UE-specific bandwidth part and the monitoring condition is the first activity status; and
- determining a second activity status of the multicast or broadcast service bandwidth part based at least in part on the first activity status of the UE-specific bandwidth part, wherein selectively enabling or disabling the group-common downlink control channel monitoring is based at least in part on the second activity status.

16. The method of claim 1, further comprising:
- receiving, from a network device, an indication to disable the group-common downlink control channel monitoring based on a multicast or broadcast service traffic threshold being satisfied.

17. The method of claim 1, wherein selectively enabling or disabling the group-common downlink control channel monitoring within the first frequency resource further comprises:
- disabling the group-common downlink control channel monitoring while still performing a channel state information measurement, a beam management operation, an uplink feedback transmission, a channel state information report transmission, a sounding reference signal transmission, or a combination thereof with respect to the first frequency resource for the multicast or broadcast service.

18. The method of claim 1, wherein selectively enabling or disabling the group-common downlink control channel monitoring within the first frequency resource further comprises:

disabling the group-common downlink control channel monitoring;
identifying one or more blind decoding occasions that are available due to the disabling of the group-common downlink control channel monitoring; and
shifting the one or more blind decoding occasions to be available for unicast downlink control channel monitoring.

19. The method of claim 1, wherein selectively enabling or disabling the group-common downlink control channel monitoring within the first frequency resource further comprises:
disabling the group-common downlink control channel monitoring based at least in part on the monitoring condition;
determining that the UE is configured for multicast negative acknowledgment only for multicast reception; and
re-enabling the group-common downlink control channel monitoring based at least in part on transmission of a negative acknowledgment by the UE, wherein the re-enabling of the group-common downlink control channel monitoring occurs a time offset after the transmission of the negative acknowledgment.

20. The method of claim 1, wherein selectively enabling or disabling the group-common downlink control channel monitoring within the first frequency resource further comprises:
disabling the group-common downlink control channel monitoring based at least in part on the monitoring condition;
determining that the UE is configured for UE-specific acknowledgment and negative acknowledgment for multicast reception; and
monitoring for a UE-specific downlink control channel message pertaining to retransmission of a group-common downlink shared channel message with which the negative acknowledgment is associated.

21. The method of claim 20, further comprising:
re-enabling the group-common downlink control channel monitoring based at least in part on an absence of the UE-specific downlink control channel message pertaining to retransmission of the group-common downlink shared channel message, wherein the re-enabling of the group-common downlink control channel monitoring occurs a time offset after transmission of the negative acknowledgment.

22. The method of claim 1, further comprising:
transmitting a UE-specific acknowledgment or a UE-specific negative acknowledgment, wherein the UE-specific acknowledgment or the UE-specific negative acknowledgment is transmitted as feedback for receipt of data scheduled by the message.

23. The method of claim 1, further comprising:
transmitting an acknowledgment or a negative acknowledgment, wherein the acknowledgment or the negative acknowledgment is transmitted as feedback for receipt of the message.

24. A method for wireless communications at a network device, comprising:
transmitting a configuration identifying a first frequency resource for a multicast or broadcast service to be monitored by a user equipment (UE) for one or more group-common downlink control channels;
transmitting a message indicating a monitoring condition for group-common downlink control channel monitoring within the first frequency resource based at least in part on the first frequency resource for the multicast or broadcast service overlapping with a second frequency resource for a unicast service associated with one or more UE-specific downlink control channels; and
communicating with the UE via the one or more UE-specific downlink control channels, the one or more group-common downlink control channels, or both in accordance with the monitoring condition, wherein the monitoring condition selectively enables or disables, during a discontinuous reception active time, the group-common downlink control channel monitoring within the first frequency resource.

25. The method of claim 24, wherein the monitoring condition disables the group-common downlink control channel monitoring prior to expiration of a discontinuous reception (DRX) active timer.

26. The method of claim 24, wherein transmitting the message further comprises:
transmitting an explicit indication of the monitoring condition as a timer value via a radio resource control message, wherein the monitoring condition selectively disables the group-common downlink control channel monitoring during a pendency of the timer value.

27. The method of claim 24, wherein transmitting the message further comprises:
transmitting an explicit indication of the monitoring condition as a bitmap via a downlink control information message, wherein the monitoring condition selectively enables or disables the group-common downlink control channel monitoring on respective frequency resources based at least in part on the bitmap.

28. The method of claim 24, wherein transmitting the message further comprises:
transmitting an explicit indication of the monitoring condition as a search space set group switch indicating at least one of a plurality of search space set groups that are active for the group-common downlink control channel monitoring.

29. A user equipment (UE), comprising:
a processor;
memory coupled with the processor; and
instructions stored in the memory and executable by the processor to cause the UE to:
receive a configuration identifying a first frequency resource for a multicast or broadcast service to be monitored by the UE for one or more group-common downlink control channels;
receive a message indicating a monitoring condition for group-common downlink control channel monitoring within the first frequency resource based at least in part on the first frequency resource for the multicast or broadcast service overlapping with a second frequency resource for a unicast service associated with one or more UE-specific downlink control channels;
selectively enable or disable, during a discontinuous reception active time, the group-common downlink control channel monitoring within the first frequency resource based on the monitoring condition; and
monitoring the one or more UE-specific downlink control channels, the one or more group-common downlink control channels, or both in accordance with the enabling or disabling of the group-common downlink control channel monitoring.

30. A network device, comprising:

a processor;

memory coupled with the processor; and instructions stored in the memory and executable by the processor to cause the network device to:
- transmit a configuration identifying a first frequency resource for a multicast or broadcast service to be monitored by a user equipment (UE) for one or more group-common downlink control channels;
- transmit a message indicating a monitoring condition for group-common downlink control channel monitoring within the first frequency resource based at least in part on the first frequency resource for the multicast or broadcast service overlapping with a second frequency resource for a unicast service associated with one or more UE-specific downlink control channels; and
- communicate with the UE via the one or more UE-specific downlink control channels, the one or more group-common downlink control channels, or both in accordance with the monitoring condition, wherein the monitoring condition selectively enables or disables, during a discontinuous reception active time, the group-common downlink control channel monitoring within the first frequency resource.

* * * * *